US012173552B1

(12) United States Patent
Bernhagen et al.

(10) Patent No.: US 12,173,552 B1
(45) Date of Patent: Dec. 24, 2024

(54) FENESTRATION UNIT WITH INTERIOR INSTALLATION FEATURES AND ASSOCIATED SYSTEMS AND METHODS

(71) Applicant: Pella Corporation, Pella, IA (US)

(72) Inventors: Todd A Bernhagen, Pella, IA (US); Ted L. Hansen, Pella, IA (US); Jaime P. Ogbourne, Knoxville, IA (US); Bill R. Parcells, Des Moines, IA (US); Justin McAninch, Knoxville, IA (US)

(73) Assignee: Pella Corporation

( * ) Notice: Subject to any disclaimer, the term of this patent is extended or adjusted under 35 U.S.C. 154(b) by 0 days.

(21) Appl. No.: 18/647,418

(22) Filed: Apr. 26, 2024

Related U.S. Application Data

(63) Continuation of application No. 18/436,123, filed on Feb. 8, 2024, which is a continuation of application No. 18/478,189, filed on Sep. 29, 2023, now Pat. No. 11,933,098.

(60) Provisional application No. 63/581,834, filed on Sep. 11, 2023, provisional application No. 63/520,276, filed on Aug. 17, 2023, provisional application No. 63/463,103, filed on May 1, 2023, provisional application No. 63/453,344, filed on Mar. 20, 2023.

(51) Int. Cl.
*E06B 1/60* (2006.01)
*E06B 1/36* (2006.01)

(52) U.S. Cl.
CPC .............. *E06B 1/6053* (2013.01); *E06B 1/36* (2013.01); *E06B 1/6069* (2013.01)

(58) Field of Classification Search
CPC ......... E06B 1/6053; E06B 1/36; E06B 1/6069
USPC ........................................................... 52/213
See application file for complete search history.

(56) References Cited

U.S. PATENT DOCUMENTS

| | | | | |
|---|---|---|---|---|
| 1,570,351 A | | 1/1926 | Valter | |
| 2,722,170 A | | 11/1955 | Karl | |
| 2,840,202 A | * | 6/1958 | Hehr | E06B 1/6053 52/214 |
| 2,840,203 A | | 6/1958 | Hehr | |

(Continued)

FOREIGN PATENT DOCUMENTS

| | | |
|---|---|---|
| DE | 202016101375 U1 | 3/2016 |
| EP | 0137812 B1 | 4/1985 |

(Continued)

OTHER PUBLICATIONS

SeVan Sales, Inc., "A revolutionary system designed specifically for high end windows and doors Easy Installation Guide" Shimex Shimming and Anchoring System, 2 pages.

(Continued)

*Primary Examiner* — James M Ference
(74) *Attorney, Agent, or Firm* — FAEGRE DRINKER BIDDLE & REATH LLP

(57) ABSTRACT

Installation systems and methods for fenestration units configured to be set into a rough opening (RO) from interior side of a building structure or wall. The fenestration units may include a retention system coupled to the frame and operable to exert a retention force on the fenestration unit to maintain positive engagement of the fenestration unit with the rough opening framing and resist extraction of the fenestration unit from the rough opening upon insertion of the fenestration unit in the rough opening from the interior side of the rough opening.

23 Claims, 22 Drawing Sheets

(56) References Cited

U.S. PATENT DOCUMENTS 2,863,180 A * 12/1958 Birdwell .................. E06B 3/60 52/209
2,902,727 A 9/1959 Samolis
3,238,679 A 3/1966 Capoccia
3,711,995 A * 1/1973 Anderson ............ E06B 3/5821 49/504
3,795,076 A * 3/1974 Anderson ............ E06B 1/6053 49/504
3,905,154 A * 9/1975 Anderson ............ E06B 3/9685 49/504
4,014,146 A 3/1977 Dimascio et al.
4,028,849 A 6/1977 Anderson
4,473,981 A 10/1984 Simpson
4,488,391 A 12/1984 Pavnica
4,512,125 A 4/1985 Eriksson et al.
4,578,905 A 4/1986 Hout
4,660,325 A 4/1987 Bauer et al.
4,679,366 A 7/1987 Hitchins
4,713,922 A 12/1987 Ingold
4,750,302 A 6/1988 Bechtold
4,821,472 A 4/1989 Tix
4,887,407 A 12/1989 Nelson
4,995,605 A 2/1991 Conville
5,119,609 A 6/1992 Tait et al.
5,540,019 A 7/1996 Beske et al.
5,572,840 A 11/1996 Fast et al.
5,590,496 A 1/1997 Martin et al.
5,619,828 A 4/1997 Ver Meer
5,655,342 A 8/1997 Guillemet et al.
5,655,343 A 8/1997 Seals
5,692,350 A 12/1997 Murphy, Jr.
5,722,207 A 3/1998 Anderson et al.
5,815,992 A 10/1998 Wells et al.
5,927,039 A 7/1999 De Boer
5,934,019 A 8/1999 Rotharmel et al.
6,216,402 B1 4/2001 Van de Laar
6,282,852 B1 9/2001 Walcker
6,286,274 B1 9/2001 McKann et al.
6,293,061 B1 9/2001 Horak, Jr.
6,526,709 B1 * 3/2003 Jacobsen .................. E06B 1/02 52/211
6,560,934 B1 5/2003 Workman
6,688,056 B2 2/2004 Von et al.
6,895,718 B2 5/2005 Moffatt
7,162,841 B2 1/2007 Kownacki
7,331,145 B2 2/2008 Feucht et al.
7,490,441 B2 2/2009 Burton et al.
7,490,442 B1 2/2009 Jackson et al.
7,669,382 B2 3/2010 Burton et al.
7,716,886 B2 5/2010 Gordon
7,814,716 B2 10/2010 Moffatt
7,882,662 B2 2/2011 Root et al.
8,006,445 B2 8/2011 Burton et al.
8,024,899 B2 9/2011 Prince et al.
8,109,052 B2 2/2012 Rosende et al.
8,261,498 B2 9/2012 Poirier
8,333,359 B2 12/2012 Gordon
8,528,280 B2 9/2013 Coil et al.
8,550,140 B2 10/2013 Kelley
8,813,437 B1 8/2014 Spofford
RE45,355 E 2/2015 Root et al.
8,979,047 B2 3/2015 Coyle
9,038,334 B2 5/2015 Bren
9,038,698 B2 5/2015 Gibbs et al.
9,340,973 B2 5/2016 Carbary et al.
9,593,524 B2 3/2017 Rasmussen et al.
9,790,731 B1 10/2017 Bishman et al.
10,246,886 B2 4/2019 Mitchell
10,309,146 B1 6/2019 Rosende
10,400,501 B1 * 9/2019 Tatley ...................... E06B 3/06
10,550,586 B2 2/2020 Jeffries
10,641,032 B2 5/2020 Kendall et al.
10,662,698 B1 5/2020 Roegge
10,794,069 B2 10/2020 Gill et al.
10,844,617 B1 11/2020 Ahmad et al.
10,895,099 B2 1/2021 Vos
11,332,946 B2 5/2022 Hakeman et al.
11,391,083 B1 7/2022 Shattuck
11,585,145 B1 2/2023 Nelson et al.
11,643,864 B2 5/2023 Hoogland et al.
11,643,866 B1 5/2023 Roberts et al.
11,732,524 B2 8/2023 Gordon
11,933,098 B1 3/2024 Bernhagen et al.
2001/0035268 A1 11/2001 Desrochers
2002/0095884 A1 7/2002 Lindgren et al.
2003/0145531 A1 8/2003 Holder
2004/0139669 A1 7/2004 Feucht et al.
2004/0154244 A1 8/2004 Moffatt
2005/0066598 A1 3/2005 Williams
2005/0086878 A1 4/2005 Feucht et al.
2005/0262771 A1 12/2005 Gorman
2005/0262782 A1 12/2005 Harrison et al.
2006/0010822 A1 1/2006 Moffatt
2006/0236618 A1 10/2006 Williams
2006/0272274 A1 12/2006 Burton et al.
2007/0056230 A1 3/2007 Bren
2007/0144106 A1 6/2007 Kirk et al.
2008/0066400 A1 3/2008 Heppner
2008/0110110 A1 5/2008 Burton et al.
2008/0127564 A1 6/2008 Burton et al.
2008/0222979 A1 9/2008 Rissmiller
2009/0044463 A1 2/2009 Moscone et al.
2009/0077910 A1 3/2009 Gordon
2009/0173019 A1 7/2009 Pryor et al.
2009/0246440 A1 10/2009 Eagle
2009/0266014 A1 10/2009 Green
2010/0058678 A1 3/2010 Lutz et al.
2010/0083598 A1 4/2010 Smith
2011/0024591 A1 2/2011 Gordon
2011/0056054 A1 3/2011 Moffatt
2011/0225925 A1 9/2011 Sprague
2011/0258947 A1 10/2011 Peterson
2012/0049022 A1 3/2012 Coyle
2013/0008106 A1 1/2013 Michaud
2014/0260008 A1 9/2014 Eis et al.
2014/0331575 A1 11/2014 Vos et al.
2015/0233169 A1 8/2015 Saunders et al.
2016/0115726 A1 * 4/2016 Hodgson ............... E06B 1/6053 52/745.15
2016/0319557 A1 11/2016 Gordon
2017/0051552 A1 2/2017 Rosende et al.
2018/0058135 A1 3/2018 Vos
2018/0187475 A1 7/2018 Mitchell
2020/0032527 A1 1/2020 Hakeman et al.
2020/0208463 A1 7/2020 Mascarenhas et al.
2020/0318418 A1 10/2020 Burger et al.
2021/0123290 A1 4/2021 Jantzi
2022/0259915 A1 8/2022 Lipsky
2022/0349190 A1 11/2022 Hakeman et al.
2023/0160202 A1 9/2023 Friezner et al.
2024/0318494 A1 * 9/2024 Bernhagen ................ E06B 1/36

FOREIGN PATENT DOCUMENTS

EP 0356430 B1 6/1994
EP 2378043 A2 10/2011
EP 2948609 B1 5/2018
GB 2218448 A 11/1989
WO 84/03120 A1 8/1984
WO 88/07121 A1 9/1988
WO 97/06331 A1 2/1997
WO 2004/070153 A1 8/2004
WO 2007/059159 A2 5/2007
WO 2012007171 A1 1/2012
WO 2012123688 A1 9/2012
WO 2014/116102 A1 7/2014
WO 2015/142201 A2 9/2015
WO 2020/060581 A1 3/2020
WO 2020/071932 A1 4/2020
WO 2022/042939 A1 3/2022
WO 2022/235171 A1 11/2022

(56) References Cited

FOREIGN PATENT DOCUMENTS

| | | | |
|---|---|---|---|
| WO | 2023091037 | A1 | 5/2023 |
| WO | 2023186243 | A1 | 10/2023 |
| WO | 2023186900 | A1 | 10/2023 |

OTHER PUBLICATIONS

"In Depth: Benefits of Anchoring Method Window Installation", dated Feb. 6, 2020, available at https://www.innotech-windows.com/blog/in-depth-benefits-of-anchoring-method-window-installation.
"Tru-Loc(Trademark) Window & Door Installation Anchor", available at https://frontlinebldg.com/all-products/accessories/tru-loc-window-door-installation-anchor/.
"Nailing Fin: Hinged PP1219", available at https://www.amesburytruth. com/products/extrusions/nailing-fin/hinged/hinged-pp1219.
Pella Corporation, "Pella Installation Instructions—Advanced Performance Nail Fin, Nail Fin With J-Channel and Enduraclad Exterior Trim With Nail Fin Windows", 18 pages.
International Search Report from EPO dated Jan. 15, 2024—PCT/US2023/075692.
International Search Report from EPO dated Sep. 10, 2024—PCT/US2024/026415.
Screen captures from YouTube video clip entitled "A new Door Install Tool that is Awesome!"; 7 pages, posted on Jul. 20, 2021 by Matt Risinger. Visited on Feb. 14, 2024. https://www.youtube.com/watch?v=Q3VEjTszBjQ.

* cited by examiner

FENESTRATION UNIT WITH INTERIOR INSTALLATION FEATURES AND ASSOCIATED SYSTEMS AND METHODS

CROSS-REFERENCE TO RELATED APPLICATIONS

This application is a continuation of U.S. Non-Provisional patent application Ser. No. 18/436,123, entitled "Fenestration Unit With Interior Installation Features And Associated Systems And Methods", filed on Feb. 8, 2024; which is a continuation of U.S. Non-Provisional patent application Ser. No. 18/478,189, entitled "Fenestration Unit With Interior Installation Features And Associated Systems And Methods", filed Sep. 29, 2023, now granted as U.S. Pat. No. 11,933,098; which claims priority benefit of U.S. Provisional Patent Application No. 63/581,834, entitled "Fenestration Unit with Interior Installation Features and Associated Systems and Methods", filed Sep. 11, 2023; U.S. Provisional Patent Application No. 63/520,276, entitled "Fenestration Unit with Interior Installation Features and Associated Systems and Methods", filed Aug. 17, 2023; U.S. Provisional Patent Application No. 63/463,103 entitled "Fenestration Unit with Interior Installation Features and Associated Systems and Methods", filed May 1, 2023; and U.S. Provisional Patent Application No. 63/453,344, entitled "Interior Installation Features, Systems and Methods", filed Mar. 20, 2023. The contents of each application are hereby incorporated by reference in their entirety.

BACKGROUND

Window designs typically have an exterior nailing flange and are installed from the exterior side of the building envelope. Two installers work together, one on the interior and the other on the exterior. Some installation crews have determined it is easier to unpackage the window inside the building where it is relatively clean and flat. Then they pass the window through the rough opening (RO) to a person on the exterior side. In some instances, the person on the exterior side is on a ladder which can substantially complicate installation. The installer on the interior side centers the window in the RO and inserts shims to level, plumb and square all while the exterior installer is holding the window. After the window is correctly set, the interior installer holds the window in place while the exterior installer drives nails or screws through the exterior nailing flange to anchor it. If it is a venting window, the sash is then opened to check functional operation. The interior installer proceeds to inject expansion foam around the perimeter of the window in the gap between the frame and RO to create the interior air seal. At the same time, the exterior installer applies 3 to 4 inches wide flashing tape on the jambs and across the head of the window.

Background Patents

| Pat. No. | Title | Filing Date |
|---|---|---|
| U.S. Pat. No. 8,621,795 | Fenestration frame with bonded support brackets . . . | 2011 Apr. 20 |
| U.S. Pat. No. 8,109,052 | Monolithic fenestration construction member . . . | 2009 May 21 |
| U.S. Pat. No. 7,162,841 | Spring clip and method of window installation | 2004 Feb. 13 |
| DE 2020 16101375 | Supporting and fastening window . . . to . . . wall opening | 2016 Mar. 11 |
| WO 2015/142201 | Mounting, sealing and thermal insulation of windows . . . | 2014 Sep. 5 |
| U.S. Pat. No. 6,293,061 | System and method for installing a jamb | 1999 Sep. 30 |
| U.S. Pat. No. 5,692,350 | Apparatus and method for leveling closures | 1996 Feb. 2 |
| U.S. Pat. No. 11,332,946 | Installation features for fenestration units . . . | 2019 Jul. 25 |
| U.S. Pat. No. 8,006,445 | Self-sealing window installation and method | 2008 Jan. 15 |
| U.S. 2008/0127564 | Pre-hung door assembly and method of installation | 2008 Jan. 18 |
| U.S. Pat. No. 10,895,099 | Support bracket for window installation . . . | 2016 Aug. 23 |
| U.S. 2005/0262782 | Self-Flashing Assembly | 2004 Jun. 1 |
| U.S. 2020/0318418 | Fenestration assembly and installation system for the same | 2020 Apr. 2 |
| U.S. Pat. No. 4,488,391 | Centering clips for window frames | 1980 Dec. 17 |
| U.S. 2011/0258947 | Fenestration frame with bonded support brackets and methods of making same | 2011 Apr. 20 |

Background Products

Innotech Windows & Doors, Strap Anchors https://www.innotech-windows.com/blog/in-depth-benefits-of-anchoring-method-window-installation FrontLine Tru-Loc™ Brackets https://frontlinebldg.com/all-products/accessories/tru-loc-window-door-installation-anchor/Amesbury Hinged Fin https://www.amesburytruth.com/products/extrusions/nailing-fin/hinged/hinged-pp1219

SUMMARY

Various advantages may be achieved according to the example systems and methods described herein. The various examples may be one or more of: more efficient (e.g., cycle time reduced by 50% or more); easier to learn; easier to remember; easier to train; may be less physically demanding (e.g., window is not set from the exterior side which could be on uneven ground or require a ladder); window is unable to fall out toward exterior during installation; can be installed by a single person from the interior of the building structure; interior and exterior installation tasks do not need to be done simultaneously; improved fenestration install quality and fenestration performance following installation; delivers an installation method that is unique to the industry and offers many benefits for the installer; faster cycle times; improved performance (water and air infiltration); adapts to wall depth variation; simplifies casing installation for finish carpenters; separates interior and exterior work so they can be done "independently".

Retention Feature System:

According to one embodiment ("Embodiment 1"), a fenestration unit has an inner side and an outer side, the fenestration unit is configured for installation in a rough opening in a structure defined by rough opening framing, the rough opening has an interior side and an exterior side and the rough opening framing has an interior face and an exterior face opposite the interior face. The fenestration unit comprises a frame having a perimeter and a retention system coupled to the frame and operable to exert a retention force on the rough opening framing to maintain positive engagement of the fenestration unit with the rough opening framing and resist extraction of the fenestration unit from the rough opening upon insertion of the fenestration unit in the rough opening such that the fenestration unit remains stationary in the rough opening without use of fasteners. In embodiments, the retention system is adjustable to accommodate space between the rough opening framing and the frame.

According to another embodiment ("Embodiment 2"), further to Embodiment 1, the frame has a top, a bottom, a first side, and a second side collectively defining a perimeter of the frame.

According to another embodiment ("Embodiment 3"), further to Embodiment 2, the retention system is coupled to at least one of the top of the frame and the bottom of the frame.

According to another embodiment ("Embodiment 4"), further to Embodiment 1, the frame is a primary frame or a subframe.

According to another embodiment ("Embodiment 5"), further to Embodiment 1, the fenestration unit further comprises a glazing unit coupled to the frame.

According to another embodiment ("Embodiment 6"), further to Embodiment 1, the retention system is configured to be preferentially inserted into the rough opening from the interior side of the rough opening.

According to another embodiment ("Embodiment 7"), further to Embodiment 1, the retention force is about 1 lb. or more.

According to another embodiment ("Embodiment 8"), further to Embodiment 1, the retention force is at least 10 lbs.

According to another embodiment ("Embodiment 9"), further to Embodiment 1, the retention system includes a sill spacer configured to impose a tilt bias on the fenestration unit toward the exterior side of the rough opening.

According to another embodiment ("Embodiment 10"), further to Embodiment 9, the fenestration unit defines a center of weight, and further wherein the sill spacer is secured to the bottom of the frame to define a contact surface located at an offset position toward the inner side of the fenestration unit relative to the center of weight of the fenestration unit such that when the contact surface rests on the sill portion of the rough opening framing the sill spacer imposes the tilt bias on the fenestration unit toward the exterior side of the rough opening.

According to another embodiment ("Embodiment 11"), further to Embodiment 10, the sill spacer has a rounded transverse profile.

According to another embodiment ("Embodiment 12"), further to Embodiment 11, the contact surface defines an apex, and further wherein the apex is substantially flat.

According to another embodiment ("Embodiment 13"), further to Embodiment 1, the retention system includes a retainer configured to permit insertion of the fenestration unit within the rough opening in a first direction at a first insertion force and resist extraction of the fenestration unit from the opening in a second direction at a second extraction force.

According to another embodiment ("Embodiment 14"), further to Embodiment 13, the extraction force is substantially greater than the insertion force.

According to another embodiment ("Embodiment 15"), further to Embodiment 13, the retainer is coupled to the top of the frame such that the retainer mechanically engages a header portion of the rough opening framing.

According to another embodiment ("Embodiment 16"), further to Embodiment 13, the retainer includes a plurality of flex arms including a first flex arm having a first engagement end and a second flex arm having a second engagement end, the first flex arm being positioned laterally adjacent the second flex arm and the first flex arm being longer than the second flex arm.

According to another embodiment ("Embodiment 17"), further to Embodiment 16, the first and second engagement ends are configured to mechanically engage the framing of the rough opening.

According to another embodiment ("Embodiment 18"), further to Embodiment 13, the retainer includes a base secured to the frame, a flex arm extending from the base, a stop extending from the flex arm, and an engagement feature extending from the flex arm, the retainer being operable such that during insertion of the frame in the first direction the flex arm bends in a first flex direction and upon movement of the frame in the second direction the flex arm bends in a second flex direction.

According to another embodiment ("Embodiment 19"), further to Embodiment 1, the fenestration unit further comprises an engagement system coupled to the frame, the engagement system configured to positively engage the interior face of the rough opening framing upon insertion of the fenestration unit in the rough opening from the interior side of the rough opening, the retention system being operable to maintain positive engagement of the retention system with the rough opening framing upon insertion of the fenestration unit in the rough opening from the interior side of the rough opening and without use of fasteners securing the fenestration unit to the rough opening framing.

According to another embodiment ("Embodiment 20"), further to Embodiment 19, wherein the engagement system includes a coupling bracket having a first leg and a second leg that are angularly offset from the first leg.

According to another embodiment ("Embodiment 21"), further to Embodiment 20, the second leg includes one or more apertures configured to receive a fastener for coupling the second leg to the rough opening framing.

According to another embodiment ("Embodiment 22"), further to Embodiment 19, the engagement system further includes a carrier bracket to engage at least a portion of the coupling bracket, and at least one of the coupling bracket or the carrier bracket includes a plurality of detents at different offset distances.

Retention Feature—Method of Installing:

According to one embodiment ("Embodiment 1"), a method of installing a fenestration unit in a rough opening in a wall is provided. The rough opening has an interior side toward an interior direction and an exterior side toward an exterior direction. The method comprises seating a frame of the fenestration unit in the rough opening in the exterior direction such that a retention system coupled to the frame of the fenestration unit exerts a retention force on framing of the rough opening to retain the frame in the rough opening and prevent tipping of the frame in the interior direction, the frame being retained in the rough opening without fasteners securing the frame to the rough opening framing and after inserting the frame into the rough opening, coupling the frame of the fenestration unit to the rough opening using one or more fasteners.

According to another embodiment ("Embodiment 2"), further to Embodiment 1, the retention system is coupled to a top of the frame of the fenestration unit and seating the frame in the rough opening includes first translating a bottom of the frame into the rough opening in the exterior direction and then tilting a top of the frame toward the exterior side of the rough opening such that the retention system engages with a header of the rough opening to retain the frame in the rough opening.

According to another embodiment ("Embodiment 3"), further to Embodiment 1, the retention system exhibits resistance to seating of the fenestration unit in the exterior direction such that a first insertion force is required to seat the fenestration unit in the exterior direction and upon seating the frame of the fenestration unit in the rough opening the retention system retains the frame within the rough opening against tilting in the interior direction such that a second retention force different than the first insertion force is required to tilt the top of the frame from the rough opening in the interior direction.

According to another embodiment ("Embodiment 4"), further to Embodiment 3, the extraction force is substantially greater than the insertion force.

According to another embodiment ("Embodiment 5"), further to Embodiment 3, the retention force is determinable using a force gauge placed perpendicular to a vertical plane of the fenestration unit on the exterior side fenestration unit approximately eight inches from the top of the fenestration unit along a vertical centerline of the fenestration unit and by pushing the gauge in an interior direction until the fenestration unit is pressed out of the opening and obtaining a maximum force measured by the gauge.

According to another embodiment ("Embodiment 6"), further to Embodiment 3, the retention force is at least 1 lb.

According to another embodiment ("Embodiment 7"), further to Embodiment 3, the retention force is at least 10 lbs.

According to another embodiment ("Embodiment 8"), further to Embodiment 1, the retention system includes a retainer secured to a top of the frame, and further wherein seating the frame in the rough opening includes mechanically engaging the retainer with a header of the rough opening.

According to another embodiment ("Embodiment 9"), further to Embodiment 8, the retainer includes a first flex arm having a first engagement end, and further wherein mechanically engaging the retainer with the header of the rough opening includes sliding the first engagement end against the header of the rough opening and bending the first flex arm in a first direction as the frame is translated into the rough opening.

According to another embodiment ("Embodiment 10"), further to Embodiment 9, the retainer includes a second flex arm having a second engagement end, the second flex arm being positioned laterally adjacent the first flex arm and the first flex arm being longer than the second flex arm, and further wherein the mechanically engaging the retainer with the header of the rough opening includes first sliding the first engagement end against the header of the rough opening and bending the first flex arm in a first direction as the frame is translated into the rough opening and subsequently sliding the second engagement end against the header of the rough opening and bending the second flex arm in the first direction as the frame is translated into the rough opening.

According to another embodiment ("Embodiment 11"), further to Embodiment 1, the retention system includes a retainer having a base secured to the frame, a flex arm extending from the base, a stop extending from the flex arm, and an engagement feature extending from the flex arm, the flex arm bending in a first flex direction during seating of the frame in the first direction.

According to another embodiment ("Embodiment 12"), further to Embodiment 1, the fenestration unit further comprises an engagement system coupled to the frame, wherein inserting the fenestration unit in the rough opening includes positively engaging the engagement system with the interior face of the rough opening framing from the interior side of the rough opening and the retention system operates to maintain positive engagement of the engagement system with the rough opening framing.

According to another embodiment ("Embodiment 13"), further to Embodiment 12, the engagement system includes a coupling bracket having a first leg and a second leg that are angularly offset from the first leg.

According to another embodiment ("Embodiment 14"), further to Embodiment 13, the second leg includes one or more apertures, and further wherein coupling the fenestration unit to the rough opening using one or more fasteners includes securing one or more fasteners through the one or more apertures and into the rough opening framing.

According to another embodiment ("Embodiment 15"), further to Embodiment 1, the retention system includes a sill spacer, and further wherein seating the frame in the rough opening includes resting the fenestration unit on the sill spacer such that the sill spacer imposes a tilting bias on the fenestration unit in the exterior direction.

Install Brackets:

According to one embodiment ("Embodiment 1"), a fenestration unit has an interior side and an exterior side and is configured for installation in an opening in a structure. The fenestration unit comprising a frame having a perimeter, a front, and back that is opposite the front and a plurality of anchoring clips secured to the outer perimeter of the frame, the plurality of anchoring clips including a first anchoring clip coupled to the perimeter of the frame. The first anchoring clip including a coupling bracket including a first leg slidably coupled to the perimeter of the frame such that the coupling bracket is releasably lockable at a pre-selected depth and a second leg configured to be secured to framing surrounding the opening in the structure.

According to another embodiment ("Embodiment 2"), further to Embodiment 1, the coupling bracket can be transitioned between a first storage orientation and a second operational orientation, the coupling bracket being coupled to the perimeter of the frame with the second leg extending outward from the perimeter of the frame in the second operational orientation and the second leg extending inward from the perimeter of the frame in the first storage orientation.

According to another embodiment ("Embodiment 3"), further to Embodiment 2, the second leg extends substantially flush to the front of the frame when the coupling bracket is in the first storage orientation.

According to another embodiment ("Embodiment 4"), further to Embodiment 1, the first and second legs of the coupling bracket are angularly offset by approximately 90 degrees.

According to another embodiment ("Embodiment 5"), further to Embodiment 1, the first anchoring clip further includes a carrier bracket coupling the coupling bracket to the perimeter of the frame, the first leg of the coupling bracket being slidably received by the carrier bracket.

According to another embodiment ("Embodiment 6"), further to Embodiment 5, the carrier bracket is a separate, independent component coupled to the frame of the fenestration unit.

According to another embodiment ("Embodiment 7"), further to Embodiment 5, the carrier bracket is formed as an integral component with the frame of the fenestration unit.

According to another embodiment ("Embodiment 8"), further to Embodiment 5, the carrier bracket includes a retention member, and the first leg of the coupling bracket has a first detent, the retention member releasably locking in the first detent to releasably lock the first anchoring clip in the second operational orientation with the second leg at a first offset distance relative to the front of the frame.

According to another embodiment ("Embodiment 9"), further to Embodiment 8, the first leg of the coupling bracket has a second detent, the retention member releasably locking in the second detent to releasably lock the coupling bracket in the second operational orientation with the second leg at a second offset distance relative to the front of the frame that is greater than the first offset distance.

According to another embodiment ("Embodiment 10"), further to Embodiment 9, the second offset distance is approximately 0.125 inches greater than the first offset distance.

According to another embodiment ("Embodiment 11"), further to Embodiment 8, the first leg of the coupling bracket includes a plurality of detents at different offset distances along a length of the first leg.

According to another embodiment ("Embodiment 12"), further to Embodiment 8, the first leg of the coupling bracket includes at least two columns of detents.

According to another embodiment ("Embodiment 13"), further to Embodiment 12, the first detent includes at least one slot formed through a thickness of the first leg.

According to another embodiment ("Embodiment 14"), further to Embodiment 8, the retention member includes at least one tooth configured to releasably engage with the first detent.

According to another embodiment ("Embodiment 15"), further to Embodiment 8, the retention member includes a release handle projecting toward the front of the frame, the release handle being operable to be lifted away from the frame to release the retention member from the first detent.

According to another embodiment ("Embodiment 16"), further to Embodiment 15, the second leg of the coupling bracket includes a release aperture through a thickness of the second leg, the release handle being accessible through the release aperture from the interior side of the fenestration unit.

According to another embodiment ("Embodiment 17"), further to Embodiment 8, the carrier bracket defines a retaining pocket configured to slidably receive the first leg of the coupling bracket.

According to another embodiment ("Embodiment 18"), further to Embodiment 17, the first leg of the coupling bracket has a first edge and a second edge located opposite the first edge, and the carrier bracket has a first retaining lip for slidably receiving the first edge and a second retaining lip for slidably receiving the second edge, the retaining pocket being defined between the first and second retaining lips.

According to another embodiment ("Embodiment 19"), further to Embodiment 1, the second leg has at least one fastener aperture operable to receive a fastener.

According to another embodiment ("Embodiment 20"), further to Embodiment 1, the frame has a first side extending between a top and a bottom of the frame and a second side extending between the top and the bottom of the frame opposite the first side of the frame, and further wherein the plurality of anchoring clips further includes a first pair of anchoring clips which includes the first anchoring clip and a second pair of anchoring clips, each of the plurality of anchoring clips of the first and the second pairs of anchoring clips being substantially similar, and further wherein the first pair of anchoring clips is secured to the perimeter of the frame on the first side of the frame and the second pair of anchoring clips is secured to the perimeter of the frame on the second side of the frame.

Install Bracket—Method of Installing:

According to one embodiment ("Embodiment 1"), a method of installing a fenestration unit in a rough opening in a structure is provided, the structure having an interior and an exterior. The method comprising slidably coupling a first leg of a coupling bracket of an anchoring clip to a perimeter of a frame of the fenestration unit such that the coupling bracket is releasably locked at a pre-selected depth relative to a front of the frame, seating the fenestration unit in the rough opening by translating the fenestration unit in an exterior direction within the rough opening until a second leg of the coupling bracket is abutted against an interior-facing surface of the structure, and securing the second leg of the coupling bracket to framing of the rough opening.

According to another embodiment ("Embodiment 2"), further to Embodiment 1, the method further comprises transitioning the coupling bracket from a first storage orientation to a second operational orientation, the coupling bracket being decoupled from the perimeter of the frame and recoupled to the frame to transition the second leg from the second storage orientation in which the second leg extends inward from the perimeter of the frame to the second operational orientation in which the second leg extends outward from the perimeter of the frame.

According to another embodiment ("Embodiment 3"), further to Embodiment 2, the second leg extends substantially flush to the front of the frame when the coupling bracket is in the first storage orientation.

According to another embodiment ("Embodiment 4"), further to Embodiment 2, the method further comprises slidably receiving the first leg of the coupling bracket in a carrier bracket such that a retention member of the carrier bracket releasably locks into a first detent of the coupling bracket to releasably lock the coupling bracket in the second operational orientation with the second leg at a first offset distance from a front of the frame of the fenestration unit.

According to another embodiment ("Embodiment 5"), further to Embodiment 4, the first leg of the coupling bracket has a second detent, the method further comprising slidably receiving the first leg of the coupling bracket in the carrier bracket such that the retention member slides beyond the first detent and releasably locks in the second detent to releasably lock the first anchoring clip in the second operational orientation with the second leg at a second offset distance from the front of the frame that is greater than the first offset distance.

According to another embodiment ("Embodiment 6"), further to Embodiment 5, the second offset distance is at least 0.125 inches greater than the first offset distance.

According to another embodiment ("Embodiment 7"), further to Embodiment 4, the first detent includes at least one slot formed through a thickness of the first leg, the retention member includes at least one tooth, and the method further comprises releasably engaging the tooth in the slot to releasably lock the coupling bracket in the second operational orientation.

According to another embodiment ("Embodiment 8"), further to Embodiment 4, the retention member includes a release handle projecting toward the front of the frame, the method further comprising lifting the release handle away from the frame to release the retention member from the first detent.

According to another embodiment ("Embodiment 9"), further to Embodiment 8, the second leg of the coupling bracket includes a release aperture through a thickness of the second leg, the method further comprising accessing the release handle through the release aperture from the interior side of the fenestration unit.

According to another embodiment ("Embodiment 10"), further to Embodiment 4, the carrier bracket defines a retaining pocket, the method further comprising slidably receiving the first leg of the coupling bracket in the retaining pocket to slidably receive the first leg of the coupling bracket in the carrier bracket.

According to another embodiment ("Embodiment 11"), further to Embodiment 10, wherein slidably receiving the first leg of the coupling bracket in the carrier bracket includes slidably receiving a first edge of the first leg with a first retaining lip of the carrier bracket and slidably receive a second edge of the first leg with a second retaining lip of the coupling bracket, the retaining pocket being defined between the first and second retaining lips.

According to another embodiment ("Embodiment 12"), further to Embodiment 4, the method further comprises adjusting an installation depth of the anchoring clip by adjusting a depth the anchoring clip is slid into to the carrier clip.

According to another embodiment ("Embodiment 13"), further to Embodiment 1, securing the second leg of the coupling bracket to the framing of the rough opening includes securing a fastener through at least one fastener aperture in the second leg.

According to another embodiment ("Embodiment 14"), further to Embodiment 1, the fenestration unit includes a first pair of anchoring clips and a second pair of anchoring clips, each of anchoring clip of the first and the second pairs of anchoring clips being substantially similar and including a coupling bracket, and further wherein the first pair of anchoring clips is secured to the perimeter of the frame on the first side of the frame and the second pair of anchoring clips is secured to the perimeter of the frame on the second side of the frame, the method further comprising securing second legs of the coupling brackets of the first and second pairs of anchoring clips to the framing of the rough opening.

According to another embodiment ("Embodiment 15"), further to Embodiment 1, the method further comprising securing drywall over the anchoring clip such that an interior surface of the drywall is flush with the front of the frame of the fenestration unit.

According to another embodiment ("Embodiment 16"), further to Embodiment 15, wherein the drywall is ½ inch or ⅝ inch thick.

Install Fin:

According to one embodiment ("Embodiment 1"), a fenestration unit has an interior side and an exterior side and being configured to be installed in an opening in a structure. The fenestration unit comprises a frame having a perimeter, a front, and back that is opposite the front of the frame and a weather seal system secured to the perimeter of the frame, the weather seal system including a fin assembly configured to transition from a first, folded configuration in which the fin assembly projects in a direction of the front of the frame and a second, projecting configuration in which the fin assembly projects outward relative to the frame, and a retaining assembly releasably securing the fin assembly in a constrained state with the fin assembly in the first, folded configuration.

According to another embodiment ("Embodiment 2"), further to Embodiment 1, the retaining assembly includes a retaining clip having a channel insert and a retaining lip.

According to another embodiment ("Embodiment 3"), further to Embodiment 2, the front of the frame has an accessory channel, and further wherein the channel insert of the retaining clip is releasably secured into the accessory channel with the retaining lip received over the fin assembly to releasably secure the fin assembly in the constrained state.

According to another embodiment ("Embodiment 4"), further to Embodiment 3, the retaining lip extends substantially parallel to the channel insert, the retaining lip and the channel insert defining a receiving channel therebetween.

According to another embodiment ("Embodiment 5"), further to Embodiment 2, the retaining clip further includes an insertion stop extending substantially perpendicular to the retaining lip channel insert, the insertion stop abutting the exterior face of the frame.

According to another embodiment ("Embodiment 6"), further to Embodiment 2, the retaining lip extends along the side of the frame with the fin assembly received between the retaining lip and the side of the frame.

According to another embodiment ("Embodiment 7"), further to Embodiment 1, the fin assembly includes a first fin having a coupling portion and a projection portion, with a hinge portion between the coupling portion and the projection portion, the coupling portion being coupled to the perimeter of the frame and the projection portion being biased to transition from the first, folded configuration to the second, projecting configuration.

According to another embodiment ("Embodiment 8"), further to Embodiment 7, the hinge portion is formed of a first material and the projection portion is formed of a second material different than the first material.

According to another embodiment ("Embodiment 9"), further to Embodiment 8, the first material of the hinge portion is a first polymeric material, and the second material is a second polymeric material that is different than the first polymeric material.

According to another embodiment ("Embodiment 10"), further to Embodiment 9, the first polymeric material is an elastomeric material.

According to another embodiment ("Embodiment 11"), further to Embodiment 7, the coupling portion, the projection portion, and the hinge portion are co-extruded parts.

According to another embodiment ("Embodiment 12"), further to Embodiment 7, the first fin is folded at the hinge portion into the constrained state.

According to another embodiment ("Embodiment 13"), further to Embodiment 7, the hinge portion is at least 0.25 inches wide.

According to another embodiment ("Embodiment 14"), further to Embodiment 1, the fin assembly includes a first side fin coupled to the first side of the frame, a second side fin coupled to the second side of the frame, and a top fin coupled to the top of the frame.

According to another embodiment ("Embodiment 15"), further to Embodiment 14, the frame defines a first corner at an intersection of the top and the first side of the frame and a second corner at the intersection of the top and the second side of the frame, the fin assembly including a first corner bridge seal at the first corner and a second corner bridge seal at the second corner, the first corner bridge seal overlapping with the first side fin and the top fin and the second corner bridge seal overlapping with the second side fin and the top fin to define a continuous water barrier extending about the perimeter of the frame along the first side, the top, and the second side.

According to another embodiment ("Embodiment 16"), further to Embodiment 15, the fin assembly includes a top fin having a coupling portion and a projection portion, with a hinge portion between the coupling portion and the projection portion, the coupling portion being coupled to the perimeter of the frame and the projection portion being biased to project radially outward from the perimeter of the frame by the hinge portion, and further wherein the first corner bridge seal overlaps with the hinge portion, the coupling portion, and the projection portion of the top fin.

Install Fin Method of Installing:

According to one embodiment ("Embodiment 1"), a method of installing a fenestration unit in an opening in a structure is provided. The method comprising inserting an exterior side of the fenestration unit into a rough opening from an interior side of the rough opening, releasing a retaining assembly secured to a perimeter of a frame of the fenestration unit from a constrained state such that a weather seal system of the fenestration unit is able to transition from the constrained state in which a fin assembly of the weather seal system is compressed toward the frame to a deployed state in which the fin assembly projects radially outward from the perimeter of the frame, and securing the fenestration unit in the opening in the structure with the fin assembly abutted against an exterior surface of the structure.

According to another embodiment ("Embodiment 2"), further to Embodiment 1, the retaining assembly includes a retaining clip having a channel insert and a retaining lip holding the fin assembly in the constrained state, the method further comprising removing the retaining lip from the fin assembly.

According to another embodiment ("Embodiment 3"), further to Embodiment 2, the front of the frame has an accessory channel, and further wherein the channel insert of the retaining clip is releasably secured into the accessory channel with the retaining lip received over the fin assembly to releasably secure the fin assembly in the constrained state, and further wherein releasing the retaining assembly includes removing the channel insert from the accessory channel and removing the retaining lip from over the fin assembly.

According to another embodiment ("Embodiment 4"), further to Embodiment 3, the retaining lip extends substantially parallel to the channel insert, the retaining lip and the channel insert defining a receiving channel therebetween, and further wherein releasing the retaining assembly includes removing a portion of the frame from the receiving channel.

According to another embodiment ("Embodiment 5"), further to Embodiment 4, the retaining clip further includes an insertion stop extending substantially perpendicular to the retaining lip channel insert, the insertion stop abutting the exterior face of the frame, wherein releasing the retaining assembly includes separating the insertion stop from the exterior face of the frame.

According to another embodiment ("Embodiment 6"), further to Embodiment 2, the retaining lip extends along the side of the frame with the fin assembly received between the retaining lip and the side of the frame, and further wherein releasing the retaining assembly includes releasing the fin assembly from between the retaining lip and the side of the frame.

According to another embodiment ("Embodiment 7"), further to Embodiment 1, the fin assembly includes a top fin having a coupling portion and a projection portion, with a hinge portion between the coupling portion and the projection portion, the coupling portion being coupled to the perimeter of the frame and the projection portion being biased to project radially outward from the perimeter of the frame by the hinge portion, wherein the top fin is folded at the hinge portion into the constrained state and further wherein releasing the retaining assembly includes the top fin transitioning to the deployed state by unfolding at the hinge portion.

According to another embodiment ("Embodiment 8"), further to Embodiment 1, the fin assembly includes a first side fin coupled to the first side of the frame, a second side fin coupled to the second side of the frame, and a top fin coupled to the top of the frame, and further wherein releasing the retaining assembly includes unfolding the first side and second side fins and unfolding the top fin.

According to another embodiment ("Embodiment 9"), further to Embodiment 8, the frame defines a first corner at an intersection of the top and the first side of the frame and a second corner at the intersection of the top and the second side of the frame, the fin assembly including a first corner bridge seal at the first corner and a second corner bridge seal at the second corner, and further wherein releasing the retaining assembly includes unfolding the first corner bridge seal such that the first corner bridge seal overlaps with the first side fin and the top fin and unfolding the second corner bridge seal such that the second corner bridge seal overlaps with the second side fin and the top fin to define a continuous water barrier extending about the perimeter of the frame along the first side, the top, and the second side of the frame.

According to another embodiment ("Embodiment 10"), further to Embodiment 9, the fin assembly includes a top fin having a coupling portion and a projection portion, with a hinge portion between the coupling portion and the projection portion, the coupling portion being coupled to the perimeter of the frame and the projection portion being biased to project radially outward from the perimeter of the frame by the hinge portion, and further wherein, after release of the fin assembly the first corner bridge seal overlaps with the coupling portion, the hinge portion, and the projection portion of the top fin.

Edge Adjusters:

According to one embodiment ("Embodiment 1"), a fenestration unit has an interior side and an exterior side and is configured to be installed in an opening in a structure. The fenestration unit comprising a frame having a first side and a second side, and a perimeter defined by the first and second sides of the frame, the frame further having a front and back that is opposite the front of the frame and a first edge adjuster secured to the first side of the frame, the first edge adjuster including a guide portion and a first ramp portion, the first edge adjuster defining a longitudinal axis extending between the guide portion and the first ramp portion, the longitudinal axis extending along a length of the first side of the frame.

According to another embodiment ("Embodiment 2"), further to Embodiment 1, a second ramp portion opposite the first ramp portion, the guide portion positioned between the first and second ramp portions.

According to another embodiment ("Embodiment 3"), further to Embodiment 1, the guide portion includes a sliding surface, a first guide edge on a first side of the sliding surface, and a second guide edge on a second side of the sliding surface.

According to another embodiment ("Embodiment 4"), further to Embodiment 3, the sliding surface is recessed relative to the first ramp portion to define the first and second guide edges.

According to another embodiment ("Embodiment 5"), further to Embodiment 4, the first and second guide edges are spaced a distance corresponding to a standard shim width.

According to another embodiment ("Embodiment 6"), further to Embodiment 4, the first and second guide edges are spaced a distance of about 1.5 inches.

According to another embodiment ("Embodiment 7"), further to Embodiment 1, the guide portion includes a fastener aperture.

According to another embodiment ("Embodiment 8"), further to Embodiment 1, the first and ramp portion tapers in thickness, changing from a first, greater thickness to a second, smaller thickness in a direction away from the guide portion.

Edge Adjusters—Method of Installing:

According to one embodiment ("Embodiment 1"), a method of installing a fenestration unit in an opening in a structure is provided. The method comprising inserting an exterior side of the fenestration unit into a rough opening from an interior side of the rough opening, sliding a shim vertically over a first ramp portion of a first edge adjuster secured to a first side of the fenestration unit until the shim is received in a guide portion of the first edge adjuster, inserting the shim to a desired depth, and securing the fenestration unit in the opening in the structure.

According to another embodiment ("Embodiment 2"), further to Embodiment 1, the first edge adjuster is pre-assembled to a first jamb of the fenestration unit with a longitudinal axis of the first edge adjuster extending along the first jamb.

According to another embodiment ("Embodiment 3"), further to Embodiment 1, wherein upon the shim being received in the guide portion a user of the first edge adjuster is provided a tactile response to the shim sliding into place into the guide portion.

Edge Adjusters:

According to one embodiment ("Embodiment 1"), a fenestration unit has an interior side and an exterior side and being configured to be installed in an opening in a structure. The fenestration unit comprising a frame having a top, a bottom, a first side having a first adjustment aperture, and a second side, the bottom, the first side, and the second side collectively defining a perimeter of the frame, the frame further having a front and back that is opposite the front of the frame and a first edge adjuster secured to the first side of the frame, the first edge adjuster including, a contact head having a plurality of engagement features and/or a circumferential groove, an adjustment body extending from the contact head and received in the first adjustment aperture in the first side of the frame, the adjustment body being rotatably actuatable to adjust a depth of the adjustment body within the adjustment aperture, the contact head defining a projection distance from the first side of the frame based upon the depth of the adjustment body within the first adjustment aperture.

According to another embodiment ("Embodiment 2"), further to Embodiment 1, the adjustment body of the first edge adjuster having male threading.

According to another embodiment ("Embodiment 3"), further to Embodiment 1, the first adjustment aperture has female threading.

According to another embodiment ("Embodiment 4"), further to Embodiment 1, the plurality of engagement features of the contact head includes a plurality of radial projections.

According to another embodiment ("Embodiment 5"), further to Embodiment 1, the plurality of engagement features includes a plurality of recesses sized to receive an end of a standard flathead screwdriver having a ¼ inch head and a shaft length of at least 4 inches.

According to another embodiment ("Embodiment 6"), further to Embodiment 1, the contact head has leading end defining a leading profile, the leading profile being dome-shaped.

According to another embodiment ("Embodiment 7"), further to Embodiment 1, the fenestration unit further comprises a plurality of edge adjusters substantially similar to the first edge adjuster.

According to another embodiment ("Embodiment 8"), further to Embodiment 7, the plurality of edge adjusters includes a second edge adjuster secured to the second side of the frame.

According to another embodiment ("Embodiment 9"), further to Embodiment 8, the second side of the frame includes a second adjustment aperture receiving the second edge adjuster within the second adjustment aperture.

According to another embodiment ("Embodiment 10"), further to Embodiment 1, the first edge adjuster is located closer to the back of the fenestration unit than the front of the fenestration unit.

According to another embodiment ("Embodiment 11"), further to Embodiment 10, the back of the fenestration unit corresponds to an exterior-facing side of the fenestration unit.

According to another embodiment ("Embodiment 12"), further to Embodiment 1, further comprising a filament wound in the circumferential groove, the filament being accessible by an installer to adjust the depth of the adjustment body within the adjustment aperture.

Edge Adjusters—Method of Installing:

According to one embodiment ("Embodiment 1"), a method of installing a fenestration unit in an opening in a structure is provided, the fenestration unit having an interior side and an exterior side. The method comprising inserting an exterior side of the fenestration unit into a rough opening from an interior side of the rough opening, actuating a first edge adjuster secured to the first side of the frame, the first edge adjuster including, a contact head having a plurality of engagement features and/or a circumferential groove formed in the contact head, and an adjustment body extending from the contact head and received in a first adjustment aperture in a first side of a frame of the fenestration unit, actuating the first edge adjuster including rotating the adjustment body such that a depth of the adjustment body within the first adjustment aperture is decreased in order to increase a projection distance of the contact head from the first side of the frame such that the contact head engages an edge of the opening in the structure, and securing the fenestration unit in the opening in the structure with the weather seal system abutted against an exterior surface of the structure.

According to another embodiment ("Embodiment 2"), further to Embodiment 1, the adjustment body of the first edge adjuster has male threading and actuating the first edge adjuster includes screwing the first edge adjuster into the adjustment aperture.

According to another embodiment ("Embodiment 3"), further to Embodiment 1, the first adjustment aperture has female threading and actuating the first edge adjuster includes screwing the first edge adjuster into the adjustment aperture.

According to another embodiment ("Embodiment 4"), further to Embodiment 1, the plurality of engagement features of the contact head include a plurality of radial projections and actuating the first edge adjuster includes engaging at least one of the plurality of radial projections to rotate the adjustment body.

According to another embodiment ("Embodiment 5"), further to Embodiment 1, the plurality of engagement features includes a plurality of recesses and actuating the first edge adjuster includes engaging an end of a hand tool in one of the plurality of resources to rotate the adjustment body.

According to another embodiment ("Embodiment 6"), further to Embodiment 1, the contact head has leading end defining a leading profile, the leading profile being dome-shaped, and further wherein the dome-shaped head engages the edge of the opening in the structure upon actuating the first edge adjuster.

According to another embodiment ("Embodiment 7"), further to Embodiment 1, the fenestration unit further comprises a plurality of edge adjusters substantially similar to the first edge adjuster, and further wherein the method includes actuating each of the plurality of edge adjusters such that the plurality of edge adjusters contact edges of the opening in the structure.

According to another embodiment ("Embodiment 8"), further to Embodiment 7, the plurality of edge adjusters includes a second edge adjuster secured to the second side of the frame and further wherein the method includes actuating the second edge adjuster such that the second edge adjuster contacts a second edge of the opening in the structure.

According to another embodiment ("Embodiment 9"), further to Embodiment 8, the second side of the frame includes a second adjustment aperture receiving the second edge adjuster within the second adjustment aperture.

According to another embodiment ("Embodiment 10"), further to Embodiment 1, the first edge adjuster is located closer to the exterior side of the fenestration unit than the interior side of the fenestration unit, and further wherein the contact head engages the edge of the opening in the structure at a location closer to the exterior of the structure than the interior of the structure.

According to another embodiment ("Embodiment 11"), further to Embodiment 1, the method further comprising tensioning a filament wound in the circumferential groove of the contact head, the filament being tensioned by an installer to adjust the depth of the adjustment body within the adjustment aperture.

Sill Spacer:

According to one embodiment ("Embodiment 1"), a fenestration unit has an inner side and an outer side and being configured to be installed in a rough opening in a structure defined by rough opening framing, the rough opening having an interior side and an exterior side. The fenestration unit comprising a frame having a front corresponding to the inner side of the fenestration unit, a back corresponding to the outer side of the fenestration unit, and a perimeter and a sill spacer attached to the bottom of the frame, the sill spacer being positioned entirely between the front and back of the frame.

According to another embodiment ("Embodiment 2"), further to Embodiment 1, the fenestration unit defines a center of weight between the front and the back of the frame, and further wherein the sill spacer is secured to the bottom of the frame to define a contact surface configured to contact a sill of a rough opening and located at an offset position toward the inner side of the fenestration unit relative to the center of weight of the fenestration unit such that the sill spacer is configured to impose a tilt bias on the fenestration unit toward the exterior side of the rough opening.

According to another embodiment ("Embodiment 3"), further to Embodiment 1, the sill spacer defines a smooth transverse profile.

According to another embodiment ("Embodiment 4"), further to Embodiment 1, the sill spacer has rounded edges.

According to another embodiment ("Embodiment 5"), further to Embodiment 1, the sill spacer includes a first sill spacer, and the fenestration unit further comprises a second sill spacer spaced from the first sill spacer.

According to another embodiment ("Embodiment 6"), further to Embodiment 1, the sill spacer has a flat apex.

According to another embodiment ("Embodiment 7"), further to Embodiment 1, the sill spacer is offset toward the front of the frame relative to the back of the frame.

According to another embodiment ("Embodiment 8"), further to Embodiment 1, the sill spacer defines a maximum thickness of about ¼ inches.

According to another embodiment ("Embodiment 9"), further to Embodiment 1, a second sill spacer attached to the bottom of the frame.

Retainer:

According to one embodiment ("Embodiment 1"), a fenestration unit has an interior side and an exterior side and is configured to be installed in an opening in a structure. The fenestration unit comprising a frame having a front, a back, a top, a bottom, a first side, and a second side, the bottom, the first side, and the second side collectively defining a perimeter of the frame, and a retainer attached to the top of the frame to contact the structure and permit insertion of the frame within the opening in the structure in a first direction and resist extraction of the frame from the opening in a second direction. The retainer including a plurality of portions of different length to accommodate space between the frame and the opening in the structure.

According to another embodiment ("Embodiment 2"), further to Embodiment 1, the plurality of portions of different length includes a plurality of flex arms including a first flex arm having a first engagement end and a second flex arm having a second engagement end, the first flex arm being positioned laterally adjacent the second flex arm and the first flex arm being longer than the second flex arm.

According to another embodiment ("Embodiment 3"), further to Embodiment 2, the first and second engagement ends are configured to mechanically engage the framing of the rough opening.

According to another embodiment ("Embodiment 4"), further to Embodiment 2, the retainer is formed of sheet metal.

According to another embodiment ("Embodiment 5"), further to Embodiment 2, the retainer is formed as a single, monolithic piece.

According to another embodiment ("Embodiment 6"), further to Embodiment 1, the retainer includes a base secured to the frame, a flex arm extending from the base, a stop extending from the flex arm, and an engagement feature extending from the flex arm, the retainer being operable such that during insertion of the frame in the first direction the flex arm bends in a first flex direction and upon movement of the frame in the second direction the flex arm bends in a second flex direction.

According to another embodiment ("Embodiment 7"), further to Embodiment 1, the method further comprises a strap member coupled to the top of the frame, the strap member having an elongate body including a plurality of fastener apertures operable to receive one or more fasteners.

According to another embodiment ("Embodiment 8"), further to Embodiment 7, the strap member is bendable between a stowed configuration in which the strap member extends downwardly toward a center of the fenestration unit and an extended configuration in which the strap member extends upwardly away from the center of the fenestration unit.

The foregoing embodiments and additional embodiments described herein should not be read to limit or otherwise narrow the scope of any of the inventive concepts otherwise provided by the instant disclosure. While multiple examples are disclosed, still other embodiments will become apparent to those skilled in the art from this specification and its drawings, which show and describe various illustrative examples. Accordingly, the drawings and detailed description are to be regarded as illustrative in nature rather than restrictive in nature.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

FIG. 11B is an isometric view of the anchoring clip, according to some embodiments.

FIG. 11C is an isometric view of the anchoring clip of FIG. 11B with a backplate removed, according to some embodiments.

FIG. 11D shows a coupling bracket of the anchoring clip of FIG. 11B from a bottom view, according to some embodiments.

FIG. 11E shows an isometric view of a carrier bracket of the anchoring clip of FIG. 11B, according to some embodiments.

FIG. 15A is an isometric view of a sill spacer of the fenestration unit of FIG. 1, according to some embodiments.

FIG. 16A is an end view of the sill spacer of FIG. 15A, according to some embodiments.

FIG. 17A is a bottom view of the sill spacer of FIG. 15A, according to some embodiments.

FIG. 15C is an isometric view of a sill spacer of the fenestration unit of FIG. 1, according to some embodiments.

FIG. 16C is an end view of the sill spacer of FIG. 15C, according to some embodiments.

FIG. 17C shows the sill spacer of FIG. 15C assembled to different sill designs, according to some embodiments.

FIG. 18A is an isometric view of a retainer of the fenestration unit of FIG. 1, according to some embodiments.

FIG. 19A is a side view of the retainer of FIG. 18A, according to some embodiments.

FIG. 20A is a schematic view illustrating engagement of the retainer with a head of rough opening framing as the fenestration unit of FIG. 1 is inserted in a first, exterior direction and FIG. 21A shows the engagement as the fenestration unit of FIG. 1 is extracted in a second, interior direction, according to some embodiments.

FIG. 18B is an isometric view of a retainer of the fenestration unit of FIG. 1, according to some embodiments.

FIG. 19B is a side view of the retainer of FIG. 18B, according to some embodiments.

FIG. 20B is a schematic view illustrating engagement of the retainer with a head of rough opening framing as the fenestration unit of FIG. 1 is inserted in a first, exterior direction and FIG. 21B shows the engagement as the fenestration unit of FIG. 1 is extracted in a second, interior direction, according to some embodiments.

FIG. 33A is an isometric view of a retaining clip of the fenestration unit of FIG. 30, according to some embodiments.

FIG. 34A is an end view of the retaining clip of FIG. 33A, according to some embodiments.

FIG. 35A is sectional view at a head of the fenestration unit of FIG. 30, according to some embodiments.

FIG. 33B is an isometric view of a retaining clip of the fenestration unit of FIG. 30, according to some embodiments.

FIG. 34B is an end view of the retaining clip of FIG. 33B, according to some embodiments.

FIG. 35B is sectional view at a head of the fenestration unit of FIG. 30, according to some embodiments.

FIG. 36A is a closeup, side view of the fenestration unit of FIG. 1 showing an adjustment system of the fenestration unit including an edge adjuster, according to some embodiments.

FIG. 37A is an isometric view of the edge adjuster of FIG. 36A, according to some embodiments.

FIGS. 38A and 39A are front and side views of the edge adjuster of FIG. 36A, according to some embodiments.

FIG. 36B is a closeup, side view of the fenestration unit of FIG. 1 showing an adjustment system of the fenestration unit including an edge adjuster, according to some embodiments.

FIG. 37B is a closeup, side view of the fenestration unit of FIG. 36B, with the edge adjuster removed to reveal an adjustment aperture of a frame of the fenestration unit, according to some embodiments.

FIGS. 38B and 39B are isometric views of the edge adjuster of FIG. 36B, according to some embodiments.

DETAILED DESCRIPTION

Definitions and Terminology

Figure 1:
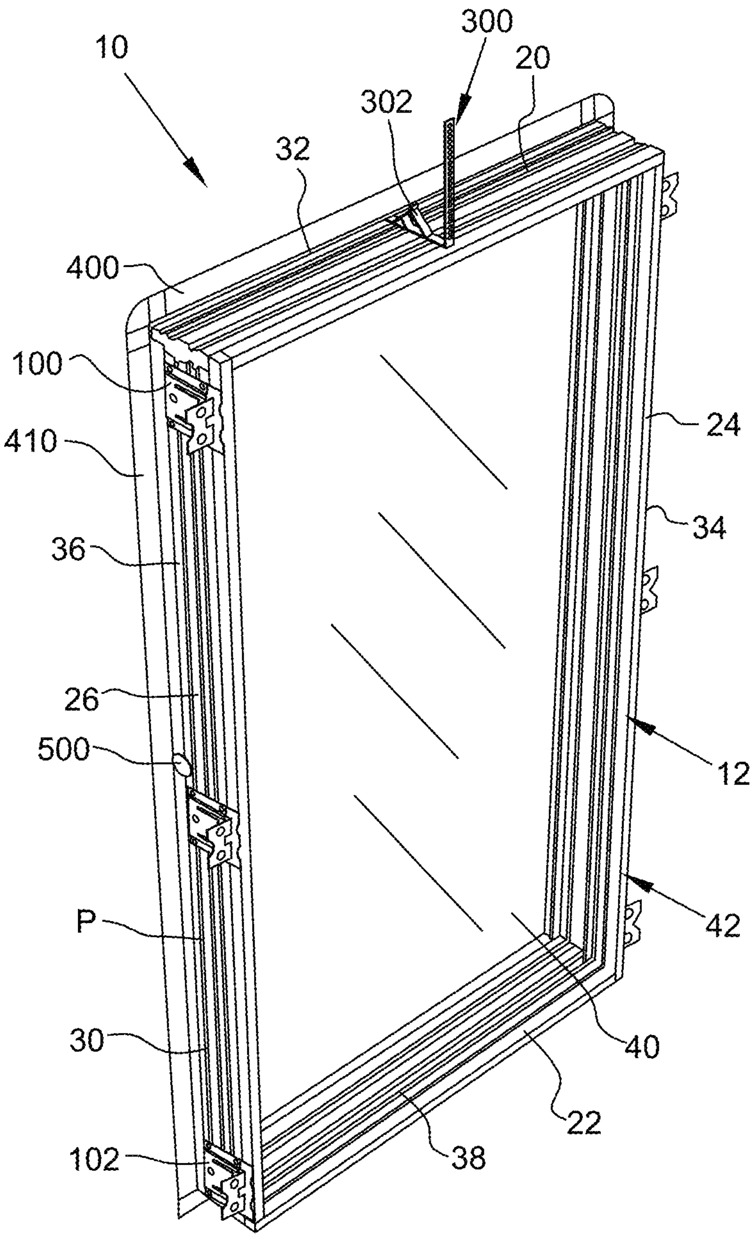
FIG. 1 is a top-oriented, perspective view of a fenestration unit from an interior side, according to some embodiments.

This disclosure is not meant to be read in a restrictive manner. For example, the terminology used in the application should be read broadly in the context of the meaning those in the field would attribute such terminology.

With respect to terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error, differences in measurement and/or manufacturing equipment calibration, human error in reading and/or setting measurements, minor adjustments made to optimize performance and/or structural parameters in view of differences in measurements associated with other components, particular implementation scenarios, imprecise adjustment and/or manipulation of objects by a person or machine, and/or the like, for example. In the event it is determined that individuals having ordinary skill in the relevant arts would not readily ascertain values for such reasonably small differences, the terms "about" and "approximately" can be understood to mean plus or minus 10% of the stated value.

Persons skilled in the art will readily appreciate that various aspects of the present disclosure can be realized by any number of methods and apparatuses configured to perform the intended functions. It should also be noted that the accompanying drawing figures referred to herein are not necessarily drawn to scale and may be exaggerated to illustrate various aspects of the present disclosure, and in that regard, the drawing figures should not be construed as limiting.

Description of Various Embodiments

Various concepts of this patent specification address installation systems and methods for fenestration units, such as windows and doors. Some features of such systems and methods include one or more of the following: configured to be set into a rough opening (RO) from interior side of a building structure or wall; eliminated or reduced need for jamb and/or sill spacers; pre-applied sill spacers (e.g., factory-applied); pre-applied head stabilizers and/or jamb stabilizers for self-stabilization in the rough opening while leveling, plumbing, squaring, and/or anchoring the fenestration unit; gauged to the interior face of rough opening for more accurate finishing (e.g., drywall and/or trim) offsets; attached with pre-applied (e.g., factory-applied) anchoring clips configured for interior unit installation; no or reduced fasteners utilized on the exterior side of the fenestration unit; pre-attached (e.g., factory-applied) exterior water barrier (e.g., pop-up fin); storable and deployable exterior water barrier (e.g., constrained by removable packaging clips for shipping/installation); facilitates standard flashing tape methods; configured to be installed by a single person/installer; interior and exterior installation tasks can be performed at different times (e.g., with a substantial break in period of time between the two types of tasks).

In various examples, the fenestration units (e.g., fenestration unit 10) include features that promote installation of the fenestration unit from an interior side of a rough opening using a methodology that can be readily achieved by a single installer. In particular, a fenestration unit according to various examples includes a retention system coupled to the frame of the fenestration unit that is operable to exert a retention force on the fenestration unit to maintain positive engagement of the fenestration unit with the rough opening framing and resist extraction of the fenestration unit from the rough opening upon insertion of the fenestration unit in the rough opening from the interior side of the rough opening. The retention system may operate such that the fenestration unit remains stationary in the rough opening without use of fasteners securing the fenestration unit to the rough opening framing. The fenestration unit may include an engagement system coupled to the frame, the engagement system configured to positively engage the interior face of the rough opening framing upon insertion of the fenestration unit in the rough opening from the interior side of the rough opening. In turn, the afore-mentioned retention system may operate to maintain positive engagement of the retention system with the rough opening framing upon insertion of the fenestration unit in the rough opening from the interior side of the rough opening and without use of fasteners securing the fenestration unit to the rough opening framing.

In this manner, a single individual may insert a fenestration unit into a rough opening (RO) from the interior side thereof, without needing a second person to hold the fenestration unit against the rough opening framing, or otherwise assist with maintaining the positioning of the fenestration unit in the rough opening (RO). This retention feature also removes the need for the installer to use one hand to hold the fenestration unit against the rough opening framing, freeing both hands of the installer to carry out the installation process, such as securing the fenestration unit to the rough opening using fasteners, such as nails or screws, and/or leveling, plumbing, and squaring the fenestration unit within the rough opening (RO).

Fenestration Units

Figure 2:
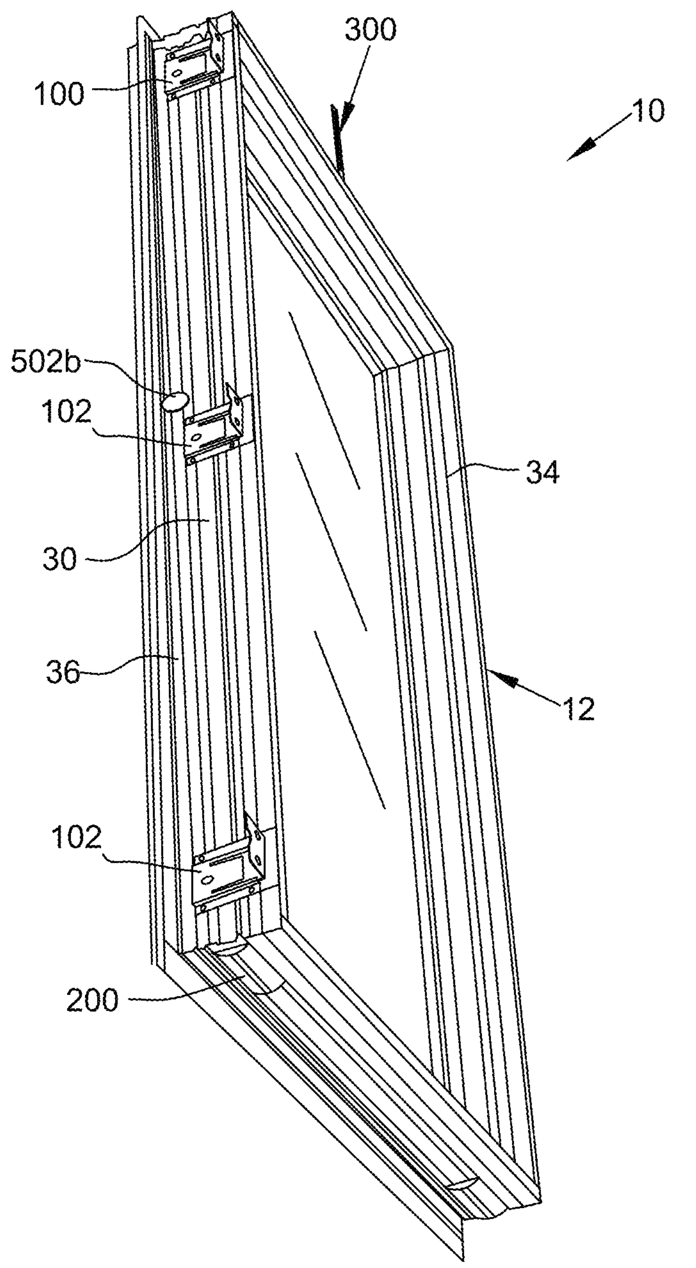
FIG. 2 is a bottom-oriented, perspective view from the interior side of the fenestration unit of FIG. 1, according to some embodiments.
Figure 3:
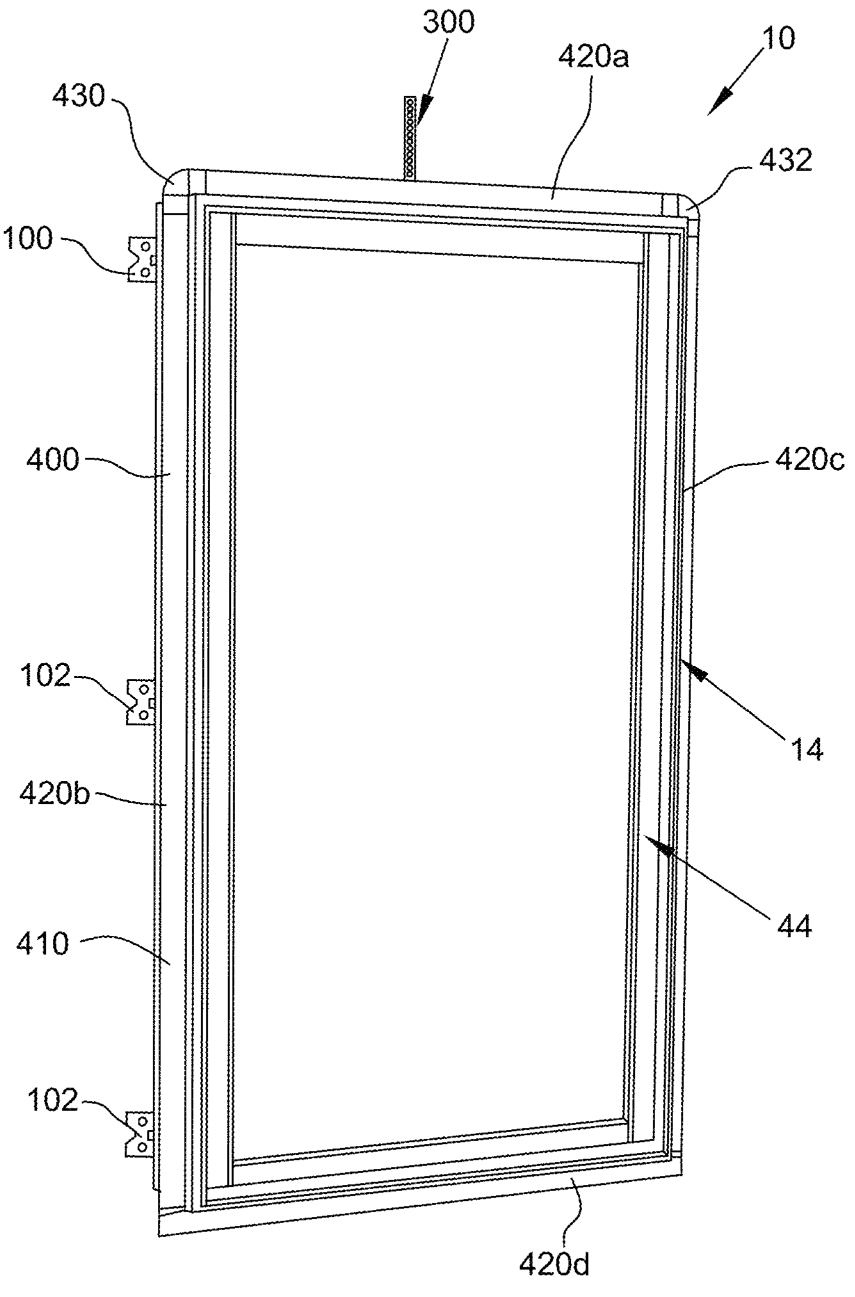
FIG. 3 is a perspective view from an exterior side of the fenestration unit of FIG. 1, according to some embodiments.
Figure 4:
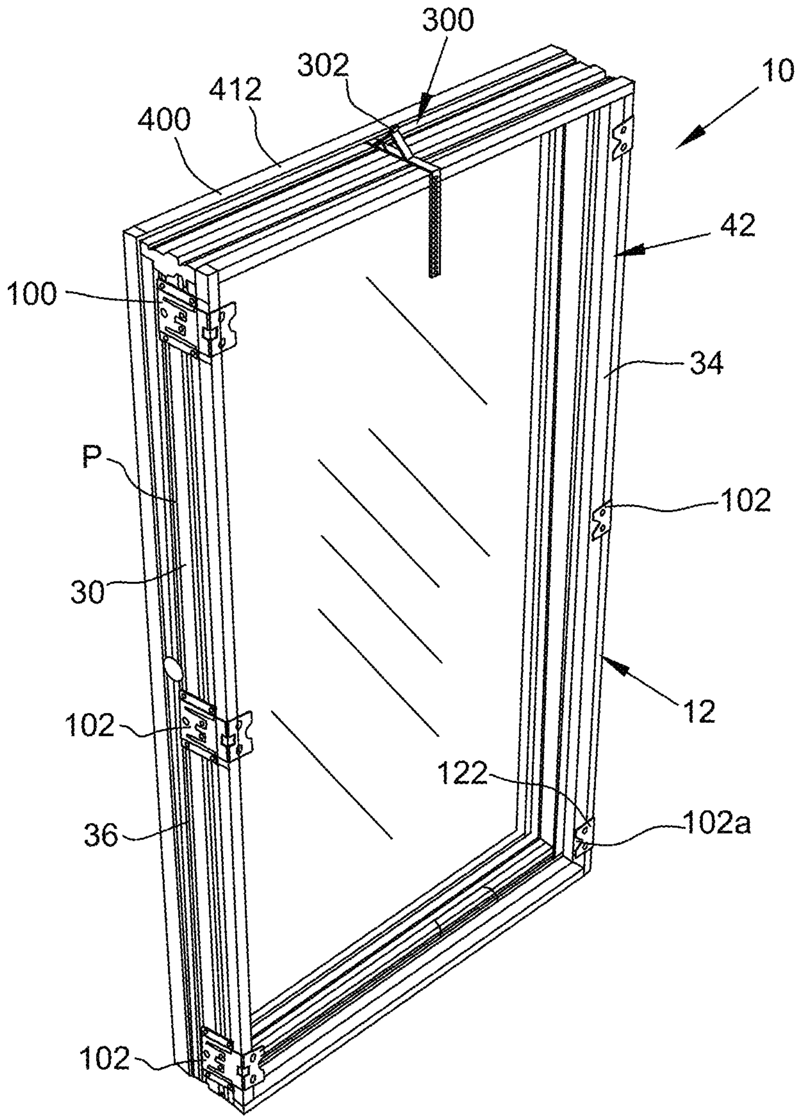
FIG. 4 is a perspective view from an interior side showing the fenestration unit of FIG. 1 in an initial, stowed or pre-installation configuration, according to some embodiments.

FIGS. 1 to 4 show a fenestration unit 10, according to some embodiments, where FIG. 1 is a top-oriented perspective view from an interior side 12 of the fenestration unit 10, FIG. 2 is a bottom-oriented perspective view from the interior side 12 of the fenestration unit 10, and FIG. 3 is a perspective view from an exterior side 14 of the fenestration unit 10. FIGS. 1 to 3 show the fenestration unit 10 in a final, installed configuration, or installation configuration, and FIG. 4 shows the fenestration unit 10 in an initial, stowed or pre-installation configuration (e.g., as initially received by an installer).

As shown in FIG. 1, the fenestration unit 10 has a top 20, a bottom 22, a first side 24, and a second side 26. The fenestration unit 10 includes a frame 30 including a head 32, a first jamb 34, a second jamb 36, and a sill 38. The fenestration unit 10 also includes a panel unit or glazing unit 40 supported by the frame 30. The glazing unit 40 may be any of a variety of configurations, but in some embodiments is an insulated glass (IG) unit. As shown, the fenestration unit 10 is configured as a casement window, but any of a variety of configurations (fixed, single hung, double hung, awning or other) are also contemplated.

As shown, the frame 30 may be a wood frame (e.g., aluminum clad wood) design. However, vinyl, fiberglass, or other materials may be implemented for the frame 30. The frame 30 also includes on outer perimeter P and has a front face 42, or interior face 42, as well as a back face 44, or exterior face 44 (FIG. 3).

As shown in FIGS. 1 to 3, the fenestration unit 10 includes one or more installation features for facilitating installation of the fenestration unit 10. For example, as shown, the fenestration unit 10 may include one or more of the following installation features: an anchoring clip system 100 (also described as an engagement system), a retention system including a sill spacer system 200 (FIG. 2) and an installation stabilizer system 300 (FIG. 1), a weather seal system 400 (FIG. 3), and an adjustment system 500 (FIG. 1).

Anchoring Clip System

As shown in FIG. 1, the anchoring clip system 100 (also described as an engagement system) includes a plurality of anchoring clips 102 secured to the outer perimeter P of the frame 30. In particular, the anchoring clips 102 are coupled to the first jamb 34 and the second jamb 36 (e.g., three to each). As shown, the anchoring clip system 100 includes six (6) anchoring clips 102, although greater (e.g., 6, 8, 10, 12, etc.) or fewer (e.g., 4 or 2) anchoring clips 102 are contemplated. Generally, embodiments will include at least four (4) anchoring clips 102, two upper anchoring clips 102 toward the head 32 and two lower anchoring clips 102 toward the sill 38. As the dimensions of the fenestration unit 10 increase, more anchoring clips 102 may be warranted to help ensure proper anchoring of the fenestration unit 10, where that functionality is described in greater detail below.

In use, each of the anchoring clips 102 can be set at an intended depth, or gauged, for installation (e.g., to accommodate jamb extensions and/or drywall returns). The anchoring clips 102 can help gauge the fenestration unit 10 from an interior face of a building rough opening (RO). This gauging capability helps ensure a proper offset for drywall thickness or other wall features and may help eliminate or reduce such problems as jamb extensions of the fenestration unit 10 being “proud” or “recessed” from an interior face of the finished wall surface (e.g., inner drywall face). The resulting installation using the anchoring clips 102 may help ensure flush jamb extensions relative to the interior face of the wall (e.g., inner drywall face) which makes the installation of trim (e.g., casing) of the fenestration unit 10 much more efficient for subsequent detailing steps (e.g., finish carpenters).

In some implementations, the anchoring clips 102 are initially provided to an installer (e.g., shipped or delivered to the installer) in a stowed configuration, for example as shown in FIG. 4. The installer (not shown) removes, flips, or rotates a portion of the anchoring clips 102 around, and reinserts a portion of the anchoring clips 102 to a desired overall depth by pushing to engage a retention feature (e.g., slot) of the anchoring clips 102. In various examples, the portion of the anchoring clips 102 may be both removed by the installer and reinserted without the use of tools. As referenced above, a typical, or average sized fenestration unit 10 will have four (4) to six (6) anchoring clips 102, although fewer or greater anchoring clips 102 are contemplated. As part of the installation process, an installer (not shown) will flip (rotate axially) the anchoring clips 102 around from the position shown in FIG. 4 to that shown in FIGS. 1 to 3 as part of installation prep work. In some designs, the anchoring clips 102 may be adjustable for different installation depths (e.g., to accommodate ½ inch or ⅝-inch interior drywall thickness).

Anchoring clips 102 may also have different adjustment settings or features on different portions of the anchoring clips 102 such that the anchoring clips 102 may be flipped to accommodate different (e.g., greater) adjustability. For example, one portion (e.g., one leg) of the anchoring clip 102 may have a first set of adjustment features (e.g., to accommodate ½ inch or ⅝-inch interior drywall thickness offsets) and another portion (e.g., another leg) of the anchoring clip 102 may have a second set of adjustment features (e.g., multiple slots for ⅛" incremental adjustment over a desired distance).

Figure 5:
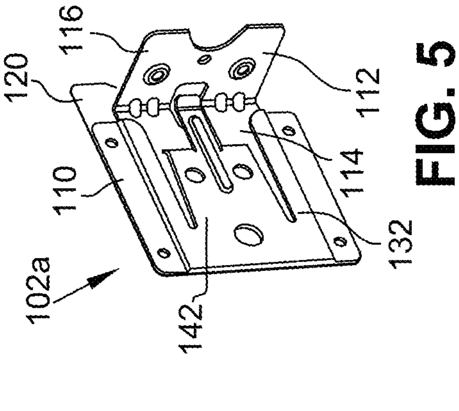
FIG. 5 depicts an anchoring clip of the fenestration unit of FIG. 1 from an isometric view, according to some embodiments.

With the foregoing in mind, as shown in FIGS. 1 to 4, the anchoring clips 102 may each be substantially similar to one another and may be described cumulatively in association with a first one of the anchoring clips 102, an example design of which (a first anchoring clip 102*a*) is depicted from a perspective view in FIG. 5.

As shown in FIG. 5, the first anchoring clip 102*a* includes a carrier bracket 110 configured to be coupled to the perimeter P (FIG. 1) of the frame 30 and a coupling bracket 112. In some embodiments, the carrier bracket 110 may be coupled to the frame 30 via adhesion to the frame 30 or the carrier bracket 110 may be coupled to the frame 30 via fasteners. However, other attachment methods are contemplated, including adhesives, heat bonding, integral formation, or other methods. The coupling bracket 112 is securable to the carrier bracket 110 such that the coupling bracket 112 can be transitioned between a first stowed configuration and a second installation configuration. The first anchoring clip 102*a* is optionally made from stamped sheet metal (e.g., galvanized steel) or other appropriate material/manufacturing method. Although the carrier bracket 110 is shown as a separate component from the frame 30 (e.g., pre-attached at the factory or other location remote from the installation site), the carrier bracket 110 or features thereof may be integrally formed (e.g., molded, machined, routed, etc.) into the frame 30 as part of a manufacturing process, for example.

Figure 6:
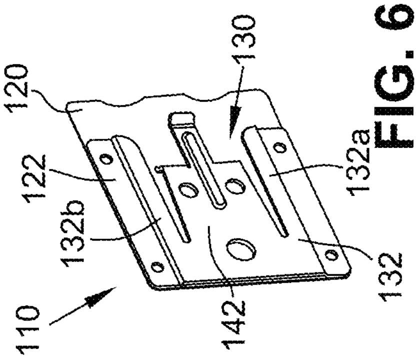
FIGS. 6 and 7 are isometric views of a carrier bracket of the anchoring clip of FIG. 5, according to some embodiments.
Figure 7:
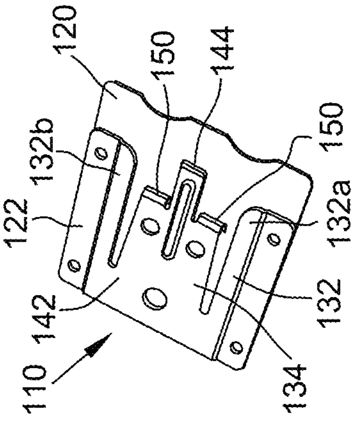

FIGS. 6 and 7 are isolated, isometric views of the carrier bracket 110, according to some embodiments. As shown, the carrier bracket 110 includes a backplate 120 and a receiver 122.

Figure 8:
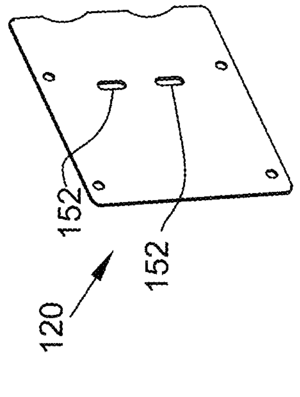
FIG. 8 is a backplate of the carrier bracket of FIGS. 6 and 7, according to some embodiments.
Figure 9:
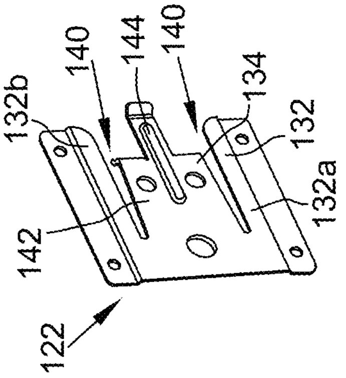
FIG. 9 is an isometric view of a receiver of the carrier bracket of FIGS. 6 and 7, according to some embodiments.

FIG. 8 shows the backplate 120 from an isometric view, according to some embodiments. The backplate 120 is optionally secured to the receiver 122 using rivets, welding, adhesives, co-casting/molding, or other methods. Though shown, in some embodiments, the backplate 120 may be omitted from the carrier bracket 110. FIG. 9 shows the receiver 122 from an isometric view, according to some embodiments.

As shown, the carrier bracket 110 defines a retaining pocket 130 for receiving the coupling bracket 112. The carrier bracket 110, and more specifically the receiver 122, has a retaining lip 132 and a retention member 134.

The retaining lip 132 acts as a guide and a retainer under which the coupling bracket 112 may be slid. The retaining lip 132 and the optional backplate 120 define the retaining pocket 130. Where the backplate 120 or analogous structure is not included, the retaining pocket 130 may be defined by the receiver 122 and the portion of the fenestration unit 10 underlying the first anchoring clip 102*a*. The retaining lip 132 may define a first side portion 132*a* and a second side portion 132*b* toward the edges of the retaining pocket 130 for securing corresponding portions of the coupling bracket 112.

The retention member 134 may be formed by a portion of the retaining lip 132. As shown in FIG. 9, the retaining lip 132 includes a pair of cutouts 140 forming a flex tab 142 of the retention member 134 that is resiliently deflectable. The retention member 134 further includes a release handle 144 that projects from the flex tab 142. As shown in FIG. 7, the retention member 134 further includes one or more catches 150, also described as a tooth 150 or a pawl 150, for engaging with the coupling bracket 112. For example, the release handle 144 may be oriented to project toward the front, or interior side, of the frame 30, the release handle 144 being operable to be lifted away from the frame 30 to actuate, or release, the retention member 134 from the first detent 174 (e.g., as shown in FIG. 10).

In use, the flex tab 142 may be outwardly deflected to release, or translate, the one or more catches 150 in an outward direction, and once released the flex tab 142 will resiliently flex back into its original position. As shown in FIG. 8, the backplate 120 may include receiving slots 152 for receiving the ends of the one or more catches 150. These receive slots 152 may enhance the overall resistance to pullout forces that the retention member 134 may exhibit without being released.

Figure 10:
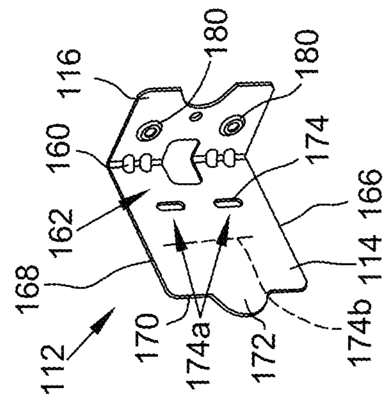
FIG. 10 shows a coupling bracket of the anchoring clip of FIG. 5 from an isometric view, according to some embodiments.

FIG. 10 shows the coupling bracket 112 from an isometric view. As shown, the coupling bracket 112 includes a first leg 114 and a second leg 116 extending from the first leg 114 and an angular offset (e.g., at an approximately orthogonal angle). The first leg 114 is configured to be slidably received by the carrier bracket 110. The second leg 116 is configured to be secured to framing surrounding a rough opening (RO) in a building structure using one or more fasteners (e.g., nails or screws). If desired, the two legs 114, 116 may be reversible in function (both the first and second legs 114, 116 are configured to be slidably received by the carrier bracket 110 and both are configured to be secured to framing surrounding the rough opening (RO) (see, e.g., design shown in FIG. 13). As shown, the first and second legs 114, 116 may have one or more buttresses 160 or other reinforcing features to help reinforce the first and second legs 114, 116 against relative bending.

The second leg 116 of the coupling bracket 112 optionally includes a release aperture 162 through a thickness of the second leg 116. As can be visualized with reference to FIG. 5, the release handle 144 is accessible (e.g., using a screwdriver or other tool) through the release aperture 162 from the interior, or front side of the fenestration unit 10. The release aperture 162 may also extend into the first leg 114, as shown. The release aperture 162 is generally positioned at the intersection, or corner of between the first and second legs 114, 116.

As shown, the first leg 114 has first and second edges 166, 168 that are opposite one another, a length, and a leading end 170 at one end of the length including an insert guide 172 in the form of a rounded projection. The insert guide 172 may assist with aligning and inserting the first leg 114 into the carrier bracket 110 as the leading end 170 is inserted into the carrier bracket 110. In some embodiments, including embodiments where the two legs 114, 116 are reversible in function, both the first leg 114 and the second leg 116 may include the insert guide 172. The first leg 114 also has one or more detents 174 (a pair of first detents 174*a* as shown) at one or more longitudinal positions along the length of the first leg 114. The one or more detents 174 may take the form of slots through the thickness of the first leg 114 as shown, but other configurations (e.g., partial depth detents) may also be employed. The one or more longitudinal positions of the one or more detents 174 are selected according to a desired offset of the second leg 116 from the front face 42 of the frame 30 when the coupling bracket 112 is in the installation configuration. For reference, a possible location for a pair of second detents 174*b* is designated generally by broken lines in FIG. 10.

The second leg 116 has one or more fastener apertures 180 operable to receiver one or more fasteners (not shown), such as screws or nails. The second leg 116 also has a length, which may be selected to ensure sufficient overlap with the framing surrounding a rough opening (RO) (not shown) to ensure the fasteners are able to bite into the framing. The fastener apertures 180 may be recessed or countersunk in order to allow screw heads to be mounted flush. In this way, the fasteners will not interfere with drywall or other wall treatment installed over the second leg 116. The coupling bracket 112 may be fastened to the rough opening (RO) and removed from the rough opening (RO) without damaging the components of the coupling bracket 112. The coupling bracket 112 may be removed from the rough opening (RO) using standard tools (e.g., a screwdriver). The one or more fastener apertures 180 may be placed at different lengths along the second leg 116 to account for differences in drywall thickness and lengths of different spaces between the frame 30 and the rough opening (RO).

In FIG. 5, the first anchoring clip 102*a* is in the installation configuration, with the second leg 116 of the coupling bracket 112 projecting outwardly relative to the carrier bracket 110. As shown, the first leg 114 is sufficiently inserted into the retaining pocket 130 that the retaining lip 132 extends over the first leg 114. As shown, the first side portion 132*a* (FIG. 9) and the second side portion 132*b* (FIG. 9) of the retaining lip 132 are positioned toward the edges of the retaining pocket 130 and are secured over the edges of the coupling bracket 112. The one or more catches 150 (FIG. 7), also described as teeth 150, engage into the one or more detents 174 (the first pair of detents 174*a*) of the first leg 114. The one or more catches 150 also optionally extend into the receiving slots 152 (FIG. 8) of the backplate 120 to help lock the coupling bracket 112 in position. In order to release the catches 150 from the detents 174, a user may press against, or lift, the release handle 144 (FIG. 7) and flex the flex tab 142, thereby lifting the catches 150 from the detents 174.

As shown in FIGS. 1, 2 and 4, the plurality of anchoring clips 102 are secured to the frame 30 at a desired depth from the front face 42 of the frame 30 (e.g., the carrier bracket 110 can be mounted flush or approximately flush to the front face 42 of the frame 30). The plurality of anchoring clips 102 are optionally secured proximate the tops and bottoms of the first and second jambs 34, 36, respectively, with two (2) additional anchoring clips 102 positioned on each of the jambs 34, 36 at an intermediate position, respectively. In some embodiments, the plurality of anchoring clips 102 may be spaced apart at substantially similar intervals along the first and second jambs 34, 36 respectively.

In the installation configuration as shown in FIGS. 1-3, the second legs of each of the coupling brackets, including the second leg 116 of the coupling bracket 112 (FIG. 5), projects away from the center of the frame 30, outwardly from the perimeter P (FIG. 1) of the frame 30. As shown in FIG. 4, when in the stowed configuration, the second legs of each of the anchoring clips 102, including the second leg 116 of the coupling bracket 112 (FIG. 5), projects inwardly away from the perimeter P (FIG. 1) toward the center of the frame 30. In some embodiments, the second legs 122 extend substantially flush to the front face 42, or interior face 42 of the frame 30 when the coupling brackets 112 are in the stowed configuration.

Figure 11A:
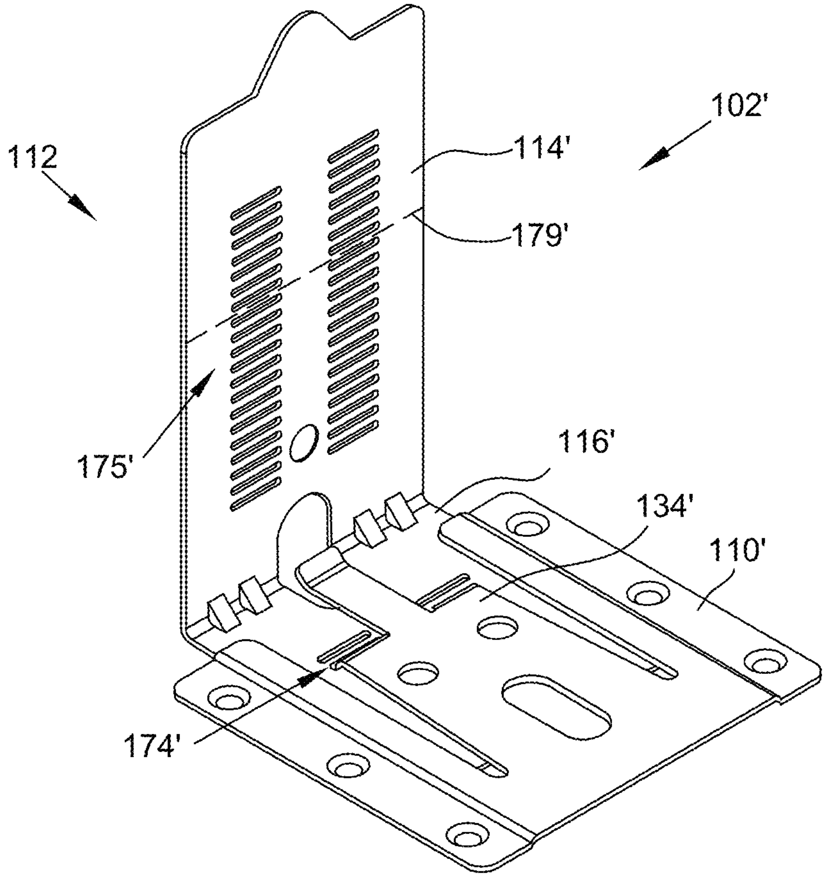
FIG. 11A is an isometric view of another anchoring clip design of the fenestration unit of FIG. 1, according to some embodiments.

FIG. 11A shows another design for the anchoring clip 102 in the form of anchoring clip 102'. Anchoring clip 102' may include features similar to the first anchoring clip 102*a*. As shown, anchoring clip 102' has a plurality of pairs of detents 174' along the length of the first leg 114', as well as a plurality of pairs of detents 175' along the length of the second leg 116'. Thus, the first and second legs 114', 116' can be reversibly positioned in the carrier bracket 110' of the anchoring clip 102'. In some examples, the plurality of pairs of detents 174' permit the retention member 134' to be releasably locked at first and second offset distances from the front of the frame 30 as desired. For example, the second offset distance may be approximately 0.125 inches greater than the first offset distance, such that the anchoring clip 102' is configured to accommodate different installation depths, for example to accommodate different thickness wall coverings (e.g., drywall) or fenestration unit features (e.g., jamb extended fenestration units or handles). In some embodiments, the anchoring clip 102' includes built-in grooves along the length of either the first leg or second leg 114', 116' that act as gauges for determining the correct installation depth. There may be any of a variety of detent configurations. For example, the plurality of pairs of detents 175' permit even further adjustability, across a plurality of depths at any desired increments (e.g., 0.0625 inches, 0.125 inches or other). In other embodiments, the number of plurality of pairs of detents 175' may be minimized to reduce error in installation.

In some embodiments, the anchoring clip 102' may include one or more coin lines or indented lines 179' across a width of the anchoring clip 102'. The intended line may extend between the plurality of pairs of detents 175'. The indented line 179' may be positioned either of the first or second legs 114', 116' and may allow an installer to shorten the length of the anchoring clip 102'. For example, after the installer reinserts the coupling bracket 112' into the carrier bracket 110', the coupling bracket 112' may extend too far away from the frame 30, which may affect the installation of features around the fenestration unit 10 such as additional drywall or paint. To shorten the coupling bracket 112', the installer may bend either the first or second leg 114' 116' back-and-forth along the indented line 179' such that a portion of first or second leg 114' 116' is broken off and removed. Shortening the coupling bracket 112' may further permit the adjustability of the anchoring clip 102'. In some examples, the fenestration unit 10 is provided with a kit of differently configured anchoring clips (not shown) having different lengths and/or detent location(s) corresponding to different installation depths. The plurality of differently configured anchoring clips may be color coded, marked with numbering, lettering, or symbols, or otherwise identified to facilitate user selection of an appropriately-sized bracket for a particular installation depth of the fenestration unit 10 in the rough opening (RO).

FIGS. 11B-11E show yet another design for the anchoring clip 102 in the form of anchoring clip 102". Anchoring clip 102" may include features similar to the first anchoring clip 102*a* or the anchoring clip 102'. Anchoring clip 102" illustrates that the various engagement/adjustment features of the anchoring clip 102" may be interchanged between the carrier bracket and coupling bracket components. For example, as shown with the anchoring clip 102" a plurality of detents 178" positioned on a carrier bracket 110" of the anchoring clip 102" instead of a first leg 114" or second leg 116" of the anchoring clip 102" as shown in other embodiments.

Figure 11C:
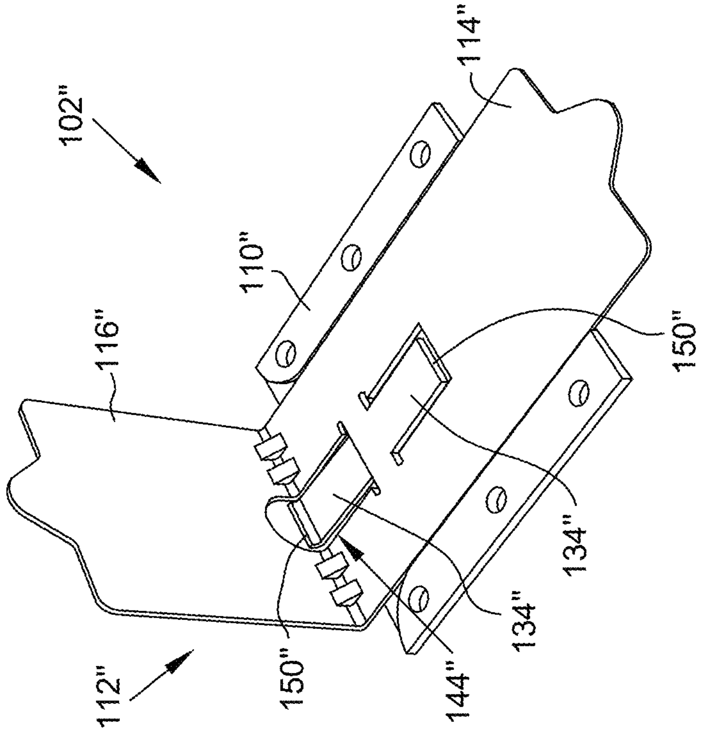
FIGS. 11B, 11C, 11D, and 11E are isometric view of another anchoring clip design of the fenestration unit of FIG. 1, according to some embodiments.
Figure 11B:
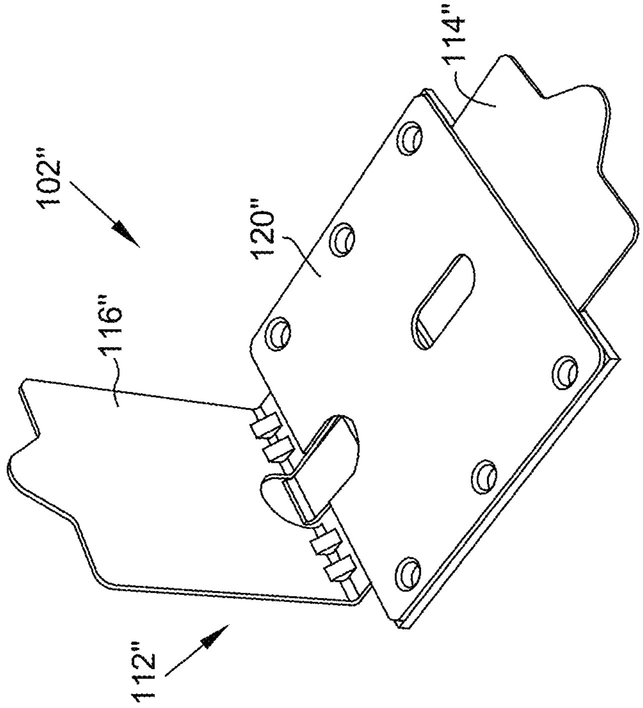

As shown in FIG. 11B, the anchoring clip 102" may include a coupling bracket 112" positioned between a backplate 120" and the carrier bracket 110". The backplate 120" and the carrier bracket 110" may define a retaining pocket therebetween to receive the coupling bracket 112". Though shown in some embodiments, the backplate 120" may be omitted. In some embodiments, the frame 30 may instead act as the backplate 120". FIG. 11C shows the anchoring clip 102" with the backplate 120" removed.

Figure 11E:
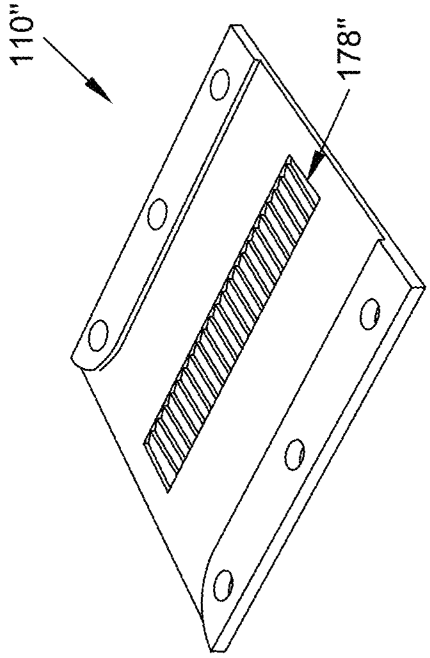

As shown in FIG. 11E, the carrier bracket 110" may include the plurality of detents 178" or a row of detents 178" along a length of the carrier bracket 110". Additionally, the detents 178" may be formed as depressions (e.g., rather than through holes) and include a serrated, or sawtooth profile for better engagement. The serrated, or sawtooth profile may accommodate rocking of the coupling bracket 112" along the row of detents 178" to allow the coupling bracket 112" to advance to the desired position.

Figure 11D:
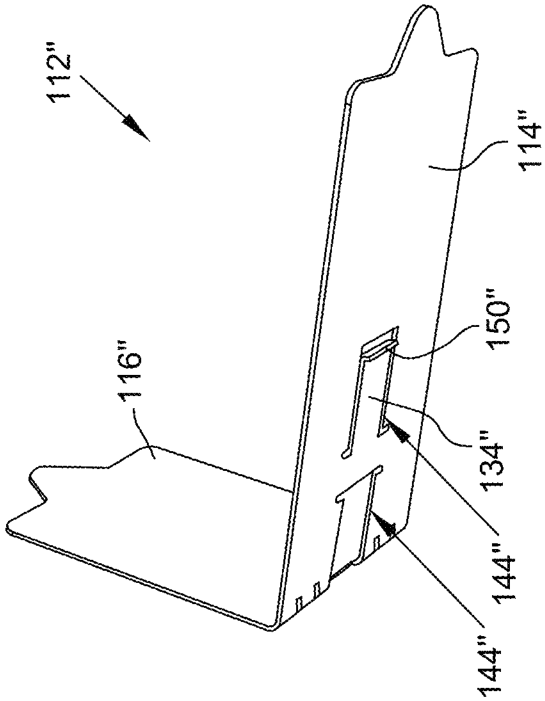

As shown in FIGS. 11C and 11D, the carrier bracket 112" may include a retention member 134" on a first leg 114" of the anchoring clip 102". The retention member 134" may include one or more catches 150", also described as a tooth 150" or pawl 150", for engaging with the carrier bracket 110", and in particular the detents 178". The tooth 150" or pawl 150" may be sized to "catch" within the depressions defined by the detents 178" to hold the coupling bracket 112" in the desired position. In the illustrated embodiment, and as shown in FIG. 11D, the retention member 134" includes a guide 144", similar to release handle 144, which may be configured to help guide a tool (e.g., a screwdriver) under the retention member 134" to release the catch 150" from the detents 178" for adjustment purposes. Additionally, or alternatively, the guide 144" may be configured as a handle, similar to handle 144, where the guide 144" may be depressed to accomplish a rocker effect to lift the catch 150" from the detents 178" for adjustment purposes.

Though not shown, similarly to other embodiments, it is also contemplated that a second leg 116" of the anchoring clip 102" includes a second retention system (e.g., similar to retention system 134") such that the first and second legs 114", 116" can be reversibly positioned in the carrier bracket 110" and engage the plurality of detents 178". In some examples, the plurality of detents 178" permit the retention member 134" to be releasably locked at a plurality of offset distances from the front of the frame 30 as desired. This may accommodate, for example, different thickness wall coverings (e.g., drywall) at increments including, but not limited to increments of 0.0625 inches, 0.125 inches, or others. There may be any of a variety of detent configurations to achieve any desired increment.

Sill Spacer System

Figure 14:
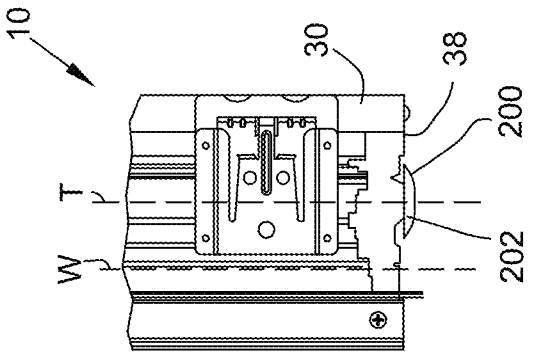
FIG. 14 is a closeup view of a lower corner of the fenestration unit of FIG. 1, according to some embodiments.
Figure 13:
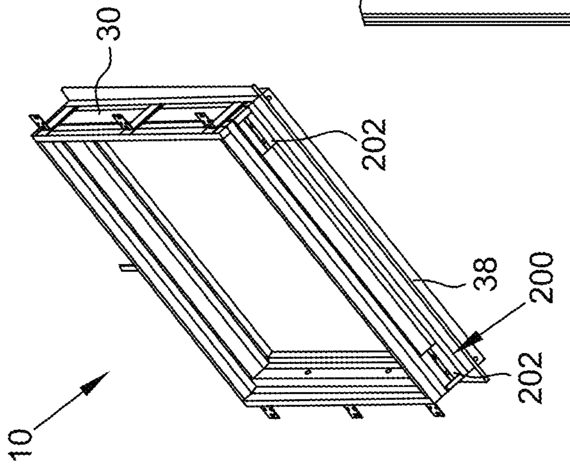
FIG. 13 is a bottom, perspective view of the fenestration unit of FIG. 1, according to some embodiments.
Figure 12:
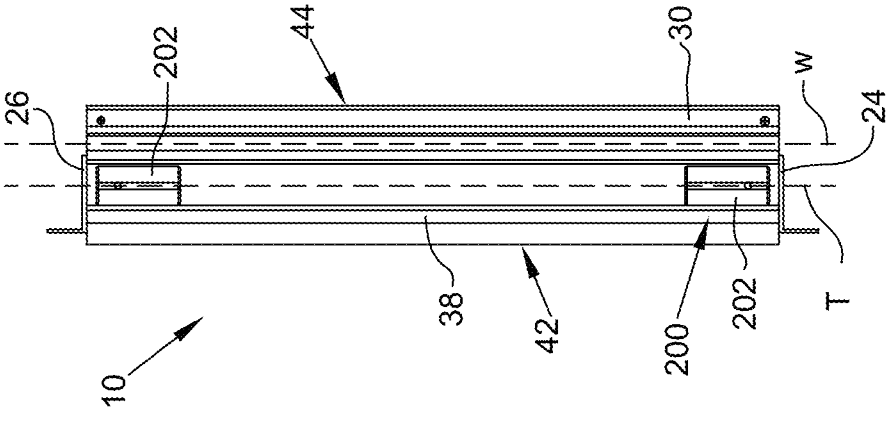
FIG. 12 is a bottom view of the fenestration unit of FIG. 1, according to some embodiments.

FIGS. 12 to 14 illustrate a pre-spacing feature of the fenestration unit 10 (e.g., a "pre-spaced window") in the form of sill spacer system 200 at the sill 38. FIGS. 12 to 14 show the fenestration unit 10 from bottom, bottom perspective, and enlarged side views, respectively. In some embodiments, the sill spacer system 200 provides a convenient mechanism for positioning and leveling the fenestration unit 10 inside the rough opening (RO). In some embodiments, the sill spacer system 200 facilitates centering of the fenestration unit 10 within the rough opening (RO) by reducing friction between frame 30 of the fenestration unit 10 and the rough opening (RO) as they move against each other. The sill spacer system 200 establishes a gap between the rough opening (RO) and the sill 38 to make it easier for an installer to adjust the fenestration unit 10 positioning (e.g., insert a pry bar or other tool under the sill 38 of the fenestration unit 10 for lifting and leveling). Standard wood shims, or other shims, can be slid under the sill spacer system 200 for leveling the fenestration unit 10 within the rough opening (RO). As described below, the sill spacer system 200 may be adapted to prevent damage to the sill flashing tape or other features on the bottom of the rough opening (RO) framing (e.g., the sill spacer system 200 may have "line contact" and/or be rounded to avoid damage). And, due to the pre-attached nature of the sill spacer system 200, the number of additional, separate installation shims (e.g., traditional wood shims, polymeric shims, or otherwise) needed may be reduced as well.

Figure 17A:
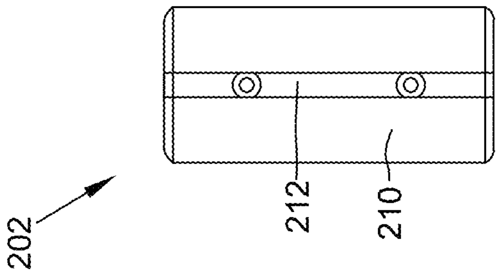
FIGS. 15A, 16A, and 17A shows a sill spacer of the fenestration unit of FIG. 1, according to some embodiments.
Figure 15A:
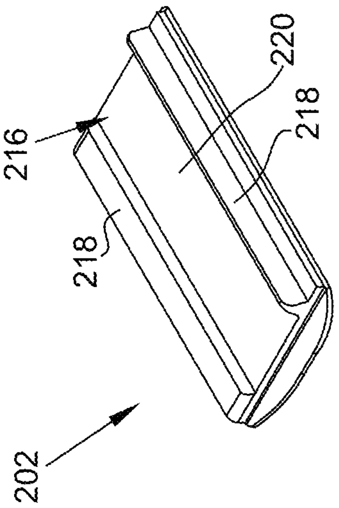
Figure 16A:
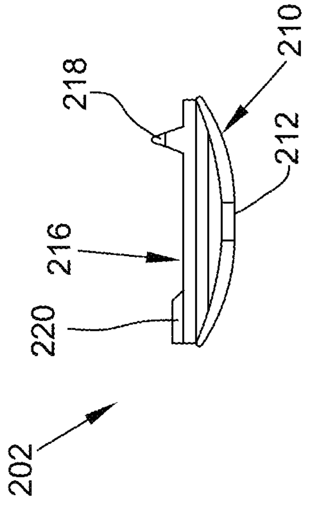

The sill spacer system 200 includes one or more sill spacers 202, such as a pair of sill spacers 202, attached to the bottom of the frame 30 at the sill 38. FIGS. 15A, 16A, and 17A illustrate one of the sill spacers 202, according to some embodiments. FIG. 15A is an isometric view, FIG. 16A is a side, or end view, and FIG. 17A is a bottom view. As shown, the sill spacer 202 includes a lower contact surface 210 that is rounded. If desired, the lower contact surface 210 may have a flattened apex 212. Regardless, as shown, the sill spacer 202 defines a smooth profile when viewed from the end, the sill spacer 202 having a rounded profile.

In some embodiments, one or more of sill spacers 202 may include materials or coatings that have bright colors, fluorescent or fluorescing properties, and/or reflective properties. These features of the one or more sill spacers 202 may provide contrast against the frame 30 to help an installer find the one or more sill spacers 202 quickly during installation of the fenestration unit 10.

The sill spacer 202 also optionally includes an upper attachment surface 216 with one or more projections 218 and/or grooves 220 configured to fit within features of the bottom of the sill 38 to facilitate attachment thereto. In some embodiments, the bottom of the sill 38 includes one or more longitudinal projections and/or grooves (FIGS. 12 and 17C) that accommodate and form a complementary fit with the upper attachment surface 216. Additionally, or alternatively, the sill spacer 202 may include one or more apertures to receive a fastener (e.g., a screw) therethrough to couple the sill spacer 202 to the sill 38. The one or more apertures may be modified to accommodate other fastener types and shapes, including by not limited to a staple, to couple the sill spacer 202 to the sill 38. In other embodiments, the sill spacer 202 may be adhered to the sill 38. The sill spacers 202 optionally define a pre-selected gap width from the rough opening (RO). For example, each sill spacer 202 may defines a maximum thickness of about ¼ inches, for example. In some embodiments, the sill spacer 202 defines a maximum thickness of at least ¼ inches, although a variety of dimensions, including thinner dimensions, are contemplated.

As shown in FIGS. 12 to 14, the one or more sill spacers 202 may be pre-attached to the fenestration unit 10 (e.g., at the manufacturing location) prior to initiating any on-site installation steps. As shown, the sill spacers 202 are positioned entirely between the front face 42 and the back face 44 of the frame 30. In at least this manner, the sill spacer system 200 leaves a continuous gap (e.g., of about ¼ inches) between the bottom of the frame at the sill 38 and the rough opening (RO). In this manner, a continuous insulation and/or seal may be better formed at the sill 38 (e.g., using spray foam, or other material as desired). In some embodiments, the pair of sill spacers 202 are spaced apart from one another and are spaced from the first side 24 and the second side 26 of the fenestration unit 10.

As indicated in FIGS. 12 and 13, each of the sill spacers 202 may extend longitudinally between the first and second sides of 24, 26 the fenestration unit 10. As arranged, the sill spacers 202 are offset toward the front, or interior face 42 of the frame 30 relative to the back, or exterior face 44 of the frame 30. As indicated in FIGS. 12 and 14, the glazing unit 40 defines a center of weight W corresponding generally to the plane in which the glazing unit 40 is installed in the frame 30. The sill spacers 202 are offset from the center of weight W toward the interior face 42 along a tilt axis T such that the fenestration unit 10 tends to tip, or fall, on the sill spacers 202 in the exterior direction. In at least this manner, when the fenestration unit 10 is resting on the sill spacers 202, the fenestration unit 10, under its own weight, pushes the anchoring clip system 100 against the framing surrounding the rough opening (RO). This result helps promote a scenario in which an installer (not shown) is not required to press against the fenestration unit 10, or hold it in place, during installation, according to some embodiments. Or in different terms, the fenestration unit 10 is self-balancing in the rough opening (RO) such that the fenestration unit 10 remains in the rough opening without falling in an inward or outward direction.

Figure 16B:
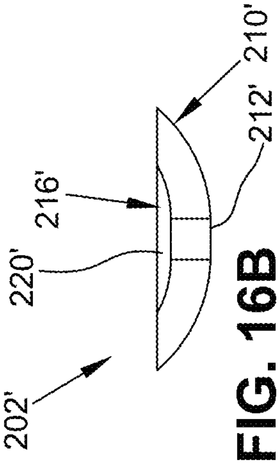
FIG. 16B is an end view of the sill spacer of FIG. 15B, according to some embodiments.
Figure 15B:
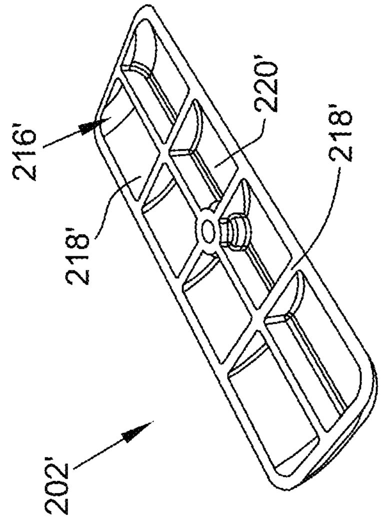
FIG. 15B is an isometric view of another design of a sill spacer of the fenestration unit of FIG. 1, according to some embodiments.

FIGS. 15B and 16B show another design for the sill spacers 202, in the form of sill spacers 202', where FIG. 15B is an isometric view and FIG. 16B is an end view. Similar to the design of FIG. 15A, the sill spacer 202' of FIGS. 15B and 16B includes a lower contact surface 210' that is rounded. If desired, the lower contact surface 210' may have a flattened apex 212'. Regardless, as shown, the sill spacer 202' defines a smooth profile when viewed from the end, the sill spacer 202' having a rounded profile. The sill spacer 202' of FIGS. 15B and 16B also optionally includes an upper attachment surface 216' with one or more projections 218' and/or grooves 220' configured to abut features of the bottom of the sill 38 to facilitate attachment thereto. Similar to the previously described designs, the sill spacer 202' optionally defines a pre-selected gap width from the rough opening (RO) (e.g., about ¼ inches, defining a maximum thickness of at least ¼ inches).

Figure 16C:
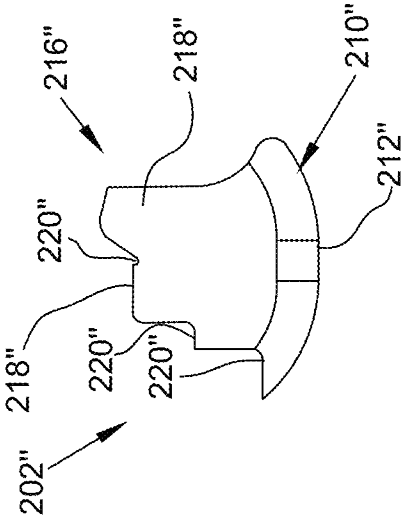
FIGS. 15C, 16C and 17C are views of another design of a sill spacer of the fenestration unit of FIG. 1, according to some embodiments.
Figure 15C:
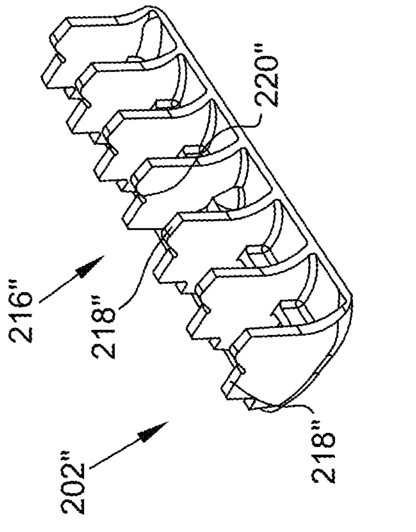
Figure 17C:
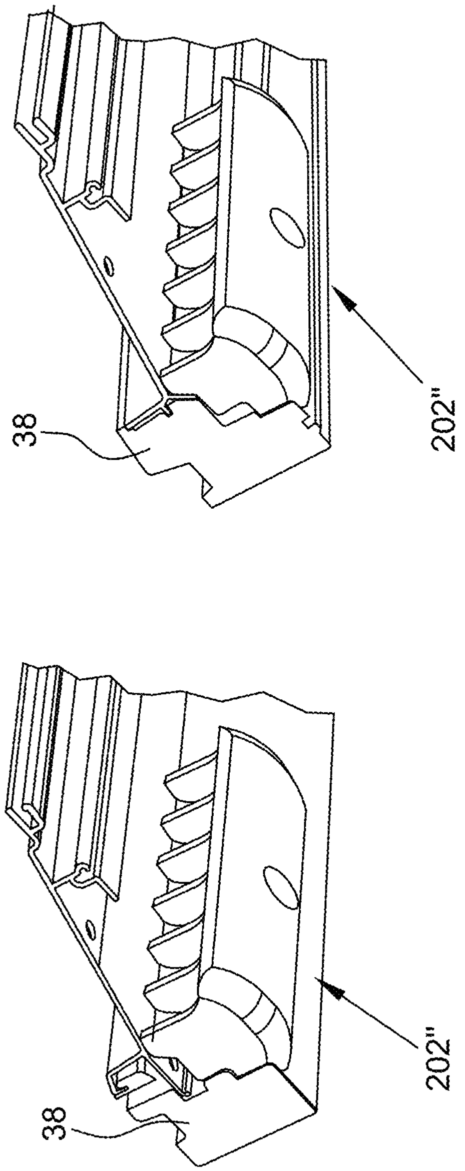

FIGS. 150, 16C, and 17C show another design for the sill spacers 202, in the form of sill spacers 202", where FIG. 15C is an isometric view, FIG. 16C is an end view, and FIG. 17C shows the sill spacer 202" of FIG. 15C coupled to the sill 38 of the fenestration unit 10. Similar to the designs of FIGS. 15A and 15B, the sill spacer 202" of FIGS. 15C and 16C includes a lower contact surface 210" that is rounded. If desired, the lower contact surface 210" may have a flattened apex 212". Regardless, as shown, the sill spacer 202" defines a smooth profile when viewed from the end, the sill spacer 202" having a rounded profile. The sill spacer 202" of FIGS. 15B and 16B also optionally includes an upper attachment surface 216" with one or more projections 218" and/or grooves 220" configured to abut features of the bottom of the sill 38 to facilitate attachment thereto. As shown, the upper attachment surface 216" defines a tiered, or staggered upper surface. Similar to the previously described designs, the spacer 202" optionally defines a pre-selected gap width from the rough opening (RO) (e.g., about ¼ inches, defining a maximum thickness of at least ¼ inches). As shown in FIG. 17C, the tiered, or staggered profile of the upper attachment surface 216" helps facilitate the sill spacer 202" engaging sill profiles that are stepped, angled, or ramped for securement thereto.

Installation Stabilizer System

As shown in FIG. 1, the installation stabilizer system 300 includes at least one retainer 302, also described as a stabilizer clip 302. The retainer 302 is optionally applied prior to any installation steps being undertaken, and at a location remote from the installation site (e.g., at a manufacturing facility). As shown, the retainer 302 is located on the head 32 of the fenestration unit 10. The retainer 302 is optionally formed as a stamped and/or cut metal piece that is bent to shape.

Figure 18A:
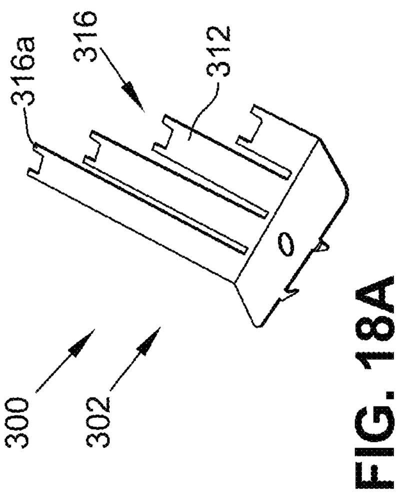
FIGS. 18A, 19A, 20A, and 21A are views of a retainer of the fenestration unit of FIG. 1, according to some embodiments.
Figure 19A:
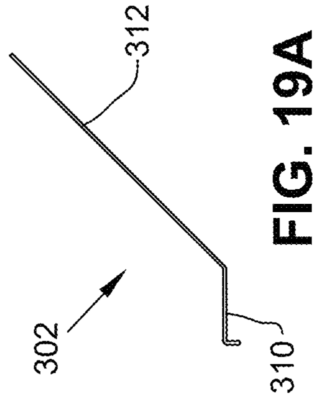

FIG. 18A is an isometric, or perspective view and FIG. 19A is a side view of one design for the retainer 302, according to some embodiments. FIGS. 18A and 19A show the retainer 302 in a natural, unbiased state. Generally, the retainer 302 is configured to permit insertion of the frame 30 within the rough opening (RO) in the structure (not shown) in a first insert direction D1 (FIG. 20A) and resist extraction of the frame 30 from the opening in a second extraction direction D2 (FIG. 21A).

As shown in FIG. 19A, the retainer 302 includes a base 310 configured to be secured to the frame 30 (FIG. 1), a plurality of flex arms 312 extending from the base 310 each including an engagement feature 316 at a terminal end of the flex arm 312. In some embodiments, the base 310 may be coupled or secured to the frame 30 via adhesion to the frame 30 or may be coupled to the frame 30 via fasteners. However, other attachment methods are contemplated. As shown in FIG. 18A, the plurality of flex arms 312 include first through fourth flex arms, although any number of flex arms (one, two, three, five, etc.) are contemplated. As shown, the plurality of flex arms 312 may be of different lengths to accommodate different spaces, or a range of space sizes, between the frame 30 and the header of the rough opening (RO).

The retainer 302 optionally includes a strap member (e.g., similar to strap member 302*a* of FIG. 18B) that extends rearwardly from the base 310. The strap member optionally includes a plurality of fastener apertures for receiving one or more fasteners (e.g., screws or nails). The strap member may be generally bendable between a stowed configuration in which it extends toward the center of the fenestration unit 10 and an extended configuration in which it extends upwardly away from the center of the fenestration unit 10.

Figure 20A:
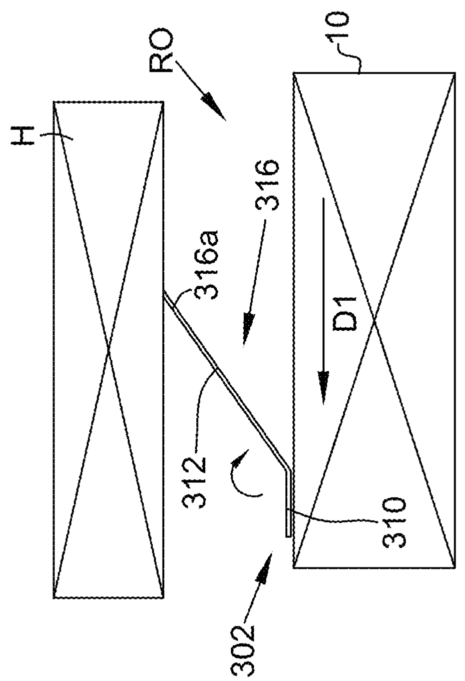
Figure 21A:
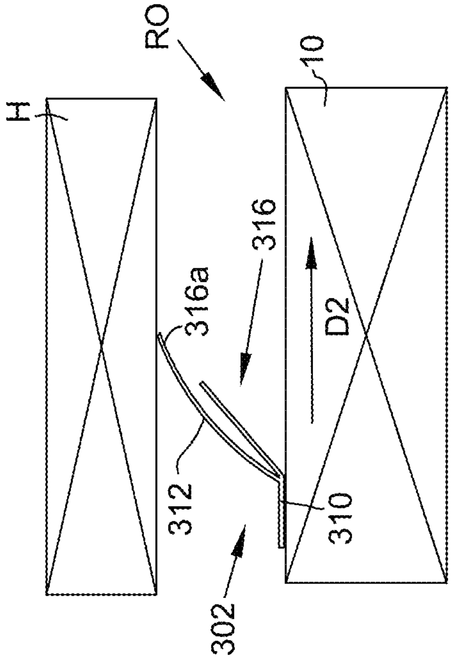

As shown in FIG. 18A, the engagement features 316 of the plurality of flex arms 312 each include an engagement edge 316*a* (FIG. 18A) including one or more sharpened edges or teeth for biting into (e.g., two projecting teeth), for frictionally engaging the header H of the framing of the rough opening (RO) (FIG. 20A). In different terms, the engagement feature 316 includes one or more teeth configured to bite into the material defining the rough opening (RO) upon movement of the frame in the interior direction (e.g., D2). In some embodiments, the sharpened edges or teeth are cut edges of material (e.g., metallic material) that may be sharp with or without additional mechanical sharpening.

As shown in FIGS. 20A and 21A, in various embodiments, during insertion of the frame 30 in the first insert direction D1 one or more of the flex arms 312 (e.g., the first of the flex arm 312*a* if a large gap is present or all four flex arms 312 if a very small gap is present between the header H and the frame 30) of the retainer 302 bends or is deflected in a first flex direction and upon movement of the frame 30 in the second extraction direction D2 such that the flex arm 312 bends in a second flex direction to resist movement of the frame 30 in the second direction D2 (e.g., toward the interior side).

In some embodiments, the retainer 302 is configured to be secured in a constrained state (compressed downward) such that the retainer 302 is compressed flat against the frame 30. The retainer 302 may be held in the constrained state using a securement member (e.g., tape). The securement member may be removed to release the retainer 302 to a deployed state such that the retainer 302 projects outwardly from the frame 30 (e.g., in a similar manner to that shown in FIG. 1).

FIG. 20A is a schematic representation of the retainer 302 engaged with a header H of the framing of a rough opening (RO). As shown FIG. 20A, the fenestration unit 10 is configured such that as the fenestration unit 10 is slid in the exterior direction, or the first insert direction D1, and is being inserted from an interior side of the rough opening RO, the retainer 302, and specifically the flex arm 312 serves as a spring body that deflects to compresses in height as the engagement edge 316*a* of the engagement feature 316 bites into the header H. The retainer 302 may self-deployed against the header H of the framing of the rough opening (RO) during installation without action or intervention by the installer. As shown in FIG. 20A, during compression, the engagement feature 316 slides against the header H. This compression and sliding action permits the retainer 302, and thus the fenestration unit 10, to be inserted in the exterior direction, or the first insert direction D1, with a first, relatively lower resistance to insertion. In various embodiments, the engagement edge 316*a* does not bite into, or otherwise prevent sliding of the engagement edge 316*a* as it is slid across the header H. This may be due to the angle of the engagement edge 316*a*. The insertion force, or force required to move in the first direction D1 may be 1 lb. or less, more than 1 lb, more than 10 lbs, or more than 15 lbs, for example. Generally, the fenestration unit 10 is tipped, or tilted back in the exterior direction and into place for final seating during insertion in the first direction D1.

FIG. 21A shows the retainer 302 deforming, and resisting movement, as the fenestration unit 12 and the retainer 302 are moved in the interior direction, or the second extraction direction D2. As shown, the flex arm(s) 312 rotate back, or kick up (or kick down, not shown) as the engagement edge(s) 316*a* of the engagement feature 316 bites into the head H and inhibits sliding of the engagement feature(s) 316 against the header H. In some examples, the flex arm(s) 312 bend or flex as a result of the movement. The extraction or tipping force, or force required to move in the second direction D2 after seating may be 1 lb. or less, more than 1 lb, 10 lbs or more, at least 15 lbs, or 15 lbs or more, for example. In some examples, the extraction force is 80 lbs or more, or approximately 88 lbs. Generally, a higher required extraction or tipping force (e.g., as compared to the insertion force) helps ensure the fenestration unit 10 remains in place after being inserted into the rough opening (RO) to permit subsequent levelling and/or securement procedures. The retainer's 302 ability to resist movement in the second extraction direction D2 may help prevent the fenestration 10 from falling out of the rough opening (RO) toward the interior.

In embodiments, any of the insertion force, extraction force, or retention force is determinable using a force gauge placed perpendicular to a vertical plane of the fenestration unit 10 on the exterior side fenestration unit 10 approximately eight inches from the top of the fenestration unit 10 along a vertical centerline of the fenestration unit 10. For the retention force, the force gauge may be pushed in an interior direction until the fenestration unit 10 is pressed out of the rough opening (RO) such that the force gauge obtains a maximum force for retention.

With insertion of the fenestration unit 10 into the rough opening (RO) the retainer 302 compresses and engages (e.g., bites) into the header H of the rough opening (RO) and optionally applies some degree of downward force on the fenestration unit 10. The function of the retainer 302 may be to help stabilize the fenestration unit 10 in the rough opening (RO) to help ensure the fenestration unit 10 does not fall back toward the interior (i.e., resists extraction in the second extraction direction D2). This self-retaining, or stabilizing feature helps allow a single installer (not shown) to complete leveling and centering tasks without having to hold the fenestration unit 10 in the rough opening (RO). Where present, the sill spacer system 200 may also contribute to this self-retaining/stabilizing functionality. As shown, the retainer 302 is compressible, and thus adjusts and adapts to a range of typical gap sizes between the head 32 and header H of the rough opening (RO). Additionally, the retainer 302 is flexible laterally, made from a spring like material, which permits side-to-side adjustment of the fenestration unit 10 within the rough opening (RO) as well as levelling of the fenestration unit 10 without substantially impeding those processes.

In some embodiments, the fenestration unit 10 may be extracted from the rough opening (RO) without damaging the retainer 302. The fenestration unit 10 may be lifted upwards by the sill 38 (e.g., either manually or with a tool) such that the retainer 302 is further compressed toward the header H of the framing of the rough opening (RO). The fenestration unit 10 may then be rotated out from the rough opening (RO) and toward the interior. This movement allows controlled release of the fenestration unit 10 from the rough opening (RO) without the need for specialized tools and without damaging to the retainer 302. The retainer 302 may be used again when re-installing the fenestration unit 10 within the rough opening (RO).

Figure 18B:
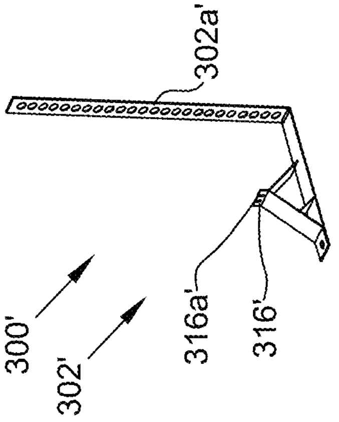
FIGS. 18B, 19B, 20B, and 21B are views of another design of a retainer of the fenestration unit of FIG. 1, according to some embodiments.
Figure 19B:
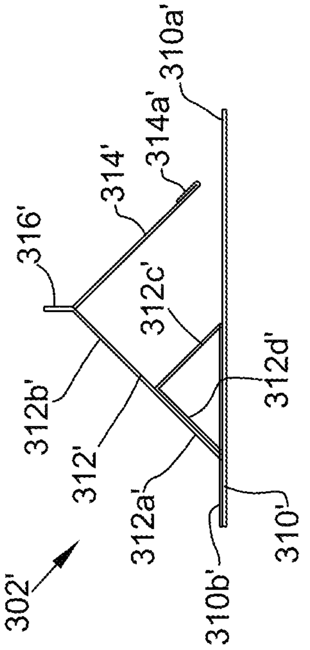

FIG. 18B is an isometric, or perspective view and FIG. 19B is a side view of another design for the retainer 302, in the form of retainer 302', also described as a stabilizer clip 302', according to some other embodiments. FIGS. 18B and 19B show the retainer 302' in a natural, unbiased state. Generally, the retainer 302' is configured to permit insertion of the frame 30 within the rough opening (RO) in the structure (not shown) in a first insert direction D1 and resist extraction of the frame 30 from the opening in a second extraction direction D2.

Figure 20B:
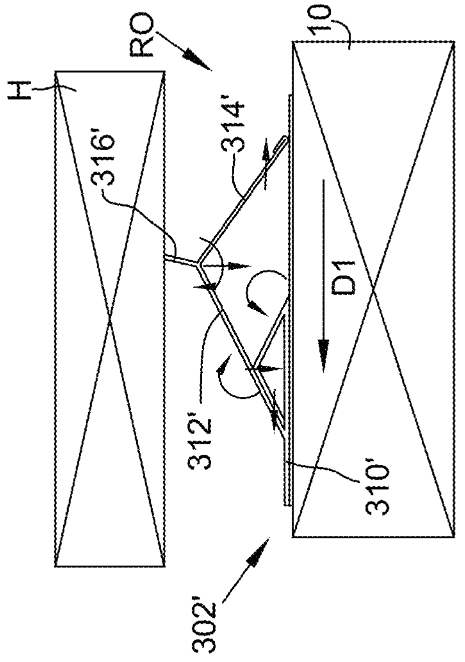
Figure 21B:
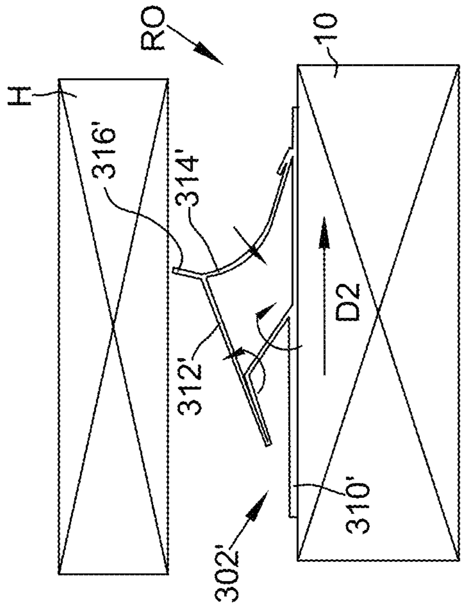

As shown in FIG. 19B, the retainer 302' includes a base 310' secured to the frame 30, a flex arm 312' extending from the base 310', a stop arm 314' extending from the flex arm 312', and an engagement feature 316' extending from the flex arm 312' and/or the stop arm 314'. As shown in FIGS. 20B and 21B, in various embodiments, the retainer 302' is operable such that during insertion of the frame 30 in the first insert direction D1, the flex arm 312' bends in a first flex direction and upon movement of the frame 30, and in the second extraction direction D2, the flex arm 312' bends in a second flex direction. As shown in FIG. 18B, the retainer 302' optionally includes a strap member 302*a'* that extends rearwardly from the base 310'.

As shown in FIG. 18B, the strap member 302*a'* optionally includes a plurality of fastener apertures for receiving one or more fasteners (e.g., screws or nails). The strap member 302*a'* is generally bendable between a stowed configuration in which it extends toward the center of the fenestration unit 10 and an extended configuration in which it extends upwardly away from the center of the fenestration unit 10.

As shown in FIG. 19B, the base 310' includes a bottom segment 310*a'* and a return segment 310*b'*. The flex arm 312' includes a slide segment 312*a*', an extension segment 312*b*', a lever segment 312*c*', and a back segment 312*d*'. The stop arm 314' also terminates in a bent end 314*a*'. And, the engagement feature 316' includes an engagement edge 316*a*' (FIG. 18B) including one or more sharpened edges or teeth for biting into, or frictionally engaging the header H of the framing of the rough opening (RO) (FIG. 20B). In different terms, the engagement feature 316' includes one or more teeth configured to bite into the material defining the rough opening (RO) upon movement of the frame in the interior direction (e.g., D2).

As shown, the return segment 310*b*' extends back on a portion of the bottom segment 310*a*'. The lever segment 312*c*' extends from the return segment 310*b*' (as shown, at an intermediate location of the base 310'). The back segment 312*d*' extends at a downward angle from the lever segment 312*c*' and the slide segment 312*a*' extends back up from, and beyond the back segment 312*d*' to the engagement feature 316'. The stop arm 314' extends back (toward the exterior, or back direction) from the engagement feature 316' and/or the extension segment 312*b*' toward the bottom segment 310*a*'. In some embodiments, the retainer 302' is configured to be secured in a constrained state (compressed downward) such that the retainer 302' is compressed flat against the frame 30. The retainer 302' may be held in the constrained state using a securement member (e.g., tape). The securement member may be removed to release the retainer 302' to a deployed state such that the retainer 302' projects outwardly from the frame 30 as shown in FIG. 1.

FIG. 20B is a schematic representation of the retainer 302' engaged with a header H of the framing of a rough opening (RO). As shown FIG. 20B, the fenestration unit 10 is configured such that as the fenestration unit 10 is slid in the exterior direction, or the first insert direction D1, and is being inserted from an interior side of the rough opening RO. The retainer 302', and specifically the flex arm 312' and the stop arm 314' serve as a spring body that compresses in height as the engagement edge 316*a*' of the engagement feature 316' bites into the header H. As shown in FIG. 20B, during compression, the peak at the extension segment 312*b*' and stop arm intersection moves downward as does the peak at the lever segment 312*c*' and slide segment 312*a*' intersection. The lever segment 312*c*' rotates forward and downward and the slide segment 312*a*' and the stop arm 314' slide outward (e.g., against the base 310'). This compression and sliding action permits the retainer 302', and thus the fenestration unit 10, to be inserted in the exterior direction, or the first insert direction D1, with a first, relatively lower resistance to insertion. In various embodiments, the engagement edge 316*a* does not bite into, or otherwise prevent sliding of the engagement edge 316*a* as it is slid across the header H. This may be due to the angle of the engagement edge 316*a*.

FIG. 21B shows the retainer 302' deforming, and resisting movement, as the fenestration unit 10 and the retainer 302' are moved in the interior direction, or the second extraction direction D2. As shown, the lever segment 312*c*' rotates back, or kicks up as the engagement edge 316*a*' of the engagement feature 316' bites into the head H and inhibits sliding of the engagement feature 316' against the header H. In some examples, the stop arm 314' deflects (e.g., bends) as a result of the movement of the lever segment 312*c*', further increasing resistance to further movement in the interior direction, or the second extraction direction D2. In other words, the stop arm 314' is operable to engage with the base 310' after the flex arm 312' bends in the second flex direction to inhibit further flexing of the flex arm 312'.

With insertion of the fenestration unit 10 into the rough opening (RO) the retainer 302' compresses and engages (e.g., bites) into the header H of the rough opening (RO) and applies a downward force on the fenestration unit 10. The function of the retainer 302' may be to help stabilize the fenestration unit 10 in the rough opening (RO) to help ensure the fenestration unit 10 does not fall back toward the interior (i.e., resists extraction in the second extraction direction D2). This self-retaining, or stabilizing feature helps allow a single installer (not shown) to complete leveling and centering tasks without having to hold the fenestration unit 10 in the rough opening (RO). Where present, the sill spacer system 200 (FIGS. 12-17C) may also contribute to this self-retaining/stabilizing functionality. As shown, the retainer 302' is compressible, and thus adjusts and adapts to a range of typical gap sizes between the head 32 and header H of the rough opening (RO). Additionally, the retainer 302' is flexible laterally, made from a spring like material, which permits side-to-side adjustment of the fenestration unit 10 within the rough opening (RO) as well as levelling of the fenestration unit 10 without substantially impeding those processes.

Although, in various examples, one or more retainers 302, 302' are secured to one or more portions of the fenestration unit 10 (e.g., frame 30), in other examples, similarly designed retainers 302, 302' are optionally secured to framing surrounding the rough opening (RO) and engage the fenestration unit 10 upon positioning of the fenestration unit 10 in the rough opening (RO).

Weather Seal System

As shown in FIG. 1, another aspect of this invention is the weather seal system 400, which may be remotely applied (e.g., at a manufacturing location) and acts as an exterior water barrier. The weather seal system 400 may be biased to a deployed state or may be otherwise described as a "pop-up" fin. In various examples, the weather seal system 400 is initially provided (e.g., shipped or transported to the installation site) in a stowed, or flattened configuration (FIG. 4) against the frame 30 of the fenestration unit 10. This flattened, or stowed position can be described as a "180° position". The weather seal system 400 may be held in the stowed position with a retaining assembly, as described below. After the fenestration unit 10 is installed and anchored (e.g., using one or more fasteners, such as screws or nails) the original installer (not shown) or another installer may separately proceed to the exterior side of the rough opening (RO) to remove the retaining assembly and transition the weather seal system 400 to the deployed state. In some examples, upon removal of the retaining assembly, the weather seal system 400 automatically pops-up, or projects outwardly from the frame 30 (e.g., at approximately 90° degrees) to rest against the exterior surface of the wall in which the rough opening (RO) is formed. As described below, the weather seal system 400 may include three-dimensional corner seals (e.g., factory applied and welded, adhered, or otherwise attached) to a head pop-up fin to provide protection against water infiltration.

In various examples, no fasteners (e.g., screws or nails) are used on the exterior side of the fenestration unit 10 (e.g., the fenestration unit 10 is secured entirely from the interior side of the rough opening (RO)). Flashing tape or other treatments may be applied around the perimeter of the fenestration unit 10, over the weather seal system 400 to seal the fenestration unit 10 to the exterior surface of the wall in which the rough opening (RO) is formed. In various examples, the exterior surface of the wall may include a weather resistant barrier (e.g., Tyvek® home wrap available from DuPont de Nemours, Inc.).

FIG. 1 shows the weather seal system 400 from an interior view. As shown, the weather seal system 400 is secured includes a fin assembly 410 that is outwardly biased to project radially outward from the perimeter of the frame 30 when unconstrained. FIG. 4 shows the fenestration unit 10 with various installation features in a stowed configuration. As shown in FIG. 4, the weather seal system 400 also includes a retaining assembly 412 releasably securing the fin assembly 410 in a constrained state such that the fin assembly 410 is compressed toward the frame 30 in a stowed configuration.

As shown in FIG. 3, the fin assembly 410 includes a plurality of fins 420, including a head fin 420*a* (also described as a top fin 420*a*), a first jamb fin 420*b*, a second jamb fin 420*c*, and a sill fin 420*d*. As shown in FIG. 3, the fin assembly 410 also optionally includes a first corner bridge seal 430 and a second corner bridge seal 432. Optionally, a third corner bridge seal may be positioned between the first jamb fin 420*b* and the sill fin 420*d* and a fourth corner bridge seal may be positioned between the second jamb fin 420*c* and the sill fin 420*d*.

Figure 22:
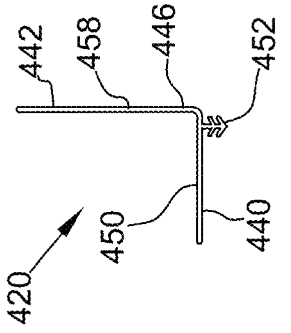
FIG. 22 is an end view of a fin of the fenestration unit of FIG. 1, according to some embodiments.
Figure 23A:
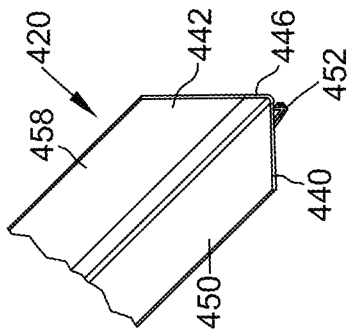
FIG. 23A is an isometric view of the fin of FIG. 22, according to some embodiments.

FIG. 22 is an end view and FIG. 23A is an isometric view of one of the plurality of fins 420 (each may have a substantially similar construction, with differences in length to correspond to the portion of the frame 30 to which they are attached). As shown, each of the plurality of fins 420 has a coupling portion 440 and a projection portion 442, with a hinge portion 446 between the coupling portion 440 and the projection portion 442. The coupling portion 440 is coupled to the outer perimeter P (FIG. 1) of the frame 30 and the projection portion 442 is biased by the hinge portion 446 to project radially outward from the outer perimeter P of the frame 30 by the hinge portion 446. In some embodiments, the coupling portion 440 may be coupled to the frame 30 via adhesion to the frame 30. However, other attachment methods are contemplated, including any of those previously described. In some embodiments, the hinge portion 446 is formed of a first material and the projection portion 442 is formed of a second material different than the first material. The first material of the hinge portion 446 may be a first polymeric material and the second material may be a second polymeric material that is different than the first polymeric material. Generally, the first material may be more flexible than the second polymeric material (e.g., the first material being elastic in nature and the second material being generally less elastic, or inelastic). In terms of manufacture, the coupling portion 440, the projection portion 442, and the hinge portion 446 may be co-extruded or co-molded parts.

In some embodiments, the first material is a Nitrile Thermoplastic Elastomer (TPE), such as that sold under the tradename Auroraflex™ by Aurora Plastics, for example, although a variety of materials are contemplated. In some embodiments, the second material is glass or mineral filled polypropylene, or a thermoplastic polyolefin, such as that sold under the tradename RAVATUF® 400X by Ravago Manufacturing Americas, for example, although a variety of materials are contemplated.

As shown, the coupling portion 440 includes an elongate, relatively planar, thin rectangular base 450 and an attachment feature 452 extending (e.g., perpendicularly) from the base 450. The attachment feature 452 is configured to be inserted into a complementary feature (e.g., an accessory channel, or kerf) of the frame 30 to secure the fin 420 to the frame 30. The attachment feature 452 may be a barbed projection that is flexible and allows the attachment feature 452 to be inserted into the complementary feature of the frame 30 but resist removal therefrom. The attachment feature 452 may be described as a "Christmas tree" configuration and may be formed of the first and second materials, with the second material forming the base or trunk of the attachment feature 452 and the first material forming the flexible branches of the attachment feature 452.

The projection portion 442 also includes an elongate, relatively planar, thin body 458. As shown, the projection portion 442 may be substantially free of any apertures or openings suitable for receiving a fastener, such as a nail or screw, to attach the projection portion 442 to the framing of the rough opening (RO) or wall of the building in which the fenestration unit 10 is to be installed. In various examples, the projection portion 442 need not include such features, as the plurality of fins 420 do not provide substantial structural support, but instead are designed primarily to provide exterior water barrier functionality.

The hinge portion 446 is located between the coupling portion 440 and the projection portion 442, being coupled to each respectively. The hinge portion 446 is configured to flex between a folded state with the projection portion 442 folded against the coupling portion 440 and an extended state with the projection portion 442 extending away from the coupling portion 440 at an angle between the coupling portion 440 and the projection portion 442, such as that shown in FIGS. 22 and 23A (e.g., 90 degrees, or greater than 90 degrees, such as 100 degrees). The hinge portion 446 has a width that is selected to allow the projection portion 442 and the coupling portion to not only be angularly displaced relative to one another, but also to be laterally displaced to smaller and greater lateral offsets.

For example, by having a small portion of the hinge portion 446 projecting vertically in the 90-degree position, the edges of the coupling portion 440 and projection portion 442 define a relatively small lateral offset (in the interior-exterior direction as installed) from one another. And, by extending a larger portion of the hinge portion 446 width in the lateral direction (in the interior-exterior direction as installed) the edges of the coupling portion 440 and the projection portion 442 are at a greater lateral offset from another. In this manner, the hinge portion 446 provides functionality of the fin 420 to accommodate variations in wall thickness when the fenestration unit 10 is installed in a rough opening (RO). In some embodiments, the hinge portion 446 is at least ⅛-inch, ¼-inch, ⅜ inch, or ½ inch wide to facilitate sufficient depth adaptability to the fin 420.

Figure 23B:
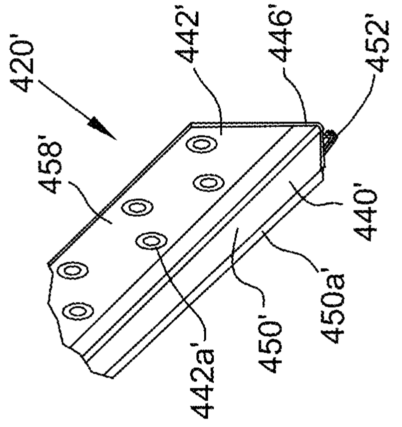
FIG. 23B is an isometric view of another fin design similar to that of FIG. 23A, according to some embodiments.

FIG. 23B shows another variation in design applicable to one, some, or all of the fins 420, as shown as fin 420'. As shown, the base 440' is somewhat narrower in the design depicted in FIG. 23B as compared to the design in FIG. 23A. Moreover, the projection portion 442' includes a plurality of dimples 442*a*' formed into the outer face of the projection portion 442' (i.e., the face that projects away from the building surface to which the projection portion 442' is ultimately abutted). These dimples 442*a*' have a thickness, and project from the back side of the projection portion 442' to help create gaps or spacing, also described as standoff, between the particular fin 420' and the surface to which the fin 420' is ultimately abutted. This design in FIG. 23B is typically applied for the fin 420 corresponding to the sill 38 of the fenestration unit 10, which assists with ensuring that external air, or more specifically external air pressure, is allowed to pass under the sill 38 to the air/water barrier between the sill 38 and the rough opening (RO). The standoff, however, does not interfere with the ability of the fin 420' to shed water, helping ensure a water-tight installation. As shown, the dimples 442*a*' are in a staggered arrangement along the length of the fin 420'. Each of the dimples 442*a*' are shown to have a round, dome-shaped profile but any of a variety of shapes are contemplated (e.g., criss-cross, square, diamond, or other patterns and shapes and combinations thereof). The dimples 442*a*' may be cold formed, molded, or otherwise incorporated into the fin 420'.

Additionally, as shown in FIG. 23B, the fin 420' optionally includes an edge seal 450*a*' in the form of a more flexible, or soft (e.g., elastomeric) material configured to help ensure water does not penetrate between the fin 420' and the frame 30 of the fenestration unit 10. The edge seal 450*a*' generally extends along the length of the base 450'.

Figure 24:
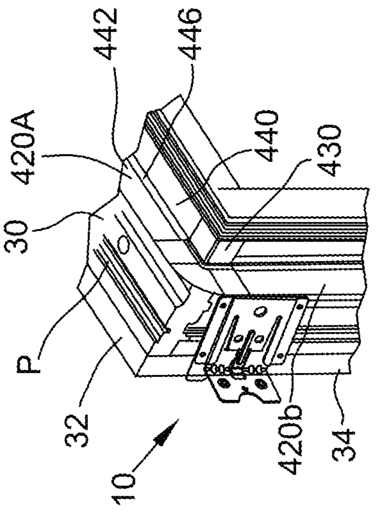
FIG. 24 is a closeup view of a corner of the fenestration unit of FIG. 1, according to some embodiments.

FIG. 24 shows a closeup view of a first corner of the frame 30 of FIG. 1 defined at an intersection of the head 32 and the first jamb 34 of the frame 30 (the frame 30 also defines a second corner at the intersection of the head 32 and the second jamb 36 of the frame 30). As shown, the first corner bridge seal 430 is located at the first corner and provides a transition between the head fin 420*a* and the first jamb fin 420*b* (the second corner bridge seal 432 is similarly located at the second corner and similarly provides a transition between the head fin 420*a* and the second jamb fin 420*c*).

Figure 25:
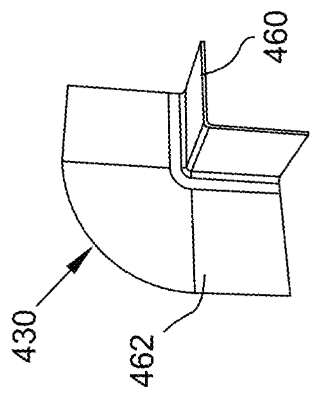
FIG. 25 is an isometric view of a first corner bridge seal of the fenestration unit of FIG. 1, according to some embodiments.

FIG. 25 is an isometric view of the first corner bridge seal 430, the second corner bridge seal 432 being substantially similar to the first corner bridge seal 430, in various embodiments. As shown, the first corner bridge seal 430 includes a gutter portion 460 in the form of an L-shaped flange formed by two flat webs of material and a hood portion 462 in the form of a flat web of material extending in an orthogonal plane from the gutter portion 460. The first corner bridge seal 430 may be formed of a substantially flexible (e.g., elastomeric material) so that it can be folded similarly to the fins 420. For example, both the hood portion 462 and/or the gutter portion 460 may be substantially flexible (e.g., elastomeric) and able to be resiliently deformed.

Figure 26:
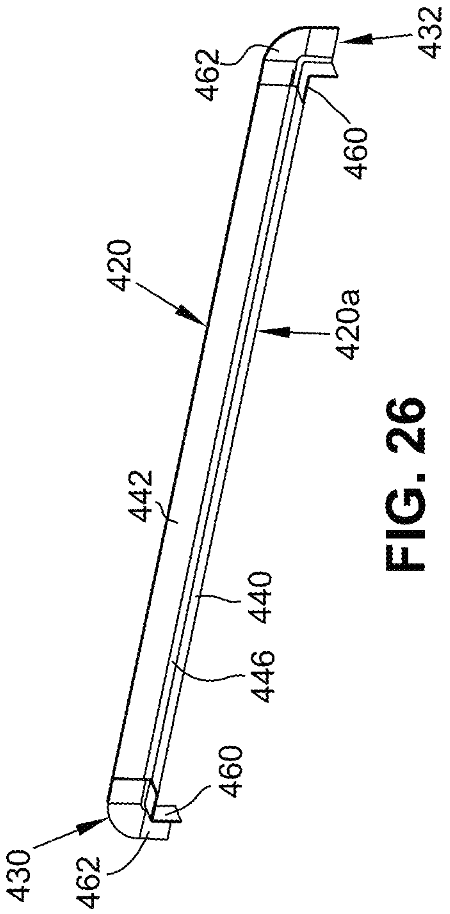
FIG. 26 is an isometric view of a head fin, and first and second corner bridge seals of the fenestration unit of FIG. 1, according to some embodiments.

FIG. 26 shows the first and second corner bridge seals 430, 432 assembled to the head fin 420*a*. As shown, the gutter portion 460 of the first corner bridge seal 430 is coupled to the coupling portion 440 and the hinge portion 446 of the head fin 420*a*. In some examples, the hood portion 462 is also secured to the projection portion 442 of the head fin 420*a*. The second corner bridge seal 432 is optionally similarly secured to the head fin 420*a* at an opposite end of the head fin 420*a* from the first corner bridge seal 430. In at least this manner, water flowing onto the head fin 420*a* will be directed over the first and second corner bridge seals 430, 432 along the first and second jamb fins 420*b*, 420*c*, respectively. Along those lines the first corner bridge seal 430 is optionally secured to the first jamb fin 420*b*. For example, the hood portion 462 is optionally secured to the projection portion of the first jamb fin 420*b*. Optionally, the gutter portion 460 may be secured to the coupling portion of the first jamb fin 420*b*. The second corner bridge seal 432 may be similarly secured to the second jamb fin 420*c*.

Figure 27:
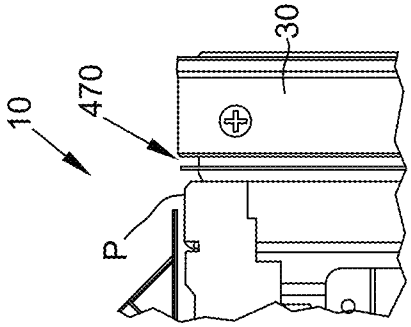
FIG. 27 is a closeup end view of a first corner of the fenestration unit with a fin assembly of the fenestration unit of FIG. 1 removed, according to some embodiments.

FIG. 27 shows a closeup view of the first corner of the frame 30 of FIG. 1 showing a complementary edge feature 470 (e.g., accessory channel or kerf) extending around the outer perimeter P of the frame 30 formed into the outer edges of the frame 30. As previously referenced, the coupling portions of the plurality of fins 420 are coupled to (inserted into) the complementary edge feature 470 in order to secure the plurality of fins 420 about the outer perimeter P of the frame 30.

Figure 28:
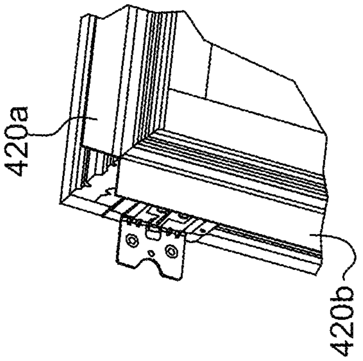
FIG. 28 is a closeup isometric view of the first corner of the fenestration unit of FIG. 1 with the first bridge corner seal removed, according to some embodiments.
Figure 29B:
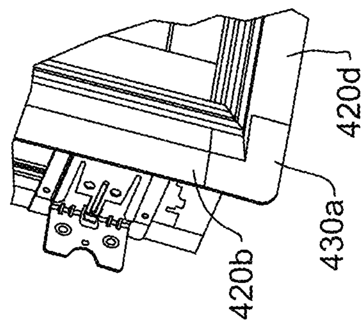
FIG. 29B is a closeup, isometric view of the third corner of the fenestration unit of FIG. 1 showing another design proximate the intersection of the first jamb fin and a sill fin of the fenestration unit, according to some embodiments.
Figure 29A:
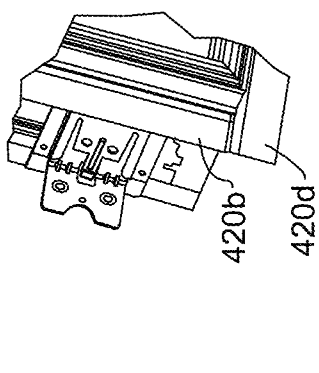
FIG. 29A is a closeup, isometric view of the third corner of the fenestration unit of FIG. 1 showing an overlap of a first jamb fin and a sill fin of the fenestration unit, according to some embodiments.

FIG. 28 is a closeup view of the first corner showing the head fin 420*a* and the first jamb fin 420*b* secured in the complementary edge feature 470 (FIG. 27) with the first corner bridge seal 430 not shown. And, FIG. 29A is a closeup view of a third corner of the frame 30 defined at an intersection of the sill 38 and first jamb 30 of the frame 30 (e.g., as shown in FIG. 1). Similarly, a fourth corner of the frame 30 is defined at an intersection of the sill 38 and the second jamb 30 of the frame 30. As shown, in some designs, the first jamb fin 420*b* and the sill fin 420*d* are overlapped, but not secured together nor is there a corner bridge seal secured thereto. The second jamb fin 420*c* and the sill fin 420*d* may be similarly arranged and configured with respect to one another at the fourth corner referenced above. However, FIG. 29B shows another embodiment in which the first jamb fin 420*b* and the sill fin 420*d* are secured together using a corner bridge seal 430*a* that is similar to the corner bridge seal 430. The second jamb fin 420*c* is optionally similarly secured to the sill fin 420*d* using another corner bridge seal as desired.

In sum, as shown in FIG. 3, the fin assembly 410 includes the head fin 420*a* secured or coupled to the head 32 of the frame 30, a first jamb fin 420*b* coupled, or secured to the first jamb 34 of the frame, a second jamb fin 420*c* coupled to the second jamb 36 of the frame, and a sill fin 420*d* coupled to the sill 38 of the frame 30. And, as shown in FIG. 3, the first corner bridge seal 430 overlaps the first side fin 420*b* and the top fin 420*a* and the second corner bridge seal 432 overlaps with the second side fin 420*c* and the top fin 420*a* to define a continuous water barrier extending about the outer perimeter P of the frame 30 along the first jamb 34, the head 32, and the second jamb 36. In turn, the first jamb fin 420*b* and the second jamb fin 420*c* are overlapped with the sill fin 420*d*.

Figure 31:
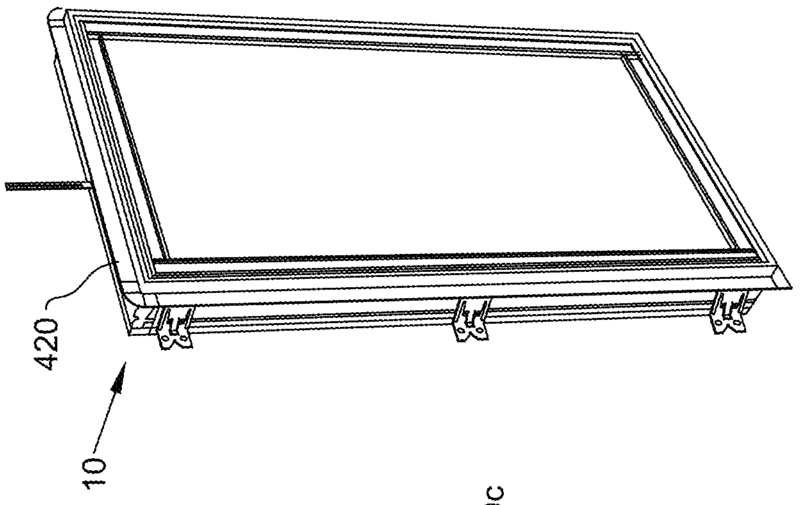
FIG. 31 is an isometric view of the fenestration unit of FIG. 1 in a deployed, or installation configuration, according to some embodiments.
Figure 30:
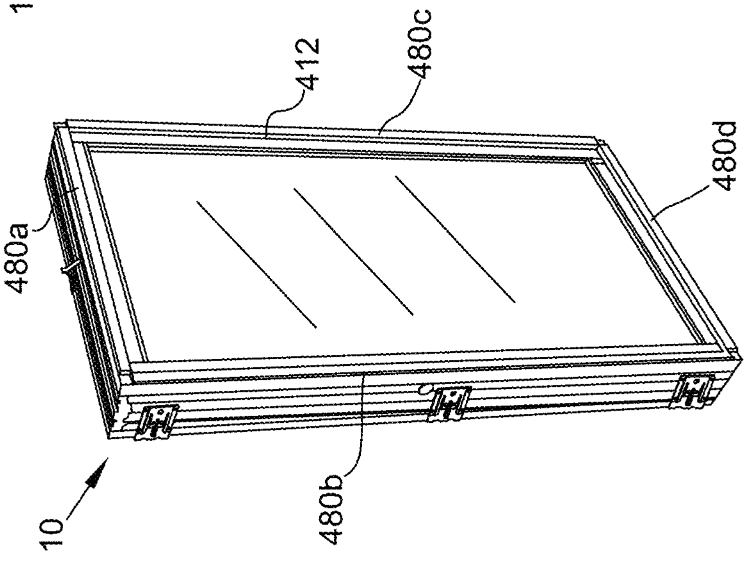
FIG. 30 is an isometric view of the fenestration unit of FIG. 1 in a stowed configuration, according to some embodiments.

FIG. 30 shows the fenestration unit 10 in the stowed configuration with the plurality of fins 420 (FIG. 3) folded in an exterior direction with retaining assembly 412 retaining the plurality of fins in the stowed configuration. According to some embodiments, the retaining assembly 412 includes a plurality of retaining clips 480, such as a head clip 480*a*, a first jamb clip 480*b*, a second jamb clip 480*c*, and a sill clip 480*d*. FIG. 31 shows the fenestration unit 10 after the retaining assembly 412 has been removed, allowing the plurality of fins 420 to unfold and transition to the active, or installation configuration. Although the retaining clips 480 are optionally employed, in other embodiments adhesives (e.g., tape or coatings) may additionally or alternatively be employed to temporarily secure the plurality of fins 420 in the folded configuration. For example, a pressure sensitive adhesive set may be applied. In such examples, the adhesive may be removed from the plurality of fins 420 without damaging the plurality of fins 420. As another alternative, cardboard, paperboard, or other material shaped in a “C” or “F” shape may be implemented to replace one or more of the retaining clips 480.

Figure 32:
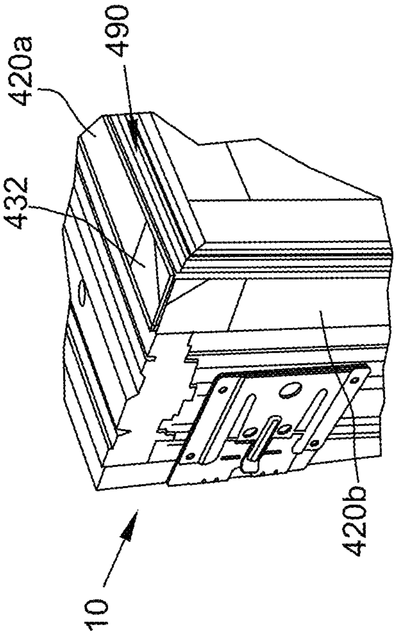
FIG. 32 is a closeup, isometric view of the fenestration unit of FIG. 1 in a stowed configuration with a plurality of retaining clips removed and showing the first bridge corner seal in a folded configuration, according to some embodiments.

FIG. 32 is a closeup view of the first corner with the head fin 420*a* and the first jamb fin 420*b*, as well as the first corner bridge seal 432 folded over into the stowed configuration. As shown, the first corner bridge seal 432 may be folded onto itself so that the first corner bridge seal 432 does not protrude or project substantially from the outer perimeter P of the frame 30.

Figure 33A:
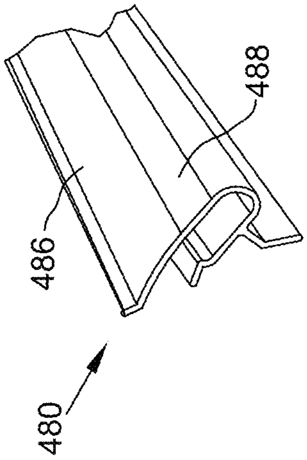
FIGS. 33A, 34A, and 35A illustrate a retaining clip design of the fenestration of FIG. 30, according to some embodiments.
Figure 34A:
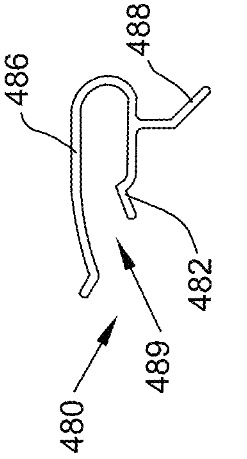

FIG. 33A is a partial view of a length of one of the retaining clips 480, according to a first design, where each of the retaining clips 480 (e.g., the head clip 480*a*, the first jamb clip 480*b*, the second jamb clip 480*c*, and the sill clip 480*d*) can be of a substantially similar design (apart from having a length suitable for retaining each of the respective plurality of fins 420 in the stowed configuration). FIG. 34A is a transverse sectional view of the retaining clip 480 shown in FIG. 33A. As shown in FIG. 34A, the retaining clip 480 includes a first channel insert 482, a first retaining lip 486, and a second retaining lip 488. As shown, the first channel insert 482 is substantially parallel to the first retaining lip 486 and interconnected therewith (e.g., defining a "C" shape in transverse cross-section). The retaining clips 480 may extend for a length approximating the portion of the frame 30 to which it is installed (e.g., the head 32, the first jamb 34, the second jamb 36, and the sill 38). Alternatively, the length of each retaining clip 480 may be broken down into one or more smaller, individual clips rather than a single, long clip.

The retaining clips 480 are resiliently deformable such that they can be attached to the frame 30 in a friction fit, for example. In some embodiments, the retaining clips 480 are formed of a polymeric material, such as polyvinyl chloride (PVC), for example. The channel insert 482 may include barbs, prongs, or projections to help assist with mechanical engagement with a complementary face feature (e.g., accessory channel or kerf) formed in the frame 30. The retaining lips 486 may include a rounded curved, or hooked end to help provide a positive bias against portions of the frame 30. The second retaining lip 488 may extend or project substantially orthogonally relative to the channel insert 482 and the first retaining lip 486. The retaining lip 486 extends substantially parallel to the channel insert 482, the first retaining lip 486 and the channel insert 482 defining a receiving channel 489 therebetween. The second retaining lip 488 optionally acts as an insertion stop extending substantially perpendicular to the first retaining lip 486 and the first channel insert 482, which can optionally be configured to abut the back face (or exterior face) of the frame 30 when the retaining clip 480 is assembled to the frame 30.

Figure 35A:
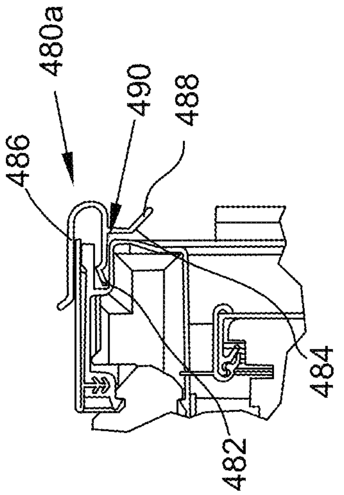

For example, FIG. 35A is a sectional view at the head 32 of the frame 30 showing one of the retaining clips 480 according to the design of FIG. 33A, the head retaining clip 480*a*, releasably engaged with a complementary face feature 490 (e.g., accessory channel or kerf) formed in the back face 44, or exterior face 44 of the frame 30 toward the outer perimeter P, and specifically in the head 32. For reference, the complementary face feature 490 is optionally formed in each of the head 32, first jamb 34, second jamb 36, and sill 38 of the frame 30. As shown, the first channel insert 482 is releasably engaged in the complementary face feature 490 with the second channel insert 484 arranged along the exterior face 44 and engaged therewith. In turn the first retaining lip 486 extends over the head fin 420*a*, and specifically over the projection portion 442 to hold the projection portion 442 folded against the coupling portion 440. The second retaining lip 488 extends along the back face 44. Generally, the first retaining lip 486 extends along the side of the frame 30 with the fin 420 of the fin assembly 412 received between the retaining lip 486 and the side, or outer perimeter P of the frame 30.

Each of the retaining clips 480 may be similarly secured about the frame 30 to retain the plurality of fins 420 in the stowed state. In different terms, the channel inserts of the retaining clips 484, 484 are releasably secured into the complementary features 490 (e.g., accessory channels) of the frame 30 with the retaining lips 486, 488 received over the fin assembly 410 to releasably secure the fins 420 in the constrained state, or stowed configuration.

Each of the retaining clips 480 may be reusable such that the retaining clips may be removed and re-installed about the frame 30 without damaging the retaining clips 480. The retaining clips 480 may also be installed and removed without damaging the plurality of fins 420 or the corner bridge seals 430, 432. The retaining clips 480 may be removed and re-installed manually and without the use of specialized tools.

Figure 33B:
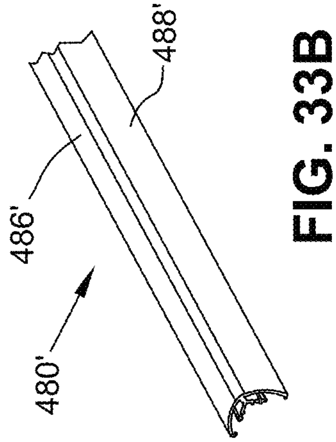
Figure 34B:
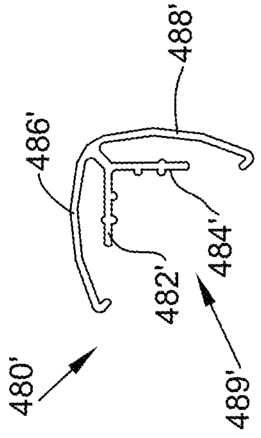

FIG. 33B is a partial view of a length of one of the retaining clips 480 according to another design, shown as retaining clips 480', according to some embodiments, where each of the retaining clips 480' (e.g., the head clip 480*a'*, the first jamb clip 480*b'*, the second jamb clip 480*c'*, and the sill clip 480*d'*) can be substantially similar to each other (apart from having a length suitable for retaining each of the respective plurality of fins 420 in the stowed configuration). FIG. 34B is a transverse sectional view of the retaining clip 480' shown in FIG. 33B. As shown in FIG. 34B, the retaining clip 480' includes a first channel insert 482', a second channel insert 484', a first retaining lip 486', and a second retaining lip 488'. As shown, the first and second channel inserts 482', 484' are substantially orthogonal and the first and second retaining lips 486', 488' are similarly orthogonally offset. The retaining clips 480' may extend for a length approximating the portion of the frame 30 to which it is installed (head 32, first jamb 34, second jamb 36, and sill 38). Alternatively, the length of each retaining clip 480' may be broken down into one or more smaller, individual clips rather than a single, long clip.

The retaining clips 480' are resiliently deformable such that they can be attached to the frame 30 in a friction fit, for example. In some embodiments, the retaining clips 480' are formed of a polymeric material, such as polyvinyl chloride (PVC), for example. The channel inserts 482', 484' may include barbs, prongs, or projections to help assist with mechanical engagement with a complementary face feature (e.g., accessory channel or kerf) formed in the frame 30. The retaining lips 486', 488' may include rounded curved, or hooked ends to help provide a positive bias against portions of the frame 30. The first retaining lip 486' extends substantially parallel to the first channel insert 482', the first retaining lip 486' and the first channel insert 482' defining a receiving channel 489' therebetween. The second retaining lip 488' optionally acts as an insertion stop extending substantially perpendicular to the first retaining lip 486' and the first channel insert 482', which can optionally be configured to abut the back face of the frame 30 when the retaining clip 480' is assembled to the frame 30.

Figure 35B:
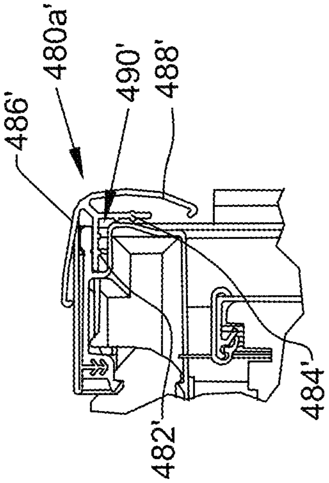
FIGS. 33B, 34B, and 35B illustrate another retaining clip design of the fenestration unit of FIG. 30, according to some embodiments.

For example, FIG. 35B is a sectional view at the head 32 of the frame 30 showing one of the retaining clips 480', the head retaining clip 480*a'*, releasably engaged with a complementary face feature 490' (e.g., accessory channel or kerf) formed in the back face 44, or exterior face 44 of the frame 30 toward the outer perimeter P, and specifically in the head 32. For reference, the complementary face feature 490' is optionally formed in each of the head 32, first jamb 34, second jamb 36, and sill 38 of the frame 30. As shown, the first channel insert 482' is releasably engaged in the complementary face feature 490' with the second channel insert 484' arranged along the exterior face 44 and engaged therewith. In turn, the first retaining lip 486' extends over the head fin 420*a*, and specifically over the projection portion 442 to hold the projection portion 442 folded against the coupling portion 440. The second retaining lip 488' extends along the back face 44. Generally, the first retaining lip 486' extends along the side of the frame 30 with the fin 420 of the fin assembly 412 received between the retaining lip 486' and the side, or outer perimeter P of the frame 30.

Each of the retaining clips 480' may be similarly secured about the frame 30 to retain the plurality of fins 420 in the stowed state. In different terms, the channel inserts of the retaining clips 482', 484' are releasably secured into the complementary features 490' (e.g., accessory channels) of the frame 30 with the retaining lips 486', 488' received over the fin assembly 410 to releasably secure the fins 420 in the constrained state, or stowed configuration.

Adjustment System

Figure 36A:
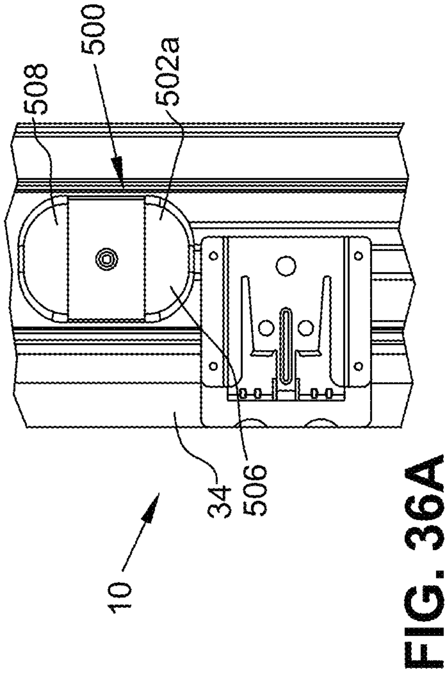

FIG. 36A shows a close-up view of the first jamb 34 (FIG. 1), and a portion of the adjustment system 500 secured to the first jamb 34, and in particular an edge adjuster 502*a* of a plurality of edge adjusters according to a first design. The adjustment system 500 may serve to help straighten the jambs 34, 35 in order to help generate a more uniform exterior reveal between the sash and frame 30. In various examples, by performing this function, the adjustment system 500 helps improve the weather sealing ability of the fenestration unit 10 by creating more sash to frame 30 weather-strip contact, for example.

Figure 37A:
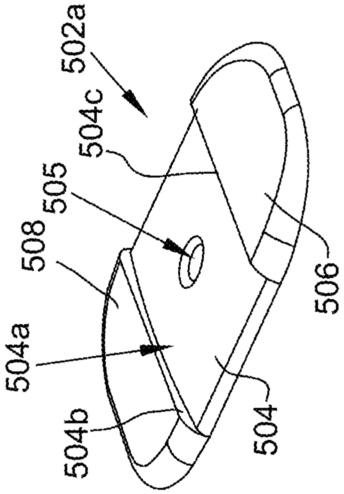
FIGS. 36A, 37A, 38A, and 39A show an adjustment system design of the fenestration unit of FIG. 1, according to some embodiments.
Figure 39A:
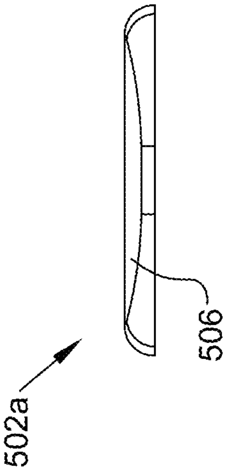
Figure 38A:
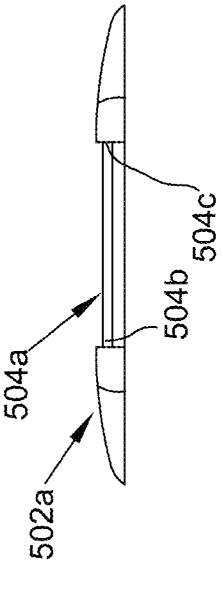

The plurality of edge adjusters may be substantially similar to the first edge adjuster 502*a* (FIG. 36A) secured to the first jamb 34. For example, a second edge adjuster 502*b* may be secured to the second jamb 36 of the frame 30 (e.g., at the location indicated on FIG. 2 for edge adjuster 502*b*). Any number of edge adjusters 502 at any number of positions on the frame 30 are contemplated. FIG. 37A shows the close-up, isometric view of the first edge adjuster 502*a* removed from the frame 30 to show additional details thereof. FIGS. 38A and 39A are front and side views of the edge adjuster 502*a* of FIG. 36A.

As shown, the first edge adjuster 502*a* includes a guide portion 504, a first ramp portion 506, and a second ramp portion 508. The first edge adjuster 502*a* defines a longitudinal axis extending between the first and second ramp portions 506, 508. The guide portion 504 is positioned between the first and second ramp portions 506, 508 and includes a sliding surface 504*a*, a first guide edge 504*b*, and a second guide edge 504*c*. The sliding surface 504*a* is recessed (e.g., relative to the first and second ramp portions 506, 508) to define the first and second guide edges 504*b*, 504*c*. The first and second guide edges 504*b*, 504*c* are optionally spaced a distance corresponding to a standard wooden, composite, or polymeric shim width (e.g., 1.5 inches). As shown, the guide portion 504 optionally includes a fastener aperture 505 (e.g., for a screw or bolt). The fastener aperture 505 may be used to affix the frame 30 to the rough opening (RO) using a fastener and/or to secure the first edge adjuster 502*a* to the frame 30 (e.g., either jamb 34, 36). Additionally, or alternatively, the one or more edge adjusters 502 may be coupled or secured to the frame 30 via adhesion to the frame 30.

The first and second ramp portions 506, 508 each taper in thickness, going from a first, greater thickness to a second, smaller thickness in a direction away from the guide portion 504. In use, the first edge adjuster 502*a* is assembled to the first jamb 34 with the longitudinal axis extending along the first jamb 34. Once the fenestration unit 10 is received in the rough opening (RO), a shim (not shown) is slide in either an upward or downward direction over the first or second ramp portions 506, 508, respectively, until the shim passes into the guide portion 504. In some examples, a user (not shown) feels a tactile response to the shim sliding into place into the guide portion 504. At that point, the shim can be driven into the gap between the first edge adjuster 502*a* and a first jamb of the rough opening (RO). This shimming action can help to reinforce the first jamb 34 of the fenestration unit 10. Any number of edge adjusters (e.g., of similar design to the first edge adjuster 502*a*) may be coupled to the perimeter P of the frame 30 (e.g., at a remote location from the installation site), such as on the first and second jambs 34, 36.

Figure 36B:
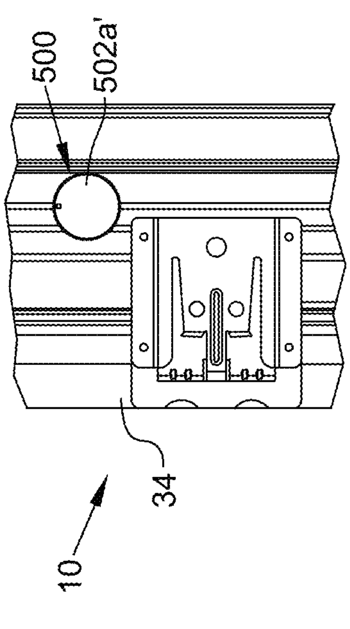
FIGS. 36B, 37B, 38B, and 39B show another adjustment system design of the fenestration unit of FIG. 1, according to some embodiments.
Figure 37B:
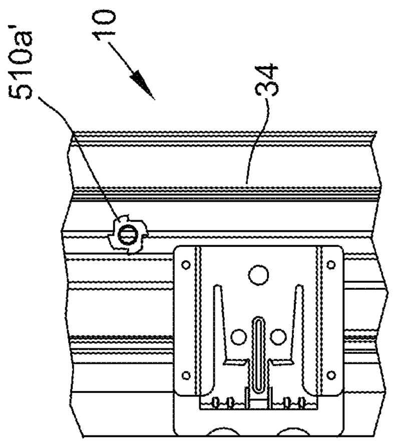

FIG. 36B shows another close-up view of the first jamb 34, and a portion of the adjustment system 500' secured to the first jamb 34, and in particular a plurality of edge adjusters 502, according to another design shown as edge adjuster 502'. The plurality of edge adjusters 502' include a first a first edge adjuster 502*a'* (FIG. 36B) secured to the first jamb 34 and a second edge adjuster 502*b'* (similar to 502*b* of FIG. 2) secured to the second jamb 36 of the frame 30. The plurality of edge adjusters 502' are optionally substantially similar. FIG. 37B shows the close-up view of FIG. 36B with the first edge adjuster 502*a'* removed to show a first adjustment aperture 510*a'* of a plurality of adjustment apertures included in the frame 30. As shown, the first adjustment aperture 510*a'* is formed in the first jamb 34. Though not shown, the second jamb 36 includes a similar adjustment aperture (not shown) in which the second edge adjuster 502'*b* can be secured. Any number of edge adjusters 502' may be included with corresponding adjustment apertures 510'.

Figure 38B:
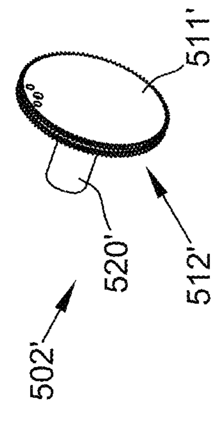
Figure 39B:
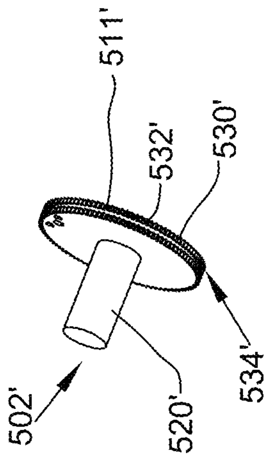

FIG. 38B is a first isometric view of one of the edge adjusters 502' and FIG. 39B is a second isometric view of the edge adjuster 502'. As shown, the edge adjuster 502' includes a contact head 511' having a plurality of engagement features 512' and an adjustment body 520' extending from the contact head 511' and configured to be received in the adjustment aperture 510' in the frame 30 (e.g., in the first adjustment aperture 510'). The adjustment body 520' is rotatably actuatable to adjust a depth of the adjustment body 520' within an adjustment aperture 510'. The contact head defines a projection distance from the frame 30 based upon the depth of the adjustment body 520' within the adjustment aperture 510'.

In some embodiments, the adjustment body 520' of the edge adjuster 502' may have male threading and the adjustment aperture 510' may have complementary female threading. In this manner, the adjustment body 520' can be rotatably adjusted (e.g., screwed in or out) in order to adjust the distance at which the contact head 511' projects from the frame 30. For example, the plurality of engagement features 512' of the contact head 511' may include a plurality of radial projections 530' with a plurality of recesses 532' between the plurality of projections. In some examples, the recesses may be sized to engage with an end (e.g., tip) of a standard flathead screwdriver (e.g., having a ¼-inch head and a shaft length of at least 4 inches). The contact head 511' may have a terminal end, or free end, defining a leading profile, the leading profile being dome-shaped.

As shown, the contact head 511' may include a circumferential groove 534' (FIG. 39B). An elongate filament (e.g., strand or braid) may be wrapped around the contact head 511' and spooled in the circumferential groove 534'. In order to extend the contact head 511', the elongate filament (not shown) may be pulled to rotate the contact head 511' and unscrew the adjustment body 520' to extend the contact head 511'.

In various examples, the first edge adjuster 502*a'* is located closer to the back, or exterior face 44 of the fenestration unit 10 than the front 42 of the fenestration unit 10. In this manner, an installer (not shown) may be able to insert a screwdriver or other tool in a gap between the fenestration unit 10 and the framing of the rough opening (RO), engage the tool with the edge adjuster 502, 502', rotate the edge adjuster 502' with the tool, and engage the edge adjuster 502' (and particularly the contact head 511') with the framing of the rough opening (RO). In other examples, an installer may pull an elongate filament (not shown) wrapped around the contact head 511' and spooled in the circumferential groove 534' to adjust the depth of the first edge adjuster 502', or the amount the contact head 511' extends from the frame 30.

Installation Method

Installation of the fenestration unit 10 can proceed in view of the various concepts described in the foregoing sections. In particular, installation of the fenestration unit 10 in the rough opening (RO) may proceed from the interior side of the rough opening (RO) and may be executed by a single installer on the interior side of the rough opening.

As part of the installation process, the rough opening (RO) in the building structure should be prepared for fenestration unit 10 installation. Generally, the rough opening (RO) is sized to be between ½ inches and ¾ inches larger than the fenestration unit 10 in both width and height, although other setups may also be suitable. Some methods also include forming the rough opening (RO), such as by cutting out the rough opening (e.g., plywood cladding covering rough opening framing). The sill portion of the framing of the rough opening (RO) (lower framing) may be flashed (e.g., using appropriate flashing tape).

The fenestration unit 10 is then partially deployed from the stowed to the active configuration. In particular, the anchoring clips 102 (or anchoring clips 102') are transitioned to the installation configuration by removing the coupling brackets 112 from the carrier brackets 110, rotating them 180 degrees so they no longer extend inward toward the center of the fenestration unit 10, and then re-inserting the coupling brackets 112 into the carrier brackets 110 such that the coupling brackets project radially outward from outer perimeter P of the frame 30. When the coupling brackets 112 are sufficiently inserted into the carrier brackets 110 the catches 150 engage the detents 174. In various examples, this engagement results in an audible "click" or noise providing a clear, audible cue to the installer that the coupling brackets 112 have been properly secured and are at the desired depth of insertion. This audible cue can be augmented by adjusting the spring bias and material selection for the anchoring clips 102. The "click" or vibration may also present as tactile feedback, keying to a user that the coupling brackets 112 have been properly installed. Various details on insertion depth and assembly of the coupling brackets 112 are provided in the foregoing sections.

Advantageously, in various implementations, no tools are needed for the foregoing steps. In other words, the removal, reversal, re-insertion, and coupling/assembly of the anchoring clips 102 can be accomplished by hand. If it is desired to remove the coupling brackets 112 from the carrier brackets 110 after the catches 150 have engaged the detents 174, a user may lift the catches 150 from the detents 174 (e.g., using by hand and/or by using a tool such as a screwdriver as previously described) and the coupling brackets 112 may then be withdrawn.

The fenestration unit 10 is inserted or pushed unit into the rough opening (RO) from the interior side of the rough opening (RO), for example by a single installer. The fenestration unit 10 may be passed from the exterior, through the rough opening (RO) and then repositioned or pushed or pulled in an exterior direction to seat the fenestration unit but this is generally less preferred. The ability and functionality to be installed from an interior side of the unit can be an important feature of the fenestration unit 10, as traditional fenestration installations require at least one installer on the exterior side of the rough opening (RO) and/or at least one installer on the interior side of the rough opening (RO).

In some embodiments, the fenestration unit 10 is inserted into the rough opening (RO) by first inserting a bottom of the fenestration unit 10 into the rough opening (RO) and then tilting the fenestration unit 10 back toward an exterior side of the rough opening (RO) such that the retention system exerts the retention force on the fenestration unit 10 to maintain positive engagement of the fenestration unit 10 with the framing of the rough opening (RO). The installation stabilizer system 300 permits insertion of the fenestration unit 10 within the rough opening (RO) in a first, interior-to-exterior direction at a first insertion force and resist extraction of the fenestration unit from the opening in a second, exterior-to-interior direction at a second extraction force, the second extraction force being substantially greater than the first insertion force. The method includes inserting the fenestration unit 10 within the rough opening (RO) in the first direction at a force that meets or exceeds the insertion force. The retainer 302 of the installation stabilizer system 300 may engage the header H of the framing of the rough opening (RO) such that a noise is produced providing a clear, audible cue to the installer that the retainer 302 is properly engaged. In some embodiments, both the retainer 302 and the anchoring clips 102 together provide an audible cue to the installer that the fenestration unit 10 is engaged within the framing of the rough opening (RO) and properly seated within the rough opening (RO).

The fenestration unit 10 is pushed into the rough opening (RO) until the anchoring clips 102 engage the edges of the rough opening (RO), and specifically the jamb portions of the rough opening framing. The retention system exerts a retention force on the fenestration unit 10 to maintain positive engagement of the fenestration unit 10 with framing of the rough opening (RO) upon insertion of the fenestration unit 10 in the rough opening (RO). The retention system exerts this retention force without use of fasteners securing the fenestration unit 10 to the rough opening framing. The anchoring clips 102 act as an engagement system that is positively engaged with the interior face of the rough opening framing from the interior side of the rough opening (RO) and the retention system operates to maintain positive engagement of the engagement system with the rough opening framing (RO) upon insertion therein.

For example, the sill spacer system 200 provides the offset tilt bias toward the exterior side of the rough opening (RO), as previously described, as the fenestration unit 10 is resting on the sill portion of the rough opening framing and the installation stabilizer system 300 engages the header H of the rough opening framing, as previously described. When the stabilizer system 300 automatically engages the head H, there is some resistance to inserting the fenestration unit 10 within the rough opening (RO), but this resistance is easily overcome by a single installer and the resistance to the fenestration unit 10 being withdrawn from the rough opening (RO) is substantially greater, preventing inadvertent extraction, or preventing the fenestration unit 10 from falling out of the rough opening (RO).

If desired, the strap member **302*a*' of the retainer 302' (or similar features of retainer 302) may be reoriented (e.g., bent) to project upwardly away from the fenestration unit 10 and against the head H of the rough opening framing. The strap member 302*a*' may then be fastened (e.g., screwed or nailed) to the rough opening framing to further ensure the fenestration unit 10** is securely held in place.

The fenestration unit 10 is then centered in the rough opening (RO). In some embodiments, the fenestration unit 10 begins spaced from the sill portion of the rough opening framing a desired distance due to the thickness of the sill spacers 202. In some embodiments, this distance is approximately ¼ inches. The fenestration unit 10 may be centered side-to-side by inserting a screwdriver having a standard head (e.g., ¼-inch-thick head) and rotating the screw driver to ensure a minimum desired gap is achieved at the first and second jambs 34, 36. To begin the shimming/levelling processes, a level is used to check the horizontal level of the fenestration unit 10 and a single shim is slid underneath the low side sill spacer 202 to begin levelling the fenestration unit 10. Additional shims are applied as needed to achieve a desired level and sill spacing with periodic measuring of horizontal level as at the sill 38 as needed.

Once a desired levelling and spacing is achieved at the sill portion of the fenestration unit 10, fasteners (e.g., screws or nails) are driven through the first anchoring clip 102*a* and second anchoring clip 102*b*, corresponding to the two bottom-most clips on the fenestration unit 10, and into the rough opening framing.

The fenestration unit 10 can then continue to be plumbed, squared, and fully coupled to the framing of the rough opening (RO). For example, a user may plumb one of the first jamb 34 and the second jamb 36 to vertical level. This operation of adjusting vertical level at the first jab 34 and/o the second jamb 36 may be carried out using a tool (e.g., a crowbar or prybar) to adjust the plumb of the jambs 34, 36. Additionally, or alternatively, an installer may use an air bag designed for such a purpose that can be inflated to adjust the gap between the jambs 34, 36 and the rough opening framing, and thus vertical level thereof, or other suitable methods may be implemented as desired. Once plumbed to be vertically level, the remaining anchoring clips 102 are fastened to the rough opening framing until all anchoring clips 102 are attached to the rough opening framing using one or more fasteners such that the fenestration unit 10 is structurally secured to the rough opening (RO).

In some embodiments, the installer adjusts the adjustment system 500 to engage the framing (jamb portions) of the rough opening (RO). The deploying or adjusting of the adjustment system 500 may be carried out to help ensure that any torsional forces on the frame 30 (e.g., during high winds, such as those encountered in a hurricane) do not twist or deform the frame 30 to the point of failure during such an event. In various examples, the adjustment of the adjustment system 500 (e.g., shimming or otherwise engaging the rough opening (RO)) using the edge adjusters 502, 502' (such as those shown in FIG. 36A or 36B) proceeds from the exterior side of the fenestration unit 10. Access and adjustment from an exterior side may be facilitated as the edge adjusters 502, 502' may be located and biased toward the exterior side of the fenestration unit 10. Although exterior installation of the shims and/or access to the contact head 511', depending on design, may be facilitated by an exterior approach, the installer may access from either side of the fenestration unit 10 (interior and/or exterior) according to various embodiments.

The installer may apply an air sealant (e.g., spray foam or other air seal material) around the outer perimeter P of the fenestration unit 10 in the gap between the rough opening (RO) framing and the fenestration unit 10 to create an interior air seal. This interior air seal may be continuous and substantially, or entirely, uninterrupted. An interior air seal typically is necessary for proper water management. As previously referenced, the positioning of the sill spacer system 200 helps provide sufficient gap for the air sealant to be deposited in the gap, and also provides a continuous gap around the perimeter of the fenestration unit 10 to ensure a continuous seal can be formed. This sealing operation is typically carried out from an interior side of the rough opening (RO). Notably, the sealant may be applied before, or after the exterior water barrier steps described below in association with the weather seal system 400.

In contrast to other methods and systems, at this point the fenestration unit 10 is entirely squared, plumbed, and securely fastened in the rough opening (RO) all from the interior side of the rough opening (RO). This can be accomplished by a single installer, rather than requiring two installers. At that time, or a later time as desired, the same installer, or another installer, may proceed to the exterior side of the rough opening (RO) to finish exterior water barrier installation for the fenestration unit 10 in the rough opening (RO). This is to be contrasted with traditional, nailing fin installations which require a second installer to be present on the exterior side of the rough opening (RO) during installation of the fenestration unit 10.

Forming an exterior water barrier for the installation unit 10 includes removing the retaining clips 480 such that the plurality of fins 420 transition from the stowed state to a radial outwardly projecting installation, or deployed configuration. In various operations, in order to ensure proper deployment of the plurality of fins 420 (or fins 420'), the sill retaining clip 480*d* is removed first, followed by the first and second jamb retaining clips 480*b*, 480*c*, and finally the head retaining clip 480*a*. This ordering can help ensure the proper overlapping of the plurality of fins and the first and second corner bridge seals 430, 432, with the sill fin 420*d* being outwardly overlapping with the first and second jamb fins 420*b*, 420*c*.

Generally, no fasteners are used with the plurality of fins 420, which can be contrasted to traditional nailing fins. Though such fasteners (e.g., screws or nails) are not present in various examples, it is contemplated that such fasteners could be implemented in other embodiments (e.g., the embodiment of FIG. 23B). Regardless, installation proceeds by using flashing tape or another suitable flashing material to flash over the first and second jamb fins 420*b*, 420*c*, then the head fin 420*a*. Generally, weather resistant barrier (e.g., Tyvek® home wrap available from DuPont de Nemours, Inc.) will be present on the exterior wall of a building and will be cut with two 45-degree cuts at the rough opening head corners and folded vertically against itself. Once the first and second jamb fins 420*b*, 420*c* and the head fin 420*a* have been flashed, the weather resistant barrier can be folded back down over the head fin 420*a* and flashing (e.g., flashing tape) can be applied across the 45-degree cuts at the corners. Flashing (e.g., flashing tape) is not applied to the sill fin 420*d* in various examples. This absence of sealing at the sill 38 of the frame 30 can help ensure that the sill fin 420*d* acts as a water barrier, but not an air seal at the sill 38. This water-but-non-air barrier configuration promotes equalization of air pressure at a location under the sill 38 and exterior to the rough opening sealant to exterior air pressure. This equalization to exterior air pressure can help prevent water from being forced through the water seal at the sill 38 during a storm or other high external ambient air pressure event.

Various advantages may be achieved according to the foregoing example systems and methods. The various examples may be one or more of: more efficient (e.g., cycle time reduced by 50% or more); easier to learn; easier to remember; easier to train; may be less physically demanding (e.g., fenestration unit 10 is not set from the exterior side which could be on uneven ground or require a ladder); fenestration unit 10 is unable to fall out toward exterior during installation; can be installed by a single person from the interior of the building structure; interior and exterior installation tasks do not need to be done simultaneously; improved fenestration unit 10 install quality and fenestration unit 10 performance following installation; delivers an installation method that is unique to the industry and offers many benefits for the installer; faster cycle times; improved performance (water and air infiltration); adapts to wall depth variation; simplifies casing installation for finish carpenters; separates interior and exterior work so they can be done “independently”.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. A method of installing a fenestration unit in a rough opening in a structure defined by a rough opening framing, the rough opening having an interior side toward an interior direction and an exterior side toward an exterior direction opposite the interior direction, and the structure having an interior surface facing toward an interior of the structure and an exterior surface facing toward an exterior of the structure, the method comprising:

aligning a frame of a fenestration unit with the rough opening;

securing the frame of the fenestration unit in the rough opening by translating the frame of the fenestration unit in the exterior direction such that a retention system including a spring retainer coupled to the frame of the fenestration unit is engaged with the rough opening framing and exerts a retention force on the rough opening framing to retain the frame in the rough opening without fasteners securing the frame to the rough opening framing; and seating the fenestration unit in the rough opening at a desired depth of installation by pressing an engagement system including at least one coupling bracket coupled to the frame against the interior surface of the structure adjacent to the rough opening, the retention system maintaining positive engagement of the engagement system with the interior surface of the structure such that at least a portion of the engagement system contacts the interior surface of the structure without fasteners securing the frame of the fenestration unit to the rough opening framing.

2. The method of claim 1, wherein the retention system is coupled to a top of the frame of the fenestration unit and securing the frame in the rough opening includes translating a bottom of the frame into the rough opening and tilting a top of the frame in the exterior direction such that the retention system engages with a header of the rough opening framing to retain the frame within the rough opening.

3. The method of claim 1, wherein the retention system exhibits resistance to seating of the fenestration unit in the exterior direction such that seating the fenestration unit in the exterior direction includes applying an insertion force.

4. The method of claim 3, wherein the retention system is configured to resist tilting of the frame in the interior direction upon seating the fenestration unit within the rough opening framing.

5. The method of claim 1, wherein the spring retainer is secured to a top of the frame, and further wherein securing the frame in the rough opening includes biasing the spring retainer against a header of the rough opening framing.

6. The method of claim 5, wherein the spring retainer includes a first flex arm having a first engagement end, and further wherein biasing the spring retainer against the header of the rough opening includes bending the first flex arm in a first direction as the frame is translated into the rough opening.

7. The method of claim 6, wherein the spring retainer includes a second flex arm having a second engagement end, the second flex arm being positioned laterally adjacent the first flex arm and the first flex arm being longer than the second flex arm, and further wherein biasing the spring retainer against the header of the rough opening includes first engaging the first engagement end against the header of the rough opening and bending the first flex arm and subsequently engaging the second engagement end against the header of the rough opening and bending the second flex arm.

8. The method of claim 1, further including coupling the frame of the fenestration unit to the rough opening framing using one or more fasteners after seating the fenestration unit in the rough opening at the desired depth of installation.

9. The method of claim 8, wherein the at least one coupling bracket has a first leg and a second leg angularly offset from the first leg, and further wherein coupling the fenestration unit to the rough opening using one or more fasteners includes securing one or more fasteners through one or more apertures of the second leg into the rough opening framing.

10. The method of claim 1, wherein the fenestration unit includes a sill spacer coupled to the frame, and further wherein seating the frame in the rough opening includes resting the fenestration unit on the sill spacer such that the sill spacer imposes a tilting bias on the fenestration unit in the exterior direction.

11. The method of claim 1, wherein the fenestration unit is a door or a window.

12. The method of claim 1, wherein the interior surface of the structure against which the engagement system is pressed is an interior surface of the rough opening framing.

13. A method of installing a fenestration unit in a rough opening in a structure defined by a rough opening framing, the rough opening having an interior side toward an interior direction and an exterior side toward an exterior direction opposite the interior direction, and the structure having an interior surface facing toward an interior of the structure and an exterior surface facing toward an exterior of the structure, the method comprising:

inserting a bottom of a frame of the fenestration unit into the rough opening;

tilting the frame of the fenestration unit such that a retention system including a retainer coupled to a top of the frame is biased against a header of the rough opening framing to mechanically engage the rough opening framing and retain the fenestration unit in the rough opening without assistance of separate fasteners; and seating the fenestration unit at the desired installation depth in the rough opening by pressing an engagement system including at least one coupling bracket coupled to the frame of the fenestration unit against the interior surface of the structure such that the engagement system positively engages the interior surface of the structure, the retention system maintaining positive engagement of the engagement system with the interior surface of the structure such that at least a portion of the engagement system contacts the interior surface of the structure without assistance of separate fasteners securing the frame of the fenestration unit to the rough opening framing.

14. The method of claim 13, wherein the fenestration unit includes a sill spacer coupled to the bottom of the frame, and further wherein placing a bottom of the frame into the rough opening includes resting the fenestration unit on the sill spacer and further wherein tilting the fenestration unit includes tilting the fenestration unit on the sill spacer.

15. The method of claim 13, wherein the method further includes coupling the frame of the fenestration unit to the rough opening using one or more fasteners placed through the engagement system after the engagement system is positively engaged with the interior surface of the structure.

16. The method of claim 13, wherein the method further includes applying a first insertion force to the fenestration unit in the exterior direction to seat the fenestration unit within the rough opening.

17. The method of claim 16, wherein the retention system resists movement of the frame in the interior direction at a second retention force.

18. The method of claim 13, wherein mechanically engaging the retainer with a header of the rough opening includes the retainer biting into the rough opening framing.

19. The method of claim 18, wherein the retainer includes a first flex arm having a first engagement end, and further wherein mechanically engaging the retainer with the header of the rough opening includes bending the first flex arm in a first direction as the frame is translated into the rough opening.

20. The method of claim 19, wherein the retainer includes a second flex arm having a second engagement end, the second flex arm being positioned laterally adjacent the first flex arm and the first flex arm being longer than the second flex arm, and further wherein mechanically engaging the retainer with the header of the rough opening includes first engaging the first engagement end against the header of the rough opening and bending the first flex arm and subsequently engaging the second engagement end against the header of the rough opening and bending the second flex arm.

21. A method of installing a fenestration unit in a rough opening in a structure defined by a rough opening framing, the rough opening having an interior side toward an interior direction and an exterior side toward an exterior direction, and the structure having an interior surface facing toward an interior of the structure and an exterior surface facing toward an exterior of the structure, the method comprising:

seating a frame of the fenestration unit in the rough opening from the interior side toward the exterior direction such that a retention system including a retainer coupled to the frame of the fenestration unit engages the rough opening framing;

positively engaging an engagement system including at least one coupling bracket coupled to the frame with the interior side of the structure, the retention system being operable to maintain positive engagement of the engagement system with the interior side of the structure such that at least a portion of the engagement system contacts the interior surface of the structure; and after positively engaging the engagement system to the interior side of the structure, coupling the frame of the fenestration unit to the rough opening framing using one or more fasteners.

22. The method of claim 21, wherein the coupling bracket has a first leg and a second leg angularly offset from the first leg that includes one or more apertures, and further wherein coupling the fenestration unit to the rough opening using the one or more fasteners includes securing the one or more fasteners through the one or more apertures of the second leg and into the rough opening framing.

23. A method of installing a fenestration unit in a rough opening in a structure defined by a rough opening framing, the rough opening having an interior side toward an interior direction and an exterior side toward an exterior direction opposite the interior direction, the method comprising:

aligning a frame of a fenestration unit with the rough opening;

securing the frame of the fenestration unit in the rough opening by translating the frame of the fenestration unit in the exterior direction such that a retention system including a spring retainer secured to a top of the frame of the fenestration unit is engaged with the rough opening framing and exerts a retention force on the rough opening framing to retain the frame in the rough opening without fasteners securing the frame to the rough opening framing; and seating the fenestration unit in the rough opening at a desired depth of installation by pressing an engagement system coupled to the frame against the interior surface of the structure adjacent to the rough opening, the retention system maintaining positive engagement of the engagement system with the interior surface of the structure without fasteners securing the frame of the fenestration unit to the rough opening framing, wherein securing the frame in the rough opening includes biasing the spring retainer against a header of the rough opening framing, wherein the spring retainer includes a first flex arm having a first engagement end and a second flex arm having a second engagement end, the second flex arm positioned laterally adjacent the first flex arm and the first flex arm being longer than the second flex arm, wherein biasing the spring retainer against the header of the rough opening includes bending the first flex arm in a first direction as the frame is translated into the rough opening, and wherein biasing the spring retainer against the header of the rough opening includes first engaging the first engagement end against the header of the rough opening and bending the first flex arm and subsequently engaging the second engagement end against the header of the rough opening and bending the second flex arm.

* * * * *